US012691697B2

(12) United States Patent
Silk et al.

(10) Patent No.: US 12,691,697 B2
(45) Date of Patent: Jul. 28, 2026

(54) MEDIA APPLICATION SYSTEM WITH AUTONOMOUS MEDIA REPLENISHMENT

(71) Applicant: ZEBRA TECHNOLOGIES CORPORATION, Lincolnshire, IL (US)

(72) Inventors: Seth David Silk, Barrington, IL (US); David F. Beck, Exeter, RI (US); Edward Anthony Hackett, Surbiton (GB); Anthony Ross Helberg, Attleboro (MA)

(73) Assignee: Zebra Technologies Corporation, Lincolnshire, IL (US)

( * ) Notice: Subject to any disclaimer, the term of this patent is extended or adjusted under 35 U.S.C. 154(b) by 249 days.

(21) Appl. No.: 18/390,374

(22) Filed: Dec. 20, 2023

(65) Prior Publication Data

US 2025/0206046 A1 Jun. 26, 2025

(51) Int. Cl.

| | |
|---|---|
| ***B41J 15/04*** | (2006.01) |
| ***B41J 2/335*** | (2006.01) |
| ***B41J 3/407*** | (2006.01) |
| ***B41J 11/00*** | (2006.01) |
| ***B41J 15/00*** | (2006.01) |
| ***B41J 15/02*** | (2006.01) |
| ***B41J 15/16*** | (2006.01) |
| ***B65C 9/02*** | (2006.01) |
| ***B65C 9/18*** | (2006.01) |
| ***B65C 9/46*** | (2006.01) |
| ***B65H 19/12*** | (2006.01) |
| ***B65H 23/18*** | (2006.01) |
| *B65H 35/00* | (2006.01) |

(52) U.S. Cl.

CPC ............. *B41J 15/042* (2013.01); *B41J 2/335* (2013.01); *B41J 3/4075* (2013.01); *B41J 11/0075* (2013.01); *B41J 15/005* (2013.01); *B41J 15/02* (2013.01); *B41J 15/044* (2013.01); *B41J 15/046* (2013.01); *B41J 15/16* (2013.01); *B65C 9/02* (2013.01); *B65C 9/183* (2013.01); *B65C 9/46* (2013.01); *B65H 19/12* (2013.01); *B65H 23/1806* (2013.01); *B65H 35/0066* (2013.01); *B65H 2601/322* (2013.01); *B65H 2801/75* (2013.01)

(58) Field of Classification Search

CPC ........ B41J 15/042; B41J 2/335; B41J 3/4075; B41J 11/0075; B41J 15/005; B41J 15/02; B41J 15/044; B41J 15/046; B41J 15/16; B65C 9/02; B65C 9/183; B65C 9/46; B65H 19/12; B65H 2801/75

See application file for complete search history.

(56) References Cited

U.S. PATENT DOCUMENTS 5,078,816 A * 1/1992 Ratermann ........... B65C 9/1869 156/64

FOREIGN PATENT DOCUMENTS

JP 2000103549 A * 4/2000 ............. B65H 19/22
JP 2000114781 A * 4/2000 ............. H05K 13/02

* cited by examiner

*Primary Examiner* — Yaovi M Ameh

(57) ABSTRACT

An autonomous labeling system is disclosed that includes a media applicator, a robotic device, and a media replenishment system. The media applicator is configured to apply media to objects. The robotic device is operatively coupled to the media applicator and configured to move the media applicator. The media replenishment system configured to stage a supply of media for installation in the media applicator.

19 Claims, 30 Drawing Sheets

MEDIA APPLICATION SYSTEM WITH AUTONOMOUS MEDIA REPLENISHMENT

BACKGROUND

A supply chain process of a logistics system, such as a warehousing system, transportation system, sorting systems, and the like, typically involves using media (e.g., printed labels and/or radio frequency identification (RFID) tags) to mark, track, locate, and/or route objects that are being sorted, stored in a location, and/or transported between locations. The objects may have various sizes, shapes, and/or be configured in various positions on a conveyor that is used to process and/or distribute the objects for labelling with the media.

BRIEF DESCRIPTION OF DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
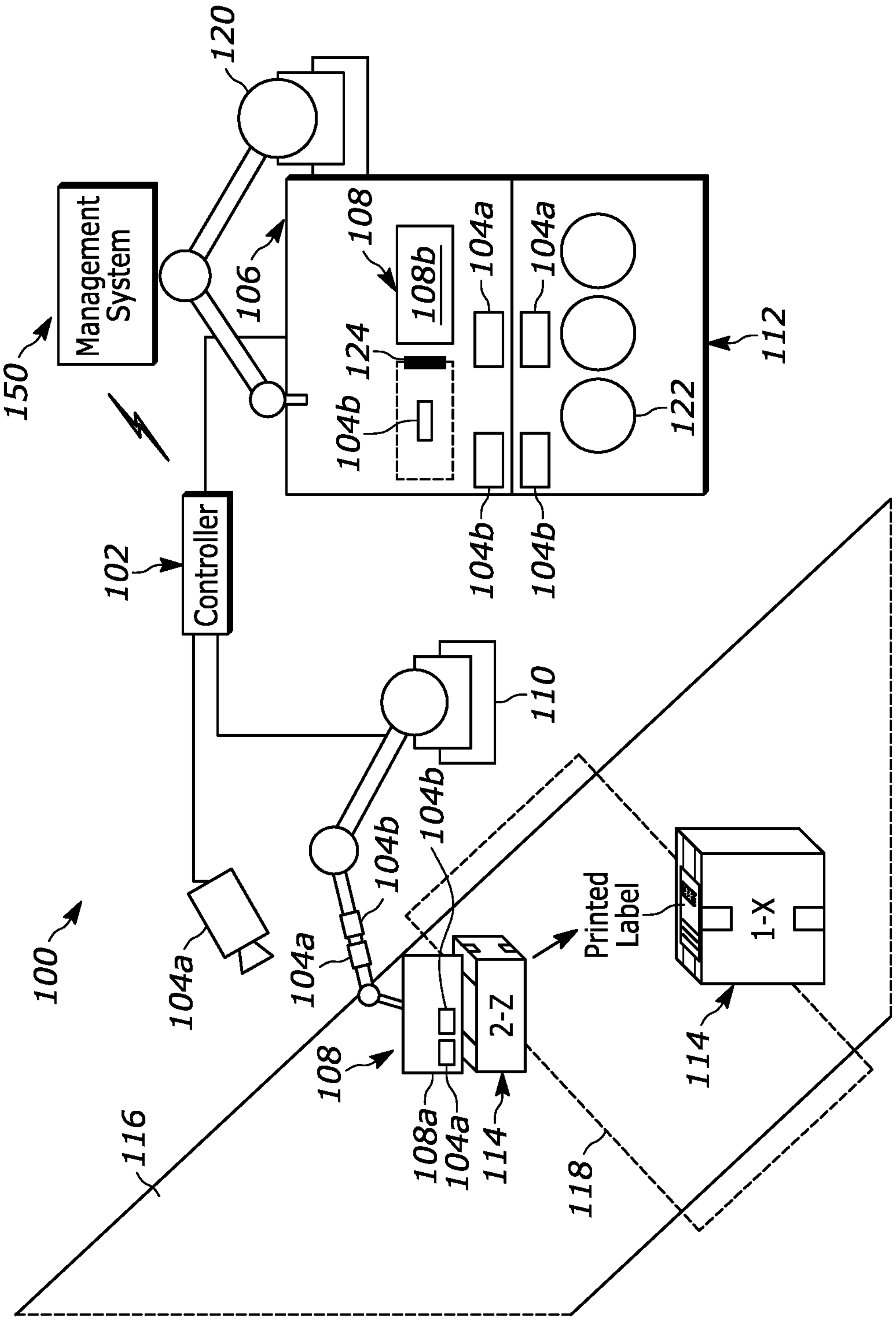
FIG. 1 illustrates an example autonomous media application system and an example management system in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

A continuum of media processing devices exist that range from high end with high-speed applicators typically designed to address same sized objects (e.g., packages, parcels, freight, etc.) to the low end printers and/or radiofrequency identifier (RFID) tag encoders manually operated by humans to address a multitude of object sizes. Media, such as labels and/or tags applied manually to objects may be applied inconsistently from object to object and at improper or unwanted locations. Manual application of media to objects is high in labor costs, subject to human error, and time consuming. As used herein, the application or affixing of media to an object is referred to as "labeling" the objects.

Automating the labeling of objects requires the orchestration of several innovations. In automated labelling systems, media can be applied to an object via a robotic device. For example, a system (e.g., an automated system of a warehouse, distribution, transportation center, sorting facility, and the like) may include a media application system that utilizes a robotic device, such as a robotic arm, that is equipped with an end effector in the form of a media applicator that can print and/or apply the media to objects (e.g., via actuation of a tamp of the media applicator). In some instances, a conveyor or other type of object moving system may move objects into a position, such as a media labeling zone, that is within range of the robotic device and/or the media applicator, and the robotic device can be controlled to position the media applicator within the media application zone near the conveyor that is transporting objects. The media labeling zone may be a space (or volume) through which the objects pass on the conveyor. When the object is in or approaching the media labeling zone, the automated labeling system can cause the robotic device to move the media applicator into position and cause the media applicator to apply the media to the object as the object passes through the media labeling zone on the conveyor. Prior to dispensing the media, the media applicator may be configured to print indicia on the media and/or to encode an RFID tag of the media. The indicia printed on the media and/or the information encoded in the RFID tag of the media may be specific to the particular object to which the media is applied or affixed and/or can include other information that is not specific to the particular object to which the media is applied or affixed.

Such automated labeling systems can advantageously improve throughput and/or minimize human intervention in the labeling process. However, in some systems human intervention can be required when the media supply of the media applicator is depleted, and a new media supply needs to be loaded/installed in the media applicator. In order to maintain the quality of applied media, the media consumed by the media applicator can be managed by a tension control system to ensure, e.g., the registration of media is kept within a suitable tolerance. Thus, when the media must be replenished, a human operator typically would mount the core of the media supply on one or more spindles and feed the new supply of media through the media applicator along a media path to ensure the there is tension on the media, which can be tedious, dangerous, and time consuming. To further reduce cost, increase worker safety, and maintain minimum downtime, embodiments of the present disclosure provide systems and processes for autonomous replenishment of the media on the media applicator. To achieve autonomous replenishment of the media, embodiments of the present disclosure can autonomously discard any remnants of the depleted media from the media applicator and can autonomously mount and feed a new supply of media for the media applicator to ensure the media is positioned and tensioned properly within the media applicator so that the print quality is not compromised.

In accordance with embodiments of the present disclosure, a system is disclosed. The system includes a media applicator, a robotic device, and a replenishment system. The media applicator configured to apply media to objects. The robotic device is operatively coupled to the media applicator and is configured to move the media applicator. The media replenishment system is configured to stage a supply of media for installation in the media applicator.

In accordance with embodiments of the present disclosure, which may be used in combination with any other aspect or combination of embodiments listed herein, the media replenishment system includes a media tray configured to hold a plurality of media rolls and a base plate. The base plate includes a gripper head, an extension bar, and a tensioning bar. The gripper head is configured to retrieve a selected one of the plurality of media rolls from the feed tray. The extension bar is configured to pull a length of media from the selected one of the plurality of media rolls. The tensioning bar is configured to tension the selected one of the media rolls to stage the supply of media.

In accordance with embodiments of the present disclosure, which may be used in combination with any other aspect or combination of embodiments listed herein, the gripper head is configured to move between a media presentation position in which a terminal free end of the gripper head extends away from the feed tray and a media acquisition position in which the terminal free end of the gripper head extends towards the feed tray.

In accordance with embodiments of the present disclosure, which may be used in combination with any other aspect or combination of embodiments listed herein, the extension bar and the tensioning bar are configured to move between a first position and a second position to pull and apply tension to the supply of media.

In accordance with embodiments of the present disclosure, which may be used in combination with any other aspect or combination of embodiments listed herein, the media replenishment system includes a panel and a bracket operatively coupled to the panel. At least one shaft extends from the bracket and is configured to support at least a portion of the supply of media.

In accordance with embodiments of the present disclosure, which may be used in combination with any other aspect or combination of embodiments listed herein, the at least one shaft includes a pair of shafts that are arranged on the panel to align with a media payout spindle and a media take-up spindle.

In accordance with embodiments of the present disclosure, which may be used in combination with any other aspect or combination of embodiments listed herein, the supply of media is held by a cartridge and the cartridge is configured to be operatively coupled to the at least one shaft.

In accordance with embodiments of the present disclosure, which may be used in combination with any other aspect or combination of embodiments listed herein, the supply of media is a media roll having a media core about which the media is wound and a take-up core to which a terminal end of a liner of the media is attached and a cartridge separates the media core from the take-up core by a specified distance and applies tension along a length of media extending between the media core and the take-up core.

In accordance with embodiments of the present disclosure, which may be used in combination with any other aspect or combination of embodiments listed herein, the replenishment system includes a hopper configured to store a plurality of media rolls in a stacked configuration. A hopper outlet presents a selected one of the plurality of media rolls as the supply of media for installation in the media applicator.

In accordance with embodiments of the present disclosure, which may be used in combination with any other aspect or combination of embodiments listed herein, the supply of media is a media roll having a media core about which the media is wound and a take-up core to which a terminal end of a liner of the media is attached. A cartridge separates the media core from the take-up core by a specified distance and applies tension along a length of media extending between the media core and the take-up core.

In accordance with embodiments of the present disclosure, which may be used in combination with any other aspect or combination of embodiments listed herein, the supply of media is a media roll having a media core about which the media is wound and a take-up core to which a terminal end of a liner of the media is attached.

In accordance with embodiments of the present disclosure, which may be used in combination with any other aspect or combination of embodiments listed herein, a cartridge separates the media core from the take-up core by a specified distance and applies tension along a length of media extending between the media core and the take-up core.

In accordance with embodiments of the present disclosure, which may be used in combination with any other aspect or combination of embodiments listed herein, the robotic device configured to move the media applicator to a receptacle. The media applicator is configured to autonomously discard media components remaining in the media applicator into the receptacle after media is depleted.

In accordance with embodiments of the present disclosure, which may be used in combination with any other aspect or combination of embodiments listed herein, a rod disposed adjacent to the receptacle. The media applicator autonomously interacts with the rod to remove the media components remaining in the media applicator after the media is depleted and cause the media components to be received by the receptacle.

In accordance with embodiments of the present disclosure, which may be used in combination with any other aspect or combination of embodiments listed herein, the media components remaining in the media applicator after media is depleted include a media cartridge and the media applicator is positioned by the robotic device so that the rod engages the frame to remove the frame from the media applicator.

In accordance with embodiments of the present disclosure, which may be used in combination with any other aspect or combination of embodiments listed herein, the media applicator includes a media outlet, a printhead, a platen assembly including a platen roller, a media payout spindle, a take-up spindle, and a dancer arm.

In accordance with embodiments of the present disclosure, which may be used in combination with any other aspect or combination of embodiments listed herein, the platen assembly is configured to move between a media processing position in which the platen roller and the printhead are configured to form a nip and a media loading position in which the platen assembly is positioned to facilitate installation of the supply of media in the media applicator.

In accordance with embodiments of the present disclosure, which may be used in combination with any other aspect or combination of embodiments listed herein, the platen assembly is positioned between the media payout spindle and the take-up spindle when the platen assembly is in the media loading position.

In accordance with embodiments of the present disclosure, which may be used in combination with any other aspect or combination of embodiments listed herein, the dancer arm is rotatable about an axis of rotation to move between the media processing position and the media loading position, wherein the dancer arm is disposed adjacent to the platen assembly in the media loading position.

In accordance with embodiments of the present disclosure, which may be used in combination with any other aspect or combination of embodiments listed herein, the supply of media is received on the media payout spindle and the take-up spindle and a length of media extends about the platen assembly and the dancer arm when the platen assembly and the dancer arm are in the media loading position.

In accordance with embodiments of the present disclosure, which may be used in combination with any other aspect or combination of embodiments listed herein, in response to the supply of media being installed in the media applicator, the platen assembly and the dancer arm move to the media processing position to position a portion of the length of media between the nip and to maintain tension on the length of media along a media path.

In accordance with embodiments of the present disclosure, which may be used in combination with any other aspect or combination of embodiments listed herein, the platen assembly and the dancer arm are moveable between a media processing position and a media loading position, the platen assembly and the dancer arm moving towards each when transitioning to the media loading position and moving away from each other when transitioning to the media processing position.

In accordance with embodiments of the present disclosure, which may be used in combination with any other aspect or combination of embodiments listed herein, the take-up spindle and the platen assembly are moveable between a media processing position and a media loading position.

In accordance with embodiments of the present disclosure, which may be used in combination with any other aspect or combination of embodiments listed herein, the take-up spindle and the platen assembly move towards each when transitioning to the media loading position and move away from each other when transitioning to the media processing position.

In accordance with embodiments of the present disclosure, which may be used in combination with any other aspect or combination of embodiments listed herein, a system controller is in communication with the media applicator and the robotic device. The system controller controls the robotic device to position the media applicator adjacent to the media replenishment system and controls the media applicator to prepare for installation of the supply of media.

In accordance with embodiments of the present disclosure, which may be used in combination with any other aspect or combination of embodiments listed herein, the media applicator includes a housing having an access door and the system controller controls the media applicator to open an access door as the media applicator is moved towards the media replenishment system or in response to the media applicator being positioned adjacent to the media replenishment system.

In accordance with embodiments of the present disclosure, which may be used in combination with any other aspect or combination of embodiments listed herein, the media applicator includes a sensor that outputs a signal corresponding to an amount of media remaining in the media applicator.

In accordance with embodiments of the present disclosure, which may be used in combination with any other aspect or combination of embodiments listed herein, the system controller is configured to receive the signal output by the sensor; determine, based on the signal, that the media has been depleted or that less than a specified amount of media remains in the media applicator; and control the robotic device to move the media applicator to the media replenishment system in response determining that the media has been depleted or that less than a specified amount of media remains in the media applicator.

In accordance with embodiments of the present disclosure, which may be used in combination with any other aspect or combination of embodiments listed herein, the media applicator includes a logic circuit and the logic circuit receives the signal output by the sensors and determines, based on the signal, that the media has been depleted or that less than a specified amount of media remains in the media applicator.

In accordance with embodiments of the present disclosure, which may be used in combination with any other aspect or combination of embodiments listed herein, the logic circuit communicates with the controller to indicate that the media has been depleted or that less than a specified amount of media remains in the media applicator.

In accordance with embodiments of the present disclosure, a method is disclosed. The method includes determining that a supply of media in a media applicator has been depleted. The media applicator is operatively coupled to a robotic device. The method also includes moving the media applicator via the robotic device to interface with a media replenishment system. The media replenishment system is configured to present a staged supply of media for installation in the media applicator. The method also includes receiving the staged supply of media in the media applicator.

In accordance with embodiments of the present disclosure, a non-transitory computer-readable medium is disclosed. The non-transitory computer-readable medium stores instructions, wherein execution of the instructions by a processor causes the processor to determine that a supply of media in a media applicator has been depleted. The media applicator is operatively coupled to a robotic device. Execution of the instructions by the processor further causes the processor to move the media applicator via the robotic device to interface with a media replenishment system. The media replenishment system is configured to present a staged supply of media for installation in the media applicator. Execution of the instructions by the processor also cause the processor to cause the media applicator to receive the staged supply of media.

In accordance with embodiments of the present disclosure, a media applicator is disclosed. The media applicator includes a printhead; a platen assembly including a platen roller; a media payout spindle; a take-up spindle; and a dancer arm. The platen assembly and at least one of take-up spindle or the dancer arm are moveable between a media loading position for receiving a supply of media and a media processing position in which the printhead and the platen roller for a nip.

In accordance with embodiments of the present disclosure, which may be used in combination with any other aspect or combination of embodiments listed herein, the platen assembly and the at least one of the take-up spindle or the dancer arm move towards each other when transitioning to the media loading position and move away from each other when transitioning to the media processing position.

In accordance with embodiments of the present disclosure, which may be used in combination with any other aspect or combination of embodiments listed herein, the platen assembly and the dancer arm are moveable and the platen assembly and the dancer arm are positioned adjacent to each other in the media loading position.

In accordance with embodiments of the present disclosure, which may be used in combination with any other aspect or combination of embodiments listed herein, the platen assembly and the dancer arm are positioned between the media payout spindle and the take-up spindle in the media loading position.

In accordance with embodiments of the present disclosure, which may be used in combination with any other aspect or combination of embodiments listed herein, the platen assembly and the take-up spindle are moveable and the platen assembly and the take-up spindle are positioned adjacent to each other in the media loading position.

In accordance with embodiments of the present disclosure, which may be used in combination with any other aspect or combination of embodiments listed herein, the media applicator further includes a housing. The platen assembly and the take-up spindle are contained within the housing in the media processing position and extend out of the housing in the media loading position.

In accordance with embodiments of the present disclosure, which may be used in combination with any other aspect or combination of embodiments listed herein, the media applicator includes a first motor operatively coupled to the paten assembly, a second motor operatively coupled to the at least one of the dancer arm or a take-up assembly that includes the take-up spindle, and a logic circuit operatively coupled to the first and second motors, the logic circuit controls the first and second motors to move the platen assembly and the at least one of the dancer arm or the take-up assembly between the media loading position and the media processing position.

In accordance with embodiments of the present disclosure, which may be used in combination with any other aspect or combination of embodiments listed herein, the media applicator includes a first drive train operatively coupling the first motor to the platen assembly and a second drive train operatively coupling the second motor to the at least one of the take-up assembly or the dancer arm.

In accordance with embodiments of the present disclosure, which may be used in combination with any other aspect or combination of embodiments listed herein, the media applicator includes a sensor configured to monitor media remaining in the media applicator and to output a signal corresponding to the media remaining. The processor is configured to receive the signal from the sensor and to determine that the media has been depleted or that less than a specified amount of media is remaining.

In accordance with embodiments of the present disclosure, which may be used in combination with any other aspect or combination of embodiments listed herein, the processor outputs a media depleted signal in response to determining that the media has been depleted or that less than a specified amount of media is remaining.

In accordance with embodiments of the present disclosure, which may be used in combination with any other aspect or combination of embodiments listed herein, in response to determining that the media has been depleted or that less than a specified amount of media is remaining, the processor controls the first and second motors to move the platen assembly and the dancer arm to the media loading position.

In accordance with embodiments of the present disclosure, a method is disclosed. The method includes determining that a supply of media in a media applicator has been depleted. The media applicator is operatively coupled to a robotic device. The method also includes moving a platen assembly and at least one of a dancer arm or a take-up spindle of the media applicator from a print position to a media loading position; receiving a staged supply of media in the media applicator; and moving the platen assembly and the at least one of the dancer arm or the take-up spindle of the media applicator from the media loading position to the print position.

In accordance with embodiments of the present disclosure, a non-transitory computer-readable medium storing instructions is disclosed. Execution of the instructions by a processor causes the processor to determine that a supply of media in a media applicator has been depleted. The media applicator is operatively coupled to a robotic device. Execution of the instructions by a processor causes the processor to move a platen assembly and at least one of a dancer arm or a take-up spindle of the media applicator from a print position to a media loading position; receive a staged supply of media in the media applicator; and move the platen assembly and the at least one of the dancer arm or the take-up spindle of the media applicator from the media loading position to the print position.

In accordance with embodiments of the present disclosure, a media replenishment system is disclosed. The media replenishment system includes a media tray configured to hold media rolls and includes a base plate. The base plate includes a gripper head, an extension bar, and a tensioning bar. The gripper head is configured to retrieve a selected one of the media rolls from the feed tray. The extension bar is configured to pull a length of media from the selected one of the media rolls. The tensioning bar is configured to tension the selected one of the media rolls forming a tensioned supply of media.

In accordance with embodiments of the present disclosure, which may be used in combination with any other aspect or combination of embodiments listed herein, the gripper head is configured to move between a media presentation position in which a terminal free end of the gripper head extends away from the feed tray and a media acquisition position in which the terminal free end of the gripper head extends towards the feed tray.

In accordance with embodiments of the present disclosure, which may be used in combination with any other aspect or combination of embodiments listed herein, the extension bar and the tensioning bar are configured to move between a first position and a second position to pull and apply tension to the tensioned supply of media.

In accordance with embodiments of the present disclosure, a method is disclosed. The method includes retrieving, via gripper head, a selected one of media rolls from a feed tray; pulling, via an extension bar, a length of media from the selected one of the plurality of media rolls; and tensioning, via a tensioning bar, the selected one of the media rolls forming a tensioned supply of media.

In accordance with embodiments of the present disclosure, a non-transitory computer-readable medium storing instructions is disclosed. Execution of the instructions by a processor causes the processor to retrieve a selected one of a plurality of media rolls from a feed tray with a gripper head; pull a length of media from the selected one of the plurality of media rolls with an extension bar; and tension the selected one of the media rolls with a tensioning bar to form a tensioned supply of media.

In accordance with embodiments of the present disclosure, a media replenishment system is disclosed. The media replenishment system includes a hopper and a hopper outlet. The hopper is configured to store a plurality of media rolls in a stacked configuration. The hopper outlet presents a selected one of the media rolls as a supply of media for installation in the media applicator. Upon removal of the selected one of the media rolls from the hopper, a next one of the media rolls moves into position at the hopper outlet.

In accordance with embodiments of the present disclosure, which may be used in combination with any other aspect or combination of embodiments listed herein, the selected one of the media rolls has a media core about which the media is wound and a take-up core to which a terminal end of a liner of the media is attached. A cartridge separates the media core from the take-up core by a specified distance such that a length of media extends between the media core and the take-up core.

In accordance with embodiments of the present disclosure, a media replenishment system is disclosed. The media replenishment system incudes a panel and brackets operatively coupled to the panel. Each bracket includes at least one shaft extending from the bracket. The at least one shaft is configured to stage a supply of media.

In accordance with embodiments of the present disclosure, which may be used in combination with any other aspect or combination of embodiments listed herein, the at least one shaft includes a pair of shafts that are arranged on the panel to align with a media payout spindle and a media take-up spindle of a media applicator.

In accordance with embodiments of the present disclosure, which may be used in combination with any other aspect or combination of embodiments listed herein, the supply of media is held by a cartridge and the cartridge is configured to be operatively coupled to the at least one shaft.

In accordance with embodiments of the present disclosure, which may be used in combination with any other aspect or combination of embodiments listed herein, the supply of media is a media roll having a media core about which the media is wound and a take-up core to which a terminal end of a liner of the media is attached. A cartridge separates the media core from the take-up core by a specified distance such that a length of media extending between the media core and the take-up core, the cartridge is configured to be operatively coupled to the at least one shaft.

In accordance with embodiments of the present disclosure, a supply of media is disclosed. The supply of media includes a core, media wrapped about the core to form a media roll, and a media installation feature formed at a free terminal end of the media to aid in installation of the media in a media processing device.

In accordance with embodiments of the present disclosure, which may be used in combination with any other aspect or combination of embodiments listed herein, the media installation feature comprises a spindle.

In accordance with embodiments of the present disclosure, which may be used in combination with any other aspect or combination of embodiments listed herein, the media installation feature comprises a spindle and a flap extending from the spindle.

In accordance with embodiments of the present disclosure, which may be used in combination with any other aspect or combination of embodiments listed herein, the media installation feature comprises a pull tab.

In accordance with embodiments of the present disclosure, which may be used in combination with any other aspect or combination of embodiments listed herein, the pull tab includes at least one hole.

FIG. 1 illustrates an example autonomous media application system 100 and an example management system 150 in accordance with embodiments of the present disclosure. The media application system 100 includes a system controller 102, one or more cameras **104*a* and/or one or more sensor 104*b* (e.g., proximity sensors, optical sensors, inertial sensors, etc.), a docking station 106, one or more end effectors in the form of media applicators 108*a-b* (collectively 108), one or more robotic devices 110 and 120, e.g., in the form of robotic arms, and a media replenishment system 112. The system controller 102 can include a processor, memory, communication interfaces, I/O interfaces, and/or other components to perform the operations and/or function described herein. Embodiments of the media application system 100 may include multiple media applicators 108 and/or multiple robotic devices 110 and 120 to reduce or prevent downtime and/or a likelihood of a shutdown of the media application system 100**.

As shown in FIG. 1, objects 114 may be conveyed by a conveyor 116 into a media labeling zone 118, within which the media application system 100 may autonomously apply media to the objects 114 via one of the media applicators 108. In some implementations, the conveyor 116 may be associated with and/or form part of the media application system 100. In such a case, the media application system 100 may control a speed and/or direction of the conveyor 116, e.g., via the controller 102, in order to control a speed and/or direction of objects 114 on the conveyor 116.

The docking station 106 can store the media applicators 108 and/or can present one or more of the media applicators 108 to the robotic device 110, such as a robotic arm, which can be controlled (e.g., by the controller 102) to connect to one of the media applicators 108. For example, the robotic device 110 can be attached to the media applicator **108*a* while the media applicator 108*b* remains in the docking station 106. In some implementations there may be single media applicator 108*a* and the system 100 may be devoid of the docking station 106 or may include the docking station 106 for storing the media applicator 108*a* when the media applicator 108*a* is not being used by the media application system 100. For embodiments that include the docking station 106, the docking station 106 can be include or be associated with the robotic device 120, such as a robotic arm, separate from the robotic device 110, that can be controlled to store the media applicators 108, present the media applicators 108 to the robotic device 110 for attachment to the robotic device 110, and/or to replenish supplies of media in the media applicators 108 via the media replenishment system 112. In some implementations, the docking station 106 and the media replenishment system 112 can be integrated with each other. In some implementations, the docking station 106 may be a static (non-robotic) mechanical structure with electrical interfaces for supporting and communicating with the media applicators 108. While an example embodiment of the docking station 106 has been illustrated as including as being configured to dock multiple media applicators 108, exemplary embodiments of the docking station 106 can be configured to dock a single media applicator such that a separate docking station may be required for each media applicator 108**.

The robotic device 110 can be attached to the media applicators 108 using any suitable technique. As an example, the robotic device 110 can be attached to the media applicator 108*a* via one or more couplers, e.g., mechanical, electrical, and/or electromechanical couplers. The one or more couplers of the robotic device 110 may include one or more electrical terminals that facilitate communication between the robotic device 110 and the media applicator to which the robotic device 110 is attached (e.g., the media applicator 108*a* in the present example). Additionally, or alternatively, the one or more couplers may be configured for transfer of electrical power from the robotic device 110 to one or more components of the attached media applicator 108*a* to power the one or more components.

The robotic device 110 can be autonomously controlled by the controller 102 to move the attached media applicator 108*a* relative to the objects 114 and the media applicator 108*a* can be controlled to print, encode, and/or apply media to the objects 114. For example, the objects 114 can be conveyed by the conveyor 116 through a media labeling zone 118, and the controller 102 can control the robotic device 110 to move the media applicator 108*a* into position to align the media applicator 108*a* with a specified area of the object (e.g., a media receiving area), and can control the media applicator 108*a* to print, encode, and/or apply media to the objects 114 as the objects 114 move along the conveyor 116, e.g., through the media labeling zone 118. The controller 102 can also autonomously control the robotic device 110 to move the applicator 108*a* into position relative to docking station 106 to release the media applicator 108*a* for storage by the docking station 106 and/or to move the media applicator 108*a* into position relative to the media replenishment system 112 to facilitate media replenishment.

Outputs of the one or more cameras 104*a* and/or the one or more sensors 104*b* can be used by the controller 102 of the media application system 100 to autonomously control an operation of the docking station 106, the media applicators 108, the robotic device 110, and/or the replenishment system 112. The one or more sensors 104*b* can be mounted on the docking station 106, the media applicators 108, the robotic device 110, the media replenishment system 112, and/or at other locations. The controller 102 may receive outputs from the one or more sensors 104*b* to determine a position of robotic device 110, a position of the media applicator 108*a* relative to the docking station 106 and/or the media replenishment system 112; and/or to determine a status of the docking station 106, the media applicator 108*a*, the robotic device 110, the media replenishment system 112, the objects 114, and/or the conveyer 116. As another example, the controller 102 of the media application system 100 may receive images (or video that includes multiple image frames) of the objects 114 being conveyed on the conveyor 116 from the one or more cameras 104*a* and/or may receive images of a position of the media applicator 108*a* and/or the robotic device 110. In some implementations, the one or more cameras 104*a* can be mounted at various locations throughout the physical environment within which the media application system 100 is implemented. For example, one of the cameras 104*a* may be mounted to a support structure (e.g., a gantry) of the conveyor 116, the docking station 106, the applicators 108, the robotic device 110, and/or the media replenishment system 112. As one example, one of the cameras 104*a* may be mounted to the media applicator 108*a* in order to permit the controller 102 of the media application system 100 to monitor a portion of the conveyor 116, track positions of the objects 114 on the conveyor 116, track a position of the media applicator 108*a*, e.g., to align the media applicator 108*a* with objects 114 to facilitate labeling the objects 114 and/or to align the media applicator 108*a* with the media replenishment system 112 to facilitate autonomous reloading of the media applicator(s) 108 with media supplies 122 managed by the media replenishment system 112. The one or more cameras 104*a* may be configured to stream images depicting a portion of the conveyor 116 that receives the objects 114 before the objects 114 reach the media labeling zone 118 on the conveyor 116. In this way, via the streamed images, the media application system 100 may monitor the conveyor 116 to detect the incoming objects 114 that are to receive media from one of the media applicators 108.

The controller 102 of the media application system 100 may process the images of the objects 114 captured by the camera(s) 104*a* using an image processing model that is configured to identify one or more characteristics of the object (e.g., positions of the objects 114 on the conveyor 116, sizes of the objects 114, shapes of the objects 114, types of the objects 114, identifiers of the objects 114, and/or media receiving areas on the objects 114, among other characteristics). The position of the objects 114 (which may be referred to herein as "object positions") may include or be defined by an orientation of the object (e.g., relative to a center axis or other reference point of the conveyor, relative to a location of the camera, and/or relative to a location of the robotic arm), and/or a location of the objects 114 on the surface of the conveyor 116 (e.g., relative to a reference point of the conveyor, relative to a location of the camera, and/or relative to a location of the robotic arm). The image processing model may utilize any suitable computer vision technique to identify the object within the image and/or determine one or more characteristics of the object as described herein. For example, a computer vision technique of the image processing model may include one or more of an image recognition technique (e.g., an Inception framework, a ResNet framework, and/or a Visual Geometry Group (VGG) framework), an object detection technique (e.g., a Single Shot Detector (SSD) framework, and/or a You Only Look Once (YOLO) framework), an object in motion technique (e.g., an optical flow framework), an optical character recognition technique, among other examples.

In some implementations, the image processing model can be executed by the controller 102 to analyze the one or more images to detect specific and/or unique characteristics associated with a particular object. For example, because individual objects may be configured to receive different labels (rather than a same label being applied to every object), the objects may include an object identifier, such as a text identifier, a barcode, or other unique marking that is known and/or associated with the label application system and/or label management system. As an example, a first one of the objects 114 may be identified by an object identifier "1-X," and a second one of the objects 114 may be identified by an object identifier "2-Z." In some implementations, the individual characters may be associated with certain mappings and/or codes that can be interpreted by the controller 102 to identify content that is to be printed on media to be applied or affixed to the objects 114, to identify a type of media that is to be applied to the objects 114, to identify a type of media applicator that is to be selected for the objects 114, and so on. Accordingly, the media application system 100 using the image processing model can identify and/or detect object identifiers on objects depicted in the images.

The media application system 100 may receive instructions from the management system 150. The instructions may indicate content that is to be printed on and/or encoded the media by one or more of the media applicators 108 (e.g., the media applicator 108*a* in the present example). In some implementations, the instructions may be different for each of the objects 114 or may be the same for multiple objects 114. As an example, the instructions may be the same for all objects 114 or a set of objects 114. As another example, the media application system 100 may receive individual instructions for individual objects 114 (or types of objects) that are being conveyed by the conveyor 116. For example, the instructions may indicate that one of the objects 114 that has a particular characteristic (e.g., a particular identifier or is a particular type) is to receive media with corresponding content. Accordingly, based on identifying and/or detecting an object identifier of the particular one of the objects 114, the media application system 100 may determine content that is associated with the object identifier to permit the media application system to print the content to media and/or encode the content in an RFID tag of the media and subsequently apply the media to the particular one of the objects.

In one example, embodiments of the media applicators 108 can be media processing device configured to process (e.g., print, encode, etc.) media by drawing the media from the media source and routing the media proximate to various media processing components (e.g., printhead(s), RFID/NFC reader/encoder, magnetic stripe reader/encoder, etc.). Processing the media from the media source may facilitate a continuous or batch printing and/or encoding process. As an example, embodiments of media applicator 108*a* may be configured to print and/or encode media drawn from a media source, such as a roll of media, installed in the media applicator 108*a*. The media may include a continuous web such as a spool of lined or linerless media. As a non-limiting example, the continuous web of media can be coated on one surface with a pressure sensitive adhesive and can include a printable surface on the opposite surface. For lined media, the media can include a release liner overlaying the adhesive that can be removed to expose the adhesive when the media is output from the media processing devices and/or when the media will be affixed to an object. For linerless media, the media is devoid of the release liner. For thermal transfer printing, the printable surface of the linerless media is configured to receive a pigment (e.g., ink, resin, wax-resin, etc.) that is transferred from a ribbon supply. For direct thermal printing, a thermal printhead of the media applicator directly contacts the printable surface triggering a chemical and/or physical change in a thermally sensitive dye covering and/or embedded in at least a portion of the printable surface of the media. In addition, or in the alternative, the media can include a radiofrequency identification device (RFID) or near-field communications (NFC) inlay that can be written to and/or read by a RFID/NFC encoder.

The web of media is routed along a media path in the media applicator 108*a* from the media supply to a print and/or encoding position located adjacent to the printhead (e.g., a thermal printhead) and/or the RFID/NFC encoder. The position of components of the media applicator 108*a* relative to other components can be defined based on the flow of media along the media path from the media source to the outlet and/or a take-up spindle. For example, the media source installed in the media applicator 108*a* is upstream of the printhead, the printhead is downstream of the media source (the web of media), and the outlet of the media applicator 108*a* is downstream of the media source and the printhead along the media path. The continuous web of media can be pulled through the media path by a driven platen roller. The printhead is generally configured to form a nip with the platen roller to pinch the media between the printhead and the platen roller. In addition to pulling the media, or in the alternative, this pinching or compressive force aids in achieving adequate print quality. Once printed and/or encoded, the printed and/or encoded portion of the media can be advanced outwardly from the printer through a media outlet by the platen roller where it can be cut and/or torn to separate the printed and/or encoded media from the media supply. For media that includes a liner, the media processing device can also include a peeler downstream of the nip formed by the printhead and the platen roller. The peeler can separate the liner from the media such that the media is output from the media processing device with the adhesive of the media exposed, while the liner can be wound on the take-up spindle.

During use of the media applicator 108*a* by the media applicator system 100, the media applicator 108*a* and/or the controller 102 can be configured to determine that the supply of media in the media applicator 108*a* is depleted or will be depleted soon (e.g., an amount of media remaining in media applicator 108*a* is less than a specified amount of media). The media applicator 108*a* and/or the controller 102 can determine that the supply of media is depleted or will soon be depleted using any suitable techniques. As one example, the media applicator 108*a* can include one or more sensors 104*b* configured to detect when the supply of media is depleted or will soon be depleted and can output a signal to the controller 102. As another example, a quantity of the media remaining can be calculated or estimated based on, for example, on an initial quantity of media loaded into the media applicator 108*a*, and a quantity of media that has been dispensed by the media applicator 108*a*, which may be based determined on one or more of a number of print jobs executed by the media applicator 108*a*, a number of revolution of a payout spindle of the media applicator 108*a* (e.g., steps of a stepper motor, measured by a rotary encoder, etc.), a print speed, a starting diameter of a media roll, a thickness of the media, a length of media units dispensed by the media applicator 108*a*, and/or other information.

When the media applicator 108*a* and/or controller 102 determines that the supply of media is depleted or will be depleted soon (or in some scenarios when different media is required) the controller 102 can control the robotic device 110 to move the media applicator, e.g., media applicator 108*a*, to the docking station 106 (e.g., for embodiments in which the docking station 106 is configured to facilitate installation of media in the media applicator 108*a*) or to the media replenishment system 112 to facilitate installation of the media in the media applicator 108*a*. As an example, the controller 102 can control the robotic device 110 and/or the media applicator 108*a* to autonomously discard the remaining media, media core(s), and/or media frames/cartridges from the media applicator 108*a* and to autonomously install a new supply of media into media applicator 108*a* via an interaction with the media replenishment system 112. Alternatively, or in addition, for embodiments in which the docking station 106 is configured to facilitate installation of a new supply of media in the media applicators 108 (e.g., via robotic device 120), when the robotic device 110 returns the media applicator 108*a* to the docking station 106, the robotic device 110 can attach to the media applicator 108*b*, which may already have a new supply of media installed therein such that the robotic device 110 does not need to wait for the installation of a new media supply in the media applicator 108*a* and can resume operation with the media applicator 108*b*, which may result in reduced downtime of the media application system 100. The controller 102 can control the robotic device 120 associated with the docking station 106 and/or the media applicator 108*a* to autonomously discard the remaining media, media core(s), and/or media frames/cartridges from the media applicator 108*a* and to autonomously install a new supply of media into media applicator 108*a* via an interaction with the media replenishment system 112. In some implementations, the controller 102 may also control the media replenishment system 112 to stage the supply of media for installation in the media applicator 108*a*. As one example, the media replenishment system 112 can be configured to stage the supply of media to aid in installation of the supply of media in the media applicators 108.

In one example, the supply of media to be installed in the media applicator 108*a* can include a media roll wound about a first core. In some instances, for example for media with a liner, the supply of media can include a second core that is attached to a terminal end of a liner of the media. During operation as the media is output by the media applicator 108*a*, the liner can be separated from the media (e.g., by the peeler) and wound about the second core. For media that is devoid of a liner (linerless media), the media may be devoid of the second core. When a new supply of media is installed into the media applicator 108*a*, the first core of the supply of media is mounted on a payout spindle of the media applicator 108*a* and the media is routed through the media applicator 108*a* along a media path before the media applicator 108*a* can utilize the supply of media. The media replenishment system 112 can present the supply of media to the media applicator 108*a* such that the first core of the supply of media can be autonomously received by the payout spindle and so that the media can be autonomously routed through the media applicator 108*a* along the media path. For embodiments of the supply of media that include the second core, the media replenishment system 112 can be configured to present the supply of media to the media applicator 108*a* such that the second core of the supply of media can be autonomously received by the take-up spindle of the media applicator 108*a*.

As indicated above, FIG. 1 is provided as an example of a media application system. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
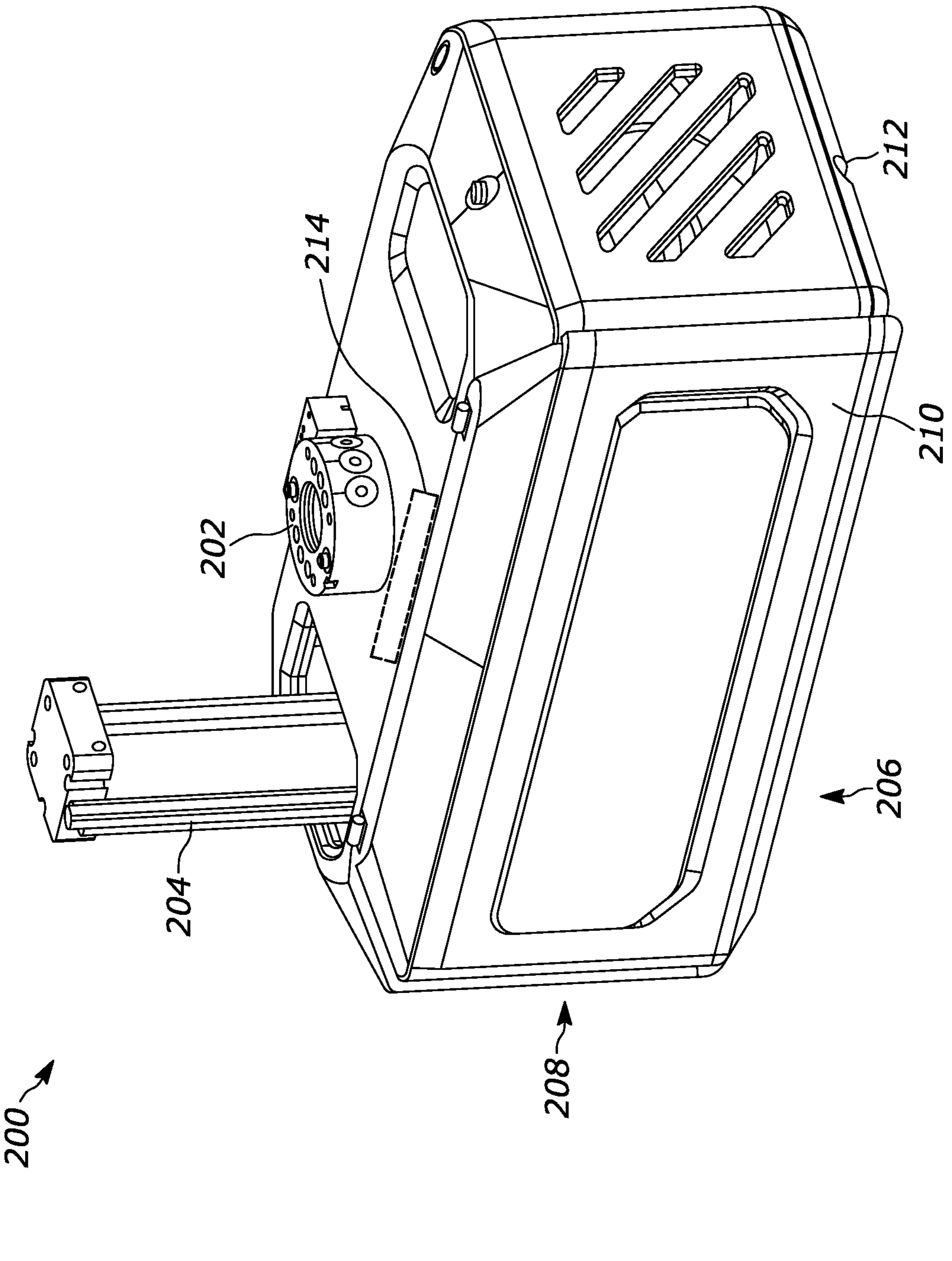
FIG. 2 illustrates an example embodiment of a media applicator in accordance with embodiments of the present disclosure.

FIG. 2 illustrates an example embodiment of a media applicator 200 which can be embodied as one or more of the media applicators 108 shown in FIG. 1, for example, the media applicator 108*a*. As shown in FIG. 2, the media applicator 200 includes a housing 206, an electromechanical coupling 202 and a tamp 204. The tamp 204 may be positioned toward an output side 208 of the media applicator 200 from which a media is output from the media applicator 200. The tamp 204 may be hydraulically actuated (e.g., using an air-powered vacuum generator), pneumatically actuated, and/or electromechanically actuated (e.g., using a motor). In one example, the media applicator 200 includes a media door or other moveable barrier 210 that facilitates access to an interior volume of the media applicator 200 and to components within the media applicator 200 for handling the media during an operation of the media applicator 200 (e.g., a payout roller, a take-up roller, a printhead, an RFID/NFC encoder, a platen roller, a peeler, a cutter, dancer arms, and/or other components of the media applicator 200). In some implementations, the media door 210 may be opened via an actuator 214 of the media applicator 200.

The media applicator 200 includes a dock terminal 212 that is configured to couple with a dock interface 124 of the docking station 106 illustrated in FIG. 1. The dock terminal 212 may enable the controller 102 to communicate with the media applicator 200 and/or supply power to the media applicator 200 via the dock interface and/or the docking station 106. In some implementations, the controller 102 may cause the actuator 214 to automatically open the media door 210 upon the media applicator 200 being returned to a dock of the docking station 106 and/or upon the media applicator 200 receiving power from the dock interface 124 of the docking station 106 via the dock terminal 212 (e.g., to facilitate replenishment of media in the media applicator 200 via the replenishment system 112). In some implementations, the media applicator 200 may include a battery. For example, the battery may store an electric charge that is used to power one or more components of the media applicator 200. The electric charge may be received via the dock terminal 212 when the media applicator 200 is placed in a dock of the docking station 106 and/or may be received via the electromechanical coupling 202 when the media applicator 200 is attached to the robotic arm 110. Alternatively, the media applicator 200 can be devoid of a battery and can receive power from robotic arm 110 via the electromechanical coupling 202 and/or from the docking station 106 via the dock terminal 212.

As indicated above, FIG. 2 is provided as an example of a media applicator. Other examples may differ from what is described with regard to FIG. 2. The number and arrangement of devices/components shown in FIG. 2 are provided as an example. In practice, there may be additional devices/components, fewer devices/components, different devices/components, or differently arranged devices/components than those shown in FIG. 2. Furthermore, two or more devices/components shown in FIG. 2 may be implemented within a single device/component, or a single device/component shown in FIG. 2 may be implemented as multiple, distributed devices/components. Additionally, or alternatively, a set of devices/components (e.g., one or more devices/components) shown in FIG. 2 may perform one or more functions described as being performed by another set of devices/components shown in FIG. 2.

Figure 3:
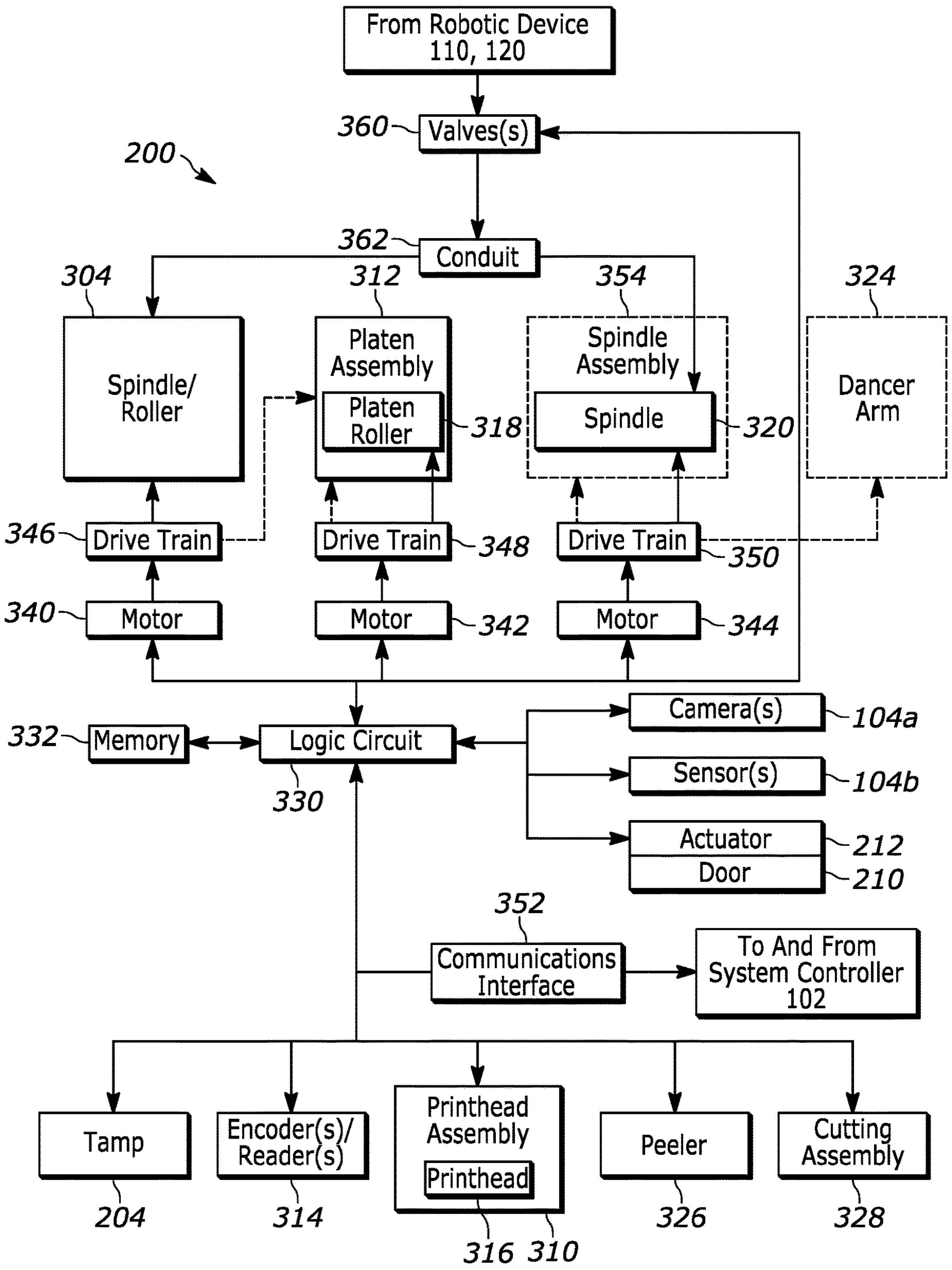
FIG. 3 is a block diagram of an embodiment of the media applicator of FIG. 2 in accordance with embodiments of the present disclosure.

FIG. 3 illustrates an example block diagram for an embodiment of the media applicator 200 that can be embodied as the media applicators 108*a* and/or 108*b* shown in FIG. 1. As shown in FIG. 3, the media applicator 200 can include: a media payout roller or a media supply spindle 304 that can hold or support a media spool or media roll; a printhead assembly 310 including a printhead 316; a moveable platen assembly 312 including a platen roller 318; a RFID/NFC encoder 314; a take-up roller or spindle 320; a dancer arm 324 configured to engage the media at one or more positions along a media path; a peeler 326; a cutting assembly 328; the tamp 204; as well as electronics and drive components including, for example, a logic circuit 330 (e.g., such as a processor, FPGA, ASIC, or other logic circuit); a non-transitory computer-readable medium, e.g., in the form of memory 332; at least one of the one or more of the cameras 104*a*; at least one of the one or more of the sensors 104*b*; motors 340, 342, and/or 344; drive trains 346, 348, and/or 350; a communications interface 352; the actuator 214 operatively coupled to the access door 210; and/or valves 360 operative coupled to conduit 362 and the spindles 304 and/or 320 to output a flow air under pressure from the spindles 304 and/or 320 to aid in discarding remnants of media components after the supply of media has been depleted. In one example, the peeler 326 can form part of the platen assembly 312. In one example, the take-up spindle 320 can be part of a moveable take-up assembly 354 such that, e.g., the take-up spindle is moveable in a direction that is transverse to an axis of rotation of the take-up spindle 320, as described herein. In other examples, the media applicator 200 can be devoid of the moveable take-up assembly 354 such that an axis of rotation of the take-up spindle 320 is generally fixed. The drive trains 346, 348, and/or 350 can include driveshafts, gears, belts, clutches, and/or other components configured to transfer motion from the motors 340, 342, and/or 344 to the spindle 304, the platen roller 318 and/or platen assembly 312, the spindle 320, spindle assembly 354, and/or dancer arm 324.

The logic circuit 330 can send instructions and/or data to and/or receive instructions and/or data from the system controller 102 (e.g., via the communications interface 352). The logic circuit 330 can execute code stored in the memory 332 to control the components of the media applicator 200 to perform one or more media processing functions, for example, in response to instructions and/or data received from the system controller 102. As one example, the logic circuit 330 can execute code in the memory 332 to control a rotation of the media supply spindle 304 about a media supply spindle axis of rotation via the motor 340 and drive train 346, to control a rotation of the platen roller 318 about a platen roller axis of rotation via the motor 342 and the drive train 348, and/or to control a rotation of the take-up spindle 320 about a take-up spindle axis of rotation via the motor 344 and the drive train 350 to process and/or dispense media from the media applicator 200. The logic circuit 330 can also execute code in the memory 332 to write data to and/or read data from RFID/NFC tags in and/or associated with the media using the encoder/readers 314, render indicia on the media using the printhead 316, peel media from a liner using the peeler 326, and/or cut the media using the cutting assembly 328. In one example, the media applicator 200 may be devoid of the logic circuit 330 and a logic circuit (e.g., a processor) of system controller 102 performs the functions and operations of the logic circuit 330 described herein.

The logic circuit 330 can receive signal(s) output by the sensor(s) 104*b* and/or images output by the camera(s) 104*a* and can execute code in the memory 332 to determine, based on the signal(s) and/or image(s), that the media in the media applicator 200 has been depleted or that less than a specified amount of media remains in the media applicator 200. Alternatively, or in addition, the logic circuit 330 can execute code in the memory 332 to determine that the media in the media applicator 200 has been depleted or that less than a specified amount of media remains in the media applicator 200 based on information about the media when it is loaded in the media applicator and information about the consumption of the media by the media applicator 200. As an example, a quantity of the media remaining in the media applicator 200 can be calculated or estimated by the logic circuit 330 based on, for example, on an initial quantity of media loaded into the media applicator 200, and a quantity of media that has been dispensed by the media applicator 200, which may be based on determined on one or more of a number of print jobs executed by the media applicator 200, a number of revolution of the payout spindle 304 (e.g., as determined by a number of steps of the motor 340, as measured by one of the sensors 104*b* in the 3 form of a rotary encoder, etc.), a print speed (e.g., as determined based on a speed at which the platen roller 318 is driven by the motor 342 and drive train 348), a starting diameter of a media roll, a thickness of the media, a length of media units dispensed by the media applicator 200, and/or other information. In response to determining that the media has been depleted or that less than a specified amount of media remains in the media applicator, the logic circuit 330 can communicate with the system controller 102 via the communications interface 352 to indicate that the media has been depleted or that less than a specified amount of media remains in the media applicator 200 and the system controller 102 can control the robotic device to which the media applicator 200 is attached (e.g., the robotic device 110 or 120) to move the media applicator 200 into position to facilitate replenishment of the media via the media replenishment system 112, e.g., shown in FIG. 1.

In another example, the system controller 102 can receive signal(s) output by the sensor(s) 104*b* and/or images output by the camera(s) 104*a* and can determine, based on the signal(s) and/or image(s), that the media has been depleted or that less than a specified amount of media remains in the media applicator 200. In response to determining that the media has been depleted or that less than a specified amount of media remains in the media applicator 200, the system controller 102 can control the robotic device to which the media applicator 200 is attached (e.g., the robotic device 110 or 120) to move the media applicator 200 into position to facilitate replenishment of the media via the media replenishment system 112, e.g., shown in FIG. 1, and can communicate with the media applicator 200 (e.g., the logic circuit 330 via the communications interface 352). In response to the communication from the system controller 102, the logic circuit 330 can be configured to control the media applicator 200 to prepare the media applicator 200 for receiving a supply of media. Alternatively, the system controller 102 can be configured to control the media applicator 200 to prepare the media applicator for receiving a supply of media for embodiments in which the media applicator is devoid of the logic circuit 330.

When a new supply of media will be installed in the media applicator 200 (e.g., when it is determined that the currently loaded supply of media has been or will be depleted or as required based on the objects to be labeled), the logic circuit 330 and/or system controller 102 can control the media applicator 200 to prepare the media applicator 200 for receiving a supply of media by controlling the platen assembly 312 (e.g., via the motor 342 and drive train 348 or motor 340 and drive train 346), the spindle assembly 354 (e.g., via the motor 344 and drive train 350), the dancer arm 324 (e.g., via the motor 344 and drive train 350), and/or the access door 210 (e.g., via the actuator 212) to move from a media processing position, in which the media applicator 200 is configured to print, encode, and/or dispense media, to a media installation position, in which the media applicator 200 is configured to receive a supply of media. As one example, the logic circuit 330 and/or system controller 102 can control the actuator 212 to open the door 210. As another example, the logic circuit 330 and/or system controller 102 can cause the platen assembly 312 to move between the media processing position in which the platen roller 318 and the printhead 316 are configured to form a nip for processing media and a media loading position in which the platen assembly 312 and platen roller is moved away from the printhead assembly 310 and/or the printhead 316 to facilitate installation of a staged supply of media on the spindles 304 and/or 320 and to facilitate a length of media from the staged supply of media passing between the printhead 316 and the platen roller 318. In the media loading position, the platen assembly 312 can be positioned laterally between the media payout spindle 304 and the take-up spindle 320. As another example, the logic circuit 330 and/or the system controller 102 can cause the spindle assembly 354 to move between the media processing position in which the take-up spindle 320 is disposed at a specified first distance away from and/or a first specified position relative to the media supply spindle 304 and the media loading position in which the take-up spindle 320 is disposed at a specified second distance away from and/or a second specified position relative to, the media supply spindle 304 to facilitate installation of the staged supply of media on the spindles 304 and/or 320 and to facilitate a length of media from the staged supply of media passing between the printhead 316 and the platen roller 318. As another example, the logic circuit 330 and/or the system controller 102 can cause the dancer arm 324 to move between the media processing position in which the dancer arm 324 is disposed at a specified first angle relative to, e.g., the take-up spindle 320, and the media loading position in which the take-up spindle 320 is disposed at a specified second angle relative to, e.g., the take-up spindle 320, to facilitate installation of the staged supply of media on the spindles 304 and/or 320 and to facilitate a length of media from the staged supply of media passing between the printhead 316 and the platen roller 318.

After the media applicator 200 is loaded with the supply of media, the logic circuit 330 and/or the system controller 102 can control the platen assembly 312 (e.g., via the motor 342 and drive train 348 or the motor 340 and the drive train 346), the spindle assembly 354 (e.g., via the motor 344 and drive train 350), and/or the dancer arm 324 (e.g., via the motor 344 and drive train 350) to move from a media loading position to the media processing position to route the media under tension along a media path to enable the media applicator to print, encode, and/or dispense media. The logic circuit 330 and/or system controller 102 can also control the door 210 (e.g., via the actuator 212) to move from the open position to the closed position.

As indicated above, FIG. 3 is provided as an example of a media applicator. Other examples may differ from what is described with regard to FIG. 3. The number and arrangement of devices/components shown in FIG. 3 are provided as an example. In practice, there may be additional devices/components, fewer devices/components, different devices/components, or differently arranged devices/components than those shown in FIG. 3. Furthermore, two or more devices/components shown in FIG. 3 may be implemented within a single device/component, or a single device/component shown in FIG. 3 may be implemented as multiple, distributed devices/components. Additionally, or alternatively, a set of devices/components (e.g., one or more devices/components) shown in FIG. 3 may perform one or more functions described as being performed by another set of devices/components shown in FIG. 3.

FIGS. 4A-E illustrate an example arrangement 400 of components in an interior of an embodiment of the media applicator 200 of FIG. 2 and with the housing omitted. As shown in FIGS. 4A-D, a chassis 402 supports at least some of the components for processing a supply of media along the media path 404. For example, the chassis 402 can support the media supply spindle 304 that can hold or support a media spool or media roll (e.g., media 430); the printhead assembly 310 including the printhead 316; the platen assembly 312 including the platen roller 318; the RFID/NFC encoder 314; the take-up roller or spindle 320; the dancer arm 324; the peeler 326; the cutting assembly 328; a dancer arm 424; and media guides 434, as well as the electronics and drive components, e.g., the logic circuit 330; the memory 332; motors 340, 342, and/or 344; and drive trains 346, 348, and/or 350, shown in FIG. 3, which are mounted on an opposite side of the chassis 402. The chassis 402 can also support at least one of the cameras 104*a* and/or at least one of the sensors 104*b* to aid in aligning the media applicator 200 with a media replenishment system (e.g., the media replenishment system 112). The dancer arm 324, the dancer arm 424, and the media guides 434 are configured to engage media 430 at one or more positions along a media path 432. While the example arrangement has been illustrated as being configured for direct thermal printing, embodiments of the present disclosure may alternatively be configured for thermal transfer printing, where the arrangement 400 can include ribbon supply and ribbon take-up spindles configured to support a thermal ink ribbon to facilitate thermal transfer printing.

Figure 4A:
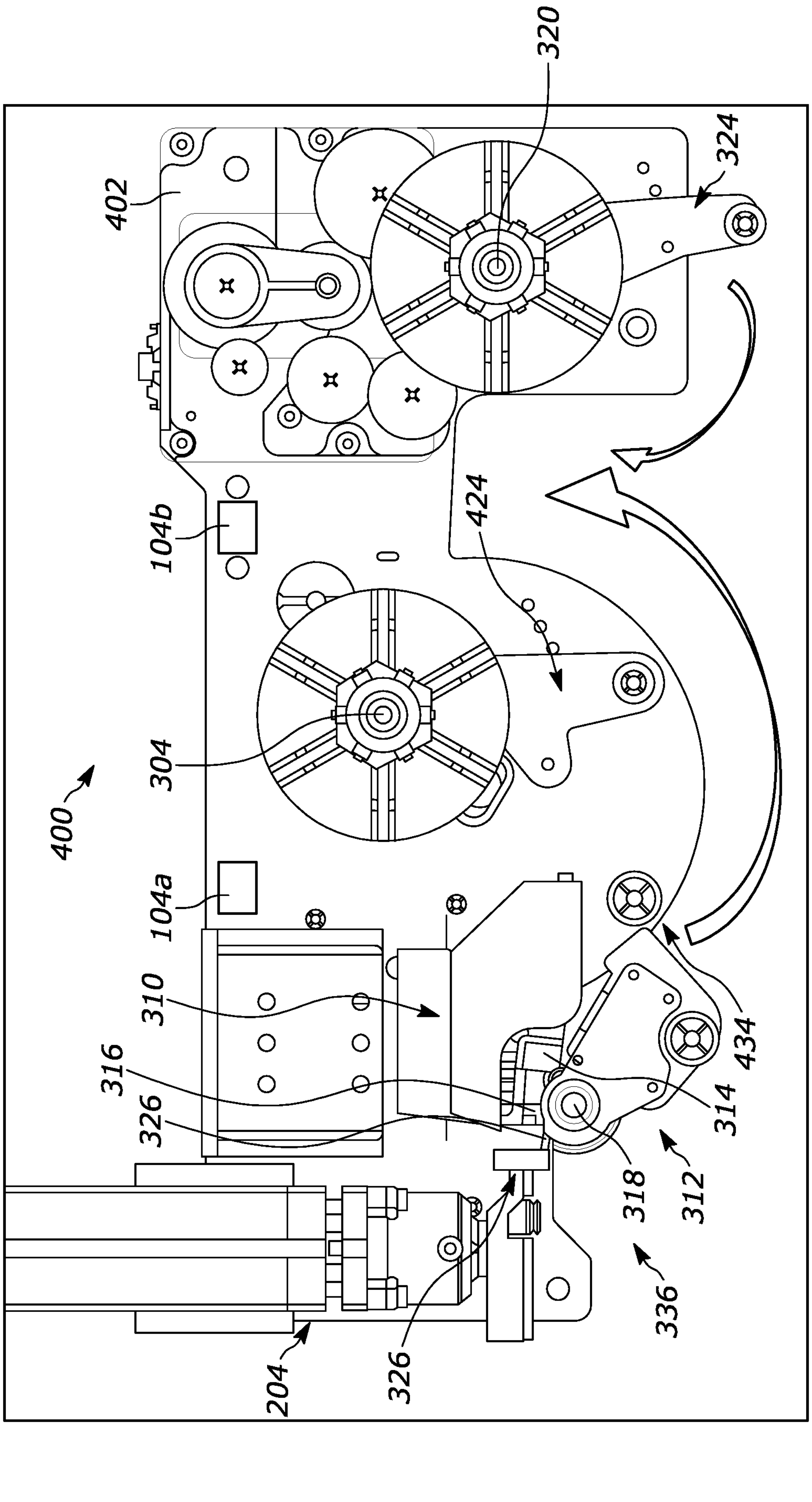
FIGS. 4A-E illustrate an interior arrangement of an embodiment of the media applicator of FIG. 2 with the housing omitted in accordance with embodiments of the present disclosure.
Figure 4B:
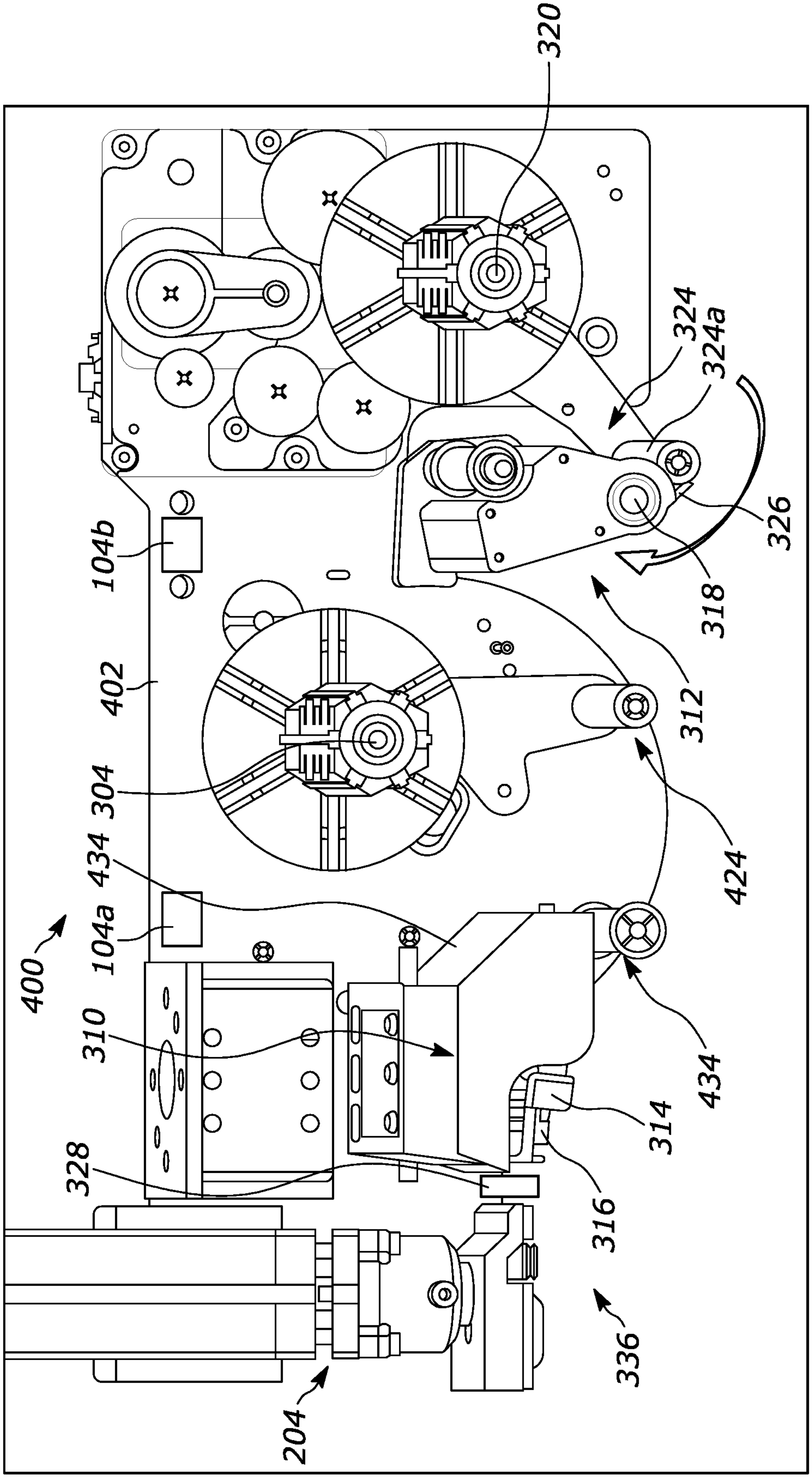

As shown in FIGS. 4A-D, the platen assembly 312 and the dancer arm 324 can move between the media processing position (e.g., shown in FIGS. 4A and 4D) and the media loading position (e.g., shown in FIGS. 4B-C) to facilitate autonomous replenishment of media, e.g., via an interaction with the media replenishment system 112 shown in FIG. 1. As an example, when the platen assembly 312 and the dancer arm 324 are in the media processing position, as shown in FIG. 4A, the platen assembly 312 is positioned so that the printhead 316 and platen roller 318 are opposingly spaced from each other to form a nip and the platen assembly 312 and the dancer arm 324*a* are spaced away from each other. When a new supply of media is to be installed, the platen assembly 312 can be driven (e.g., via motor 342 and drive train 348 or the motor 340 or drive train 346) to move in a first direction (e.g., rearwardly in the orientation shown in FIGS. 4A-B, where the media outlet defines a front of media applicator) and the dancer arm 324 can be driven (e.g., via motor 344 and drive train 350) to move generally in a second direction (e.g., forwardly in the orientation shown in FIGS. 4A-B) such that the platen assembly 312 and the dancer arm 324 move towards each other when moving from the media processing position to the media loading position, as shown in FIG. 4B. When the platen assembly 312 and the dancer arm 324 are in the media loading position, the platen assembly 312 and the dancer arm 324 are positioned adjacent to each other and are disposed laterally (e.g., relative the orientation shown in FIG. 4B) disposed between the media supply spindle 304 and the take-up spindle 320. The platen assembly 312 and the dancer arm 324 can be positioned below the media supply spindle 304 and the take-up spindle 320 (relative to the orientation shown in FIG. 4B).

Figure 4C:
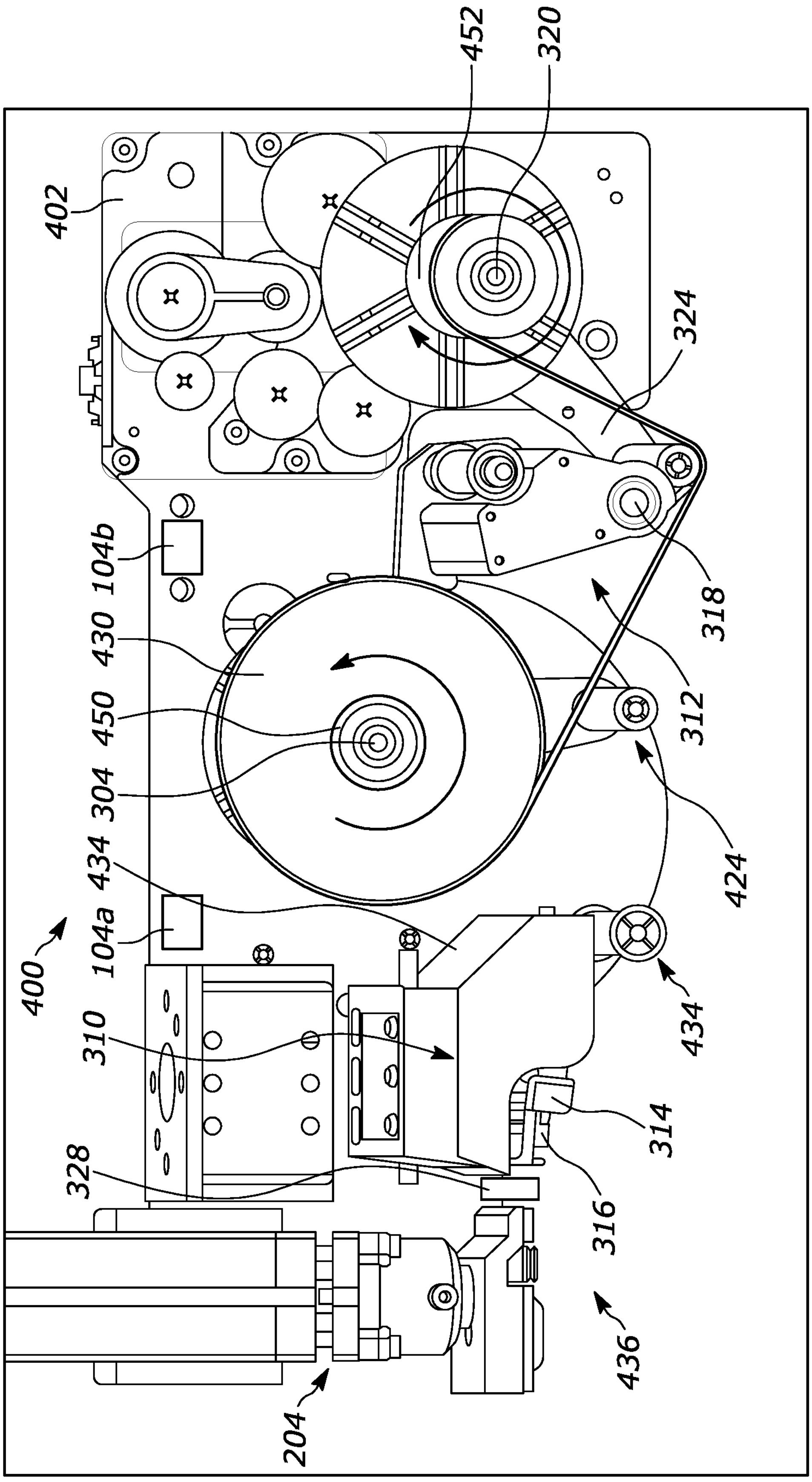
Figure 4D:
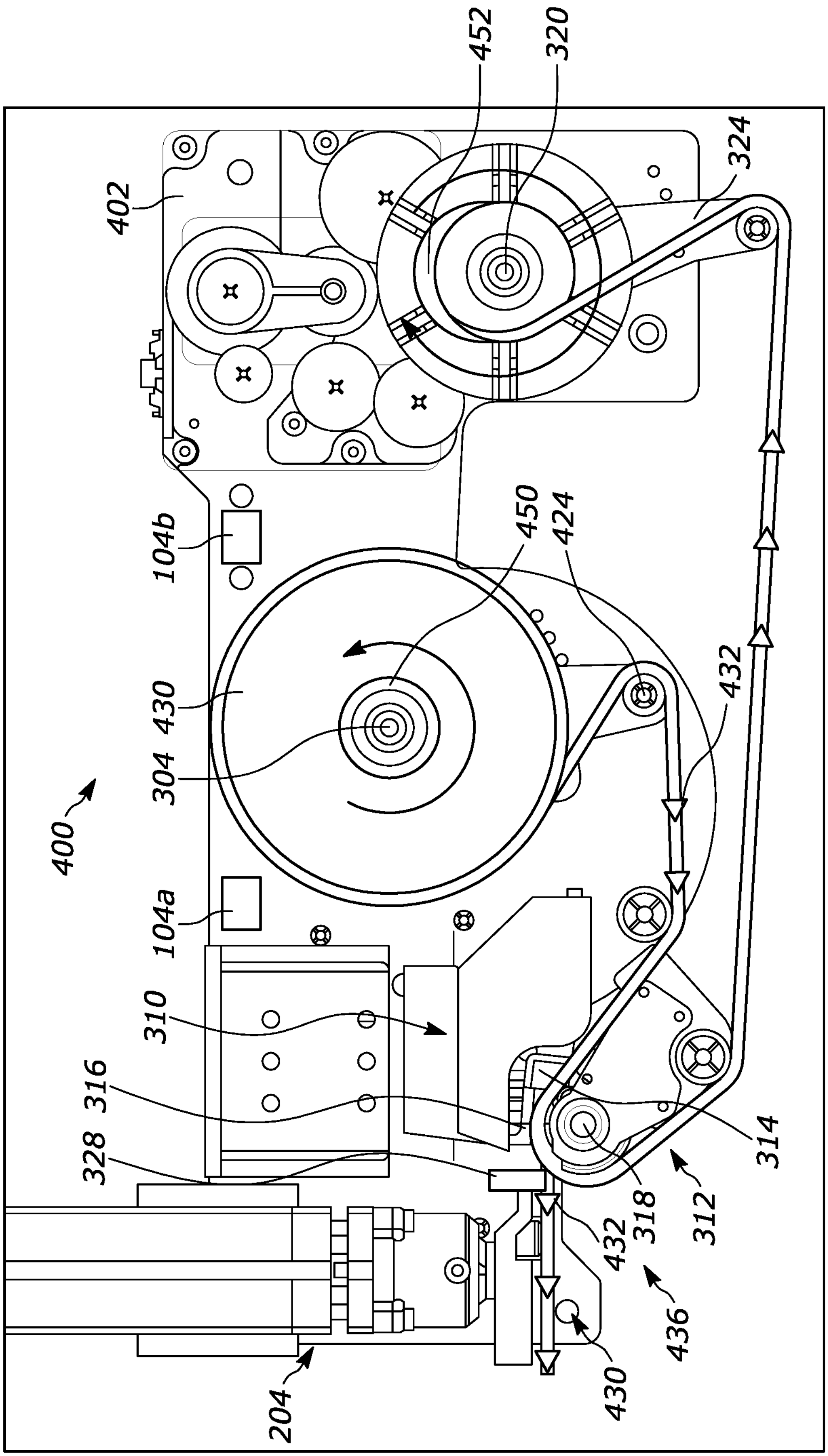
Figure 4E:
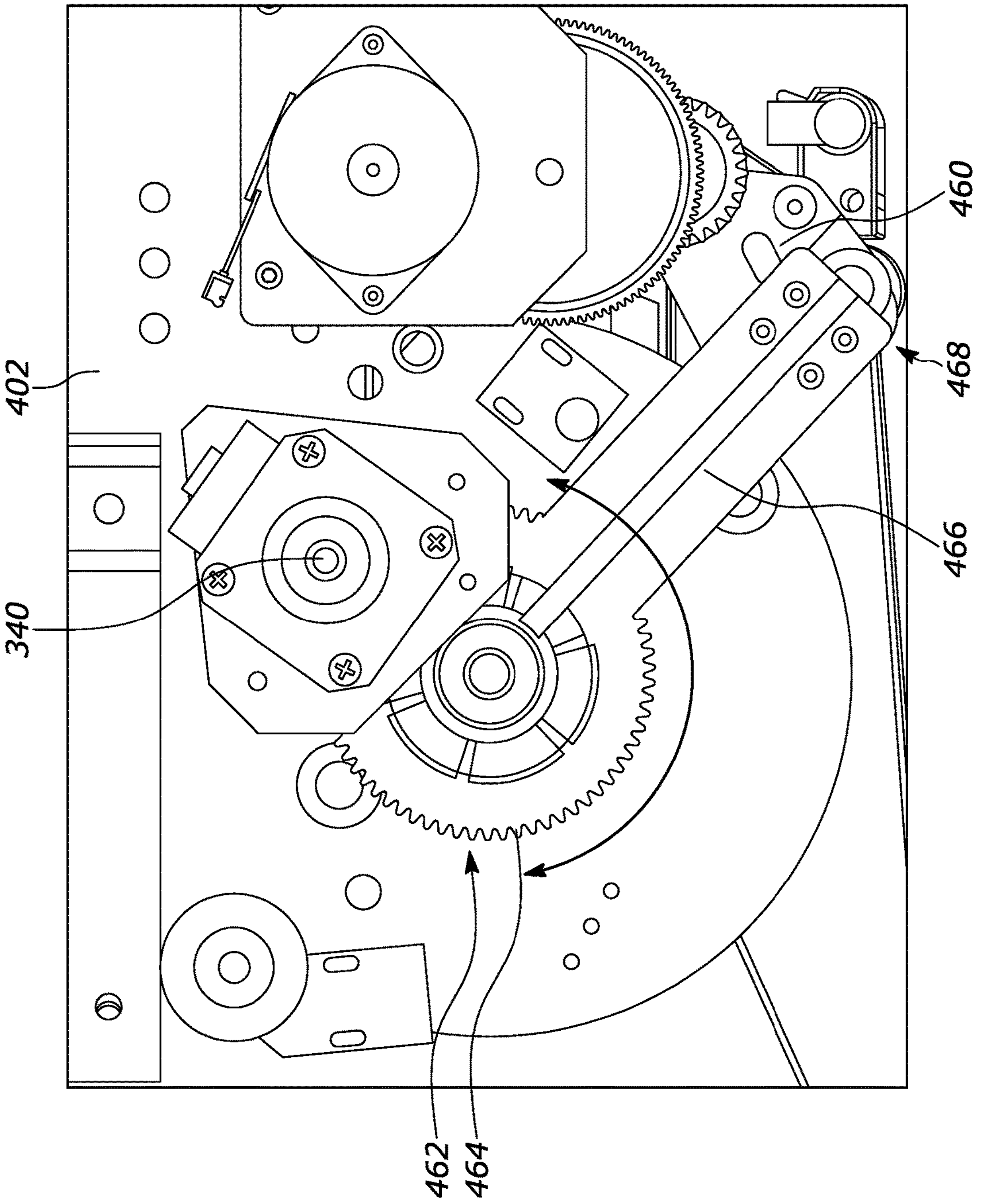

In one example embodiment, as shown in FIG. 4E, the platen assembly 312 can be operatively coupled to a carriage 460, which in turn can be operatively coupled to a portion of the drive train 346 which is driven by the motor 340. The drive train 346 can include a gear 462 having teeth 464 extending circumferential about the gear 462 and a radial shaft 466 extending from the gear 462, where a distal end 468 of the radial shaft 466 is operatively coupled to the carriage 460. The gear 462 can be arranged to coaxially with the media payout spindle 304. When the platen assembly 312 moves between the media processing position and the media loading position, the motor 340 can be operatively coupled to the teeth 464 of the gear 462 to drive the gear 462 causing the shaft 466, carriage 460, and platen assembly 312 to move circumferentially relative to the axis of rotation of the media payout spindle 304 and with a fixed radius relative to the axis of rotation of the media payout spindle 304.

In the media loading position, the media 430 from the media replenishment system 112 can be autonomously received in the media applicator as shown in FIG. 4C. For example, the media 430 can include a media roll wrapped about a first core 450 and a second core 452 can have a terminal end of the media and/or the liner of the media 430 attached thereto. The first core 450 can be received on the media supply spindle 304 and the second core 452 can be received on the take-up spindle 320. The cores 450 and 452 of the media can be secured on the spindles 304 and 320, respectively such that the media generally does not freely rotate relative to the spindles 304 and 320. Rather, the cores 450 and 452 can be "locked" to the spindles 304 and 320, respectively such that the spindles 304 and 320 and the cores 450 and 452 rotate in unison. The media 430 can be staged by and/or on the media replenishment system 112 such that a length of media is dispensed from the media roll prior to the media being received by the media applicator. In one example, the media 430 can also be tensioned such that a specified amount tension is applied to the length of media, where the specified amount of tension can correspond to an amount of tension that will be applied by the media applicator. The length on media can be bent and the first and second cores 450 and 452 can be disposed at a specified distance apart from each other and can be positioned relative to each other to correspond to a specified distance and position of the spindles 304 and 320. The bend in the media 430 can enable the media 430 to be installed in the media applicator such that the length of media extends around or under/below the dancer arm 324 and the platen assembly 312 (relative to the orientation shown in FIG. 4C). After the media 430 is installed in the media applicator, the platen assembly 312 and the dancer 324 can return to the print position (e.g., the platen assembly 312 and dancer arm 324 move away from each other and the platen roller 318 forms the nip with the printhead) as shown in FIG. 4D.

When the platen assembly 312 and the dancer arm 324 return to the media processing position, at least a portion of the media 430 is positioned between the nip formed by the printhead 316 and the platen roller 318 and the media 430 is held in tension along the media path 432 and the media applicator can be controlled to dispense the media 430. For example, the platen roller 318 can be driven by the motor 342, e.g., via the platen drive train 348, to rotate about an axis of rotation of the platen roller 318 (platen axis of rotation) at a specified platen or print speed to pull the media 430 along the media path 432. To maintain tension on the media 430 as it is pulled by the platen roller 318 along the media path 432, the motor 340 can drive, e.g., via the media payout drive train 346, the spindle 304 to rotate about an axis of rotation (a payout spindle axis of rotation) at a specified payout speed and/or with a specified torque to dispense the media while maintaining tension on the media 430 along the media path 432 between the media supply on the media supply spindle 304 and the nip formed between the printhead 316 and the platen roller 318. As the media passes the encoder 314, the encoder 314 can write data to and/or read data from an RFID/NFC tag in the media (for embodiments of the media that include RFID/NFC tags) and/or the printhead can render indicia on the media 430. For embodiments and/or applications that utilize the take-up spindle 320, e.g., to maintain tension on the liner of the media 430, as the platen roller 318 outputs the media downstream along the media path 432, the motor 344 can drive the spindle 320, e.g., via the media take-up drive train 350, to rotate about an axis of rotation (a take-up spindle axis of rotation) at a specified take-up speed and/or with a specified torque to maintain tension on the liner of media 430 along the media path 432 between the nip formed between the printhead 316 and the platen roller 318 and the media take-up spindle 320.

Once printed and/or encoded, the processed media can be peeled from the liner by the peeler 326, cut by a cutting assembly 328, output from a media outlet 436, and/or applied on an object via the tamp 204. For example, the tamp 204, may apply media that is output from the media outlet 436 by contacting or pressing the media to an object via an actuation of the tamp 204. In some examples, individual media elements can be held on a continuous web of media via the liner such that the cutter assembly 328 is not required or can be disabled. Likewise, for embodiments in which linerless media is utilized, the arrangement 400 may be devoid of the peeler 326 or the peeler 326 can be disabled.

As indicated above, FIGS. 4A-E are provided as example interior arrangements of a media applicator. Other examples may differ from what is described with regard to FIGS. 4A-E. The number and arrangement of devices/components shown in FIGS. 4A-E are provided as an example. In practice, there may be additional devices/components, fewer devices/components, different devices/components, or differently arranged devices/components than those shown in FIGS. 4A-E. Furthermore, two or more devices/components shown in FIGS. 4A-E may be implemented within a single device/component, or a single device/component shown in FIG. 4A-E may be implemented as multiple, distributed devices/components. Additionally, or alternatively, a set of devices/components (e.g., one or more devices/components) shown in FIGS. 4A-E may perform one or more functions described as being performed by another set of devices/components shown in FIGS. 4A-E.

Figure 5A:
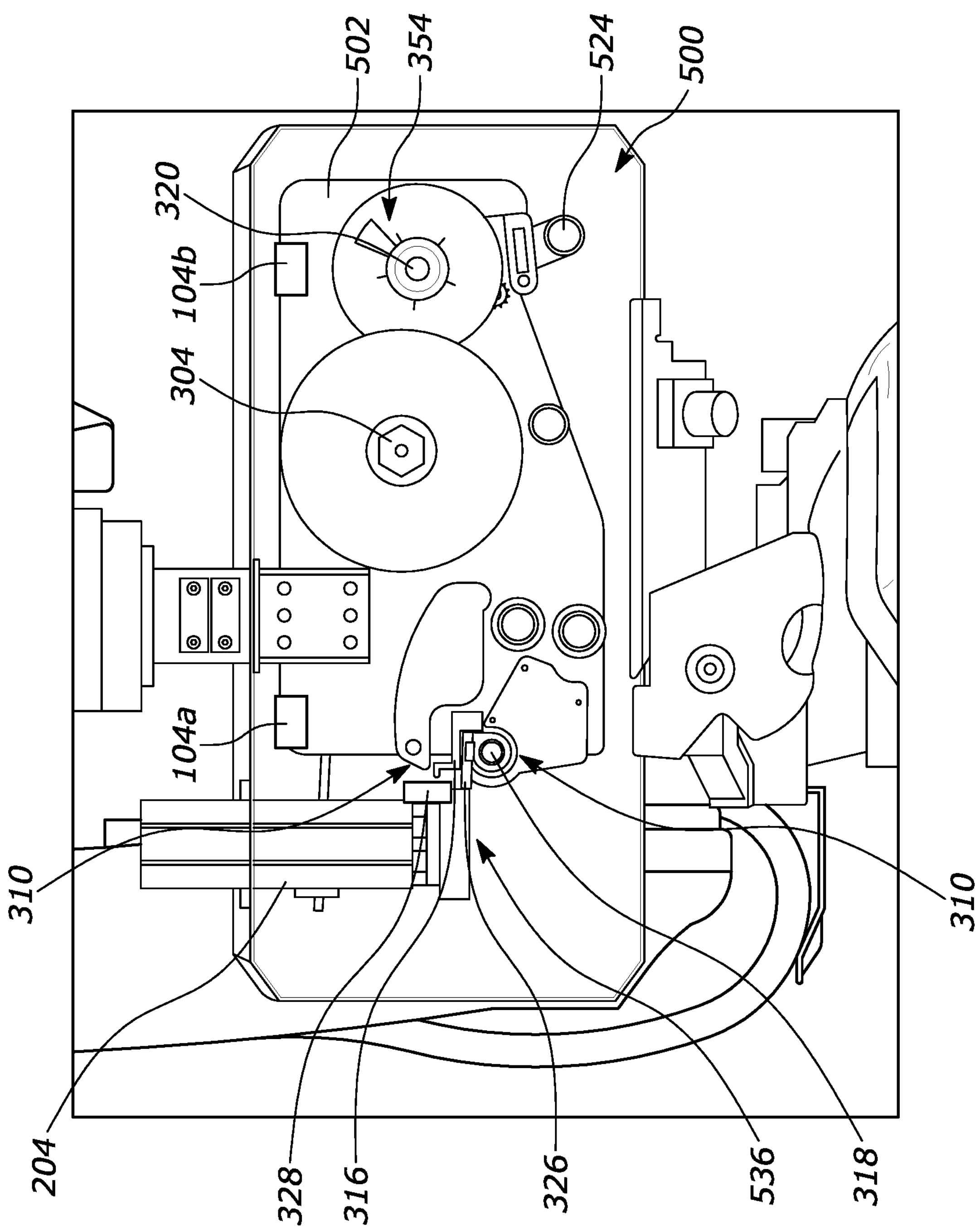
FIGS. 5A-C illustrate another interior of an embodiment of the media applicator of FIG. 2 with the housing omitted in accordance with embodiments of the present disclosure.
Figure 5B:
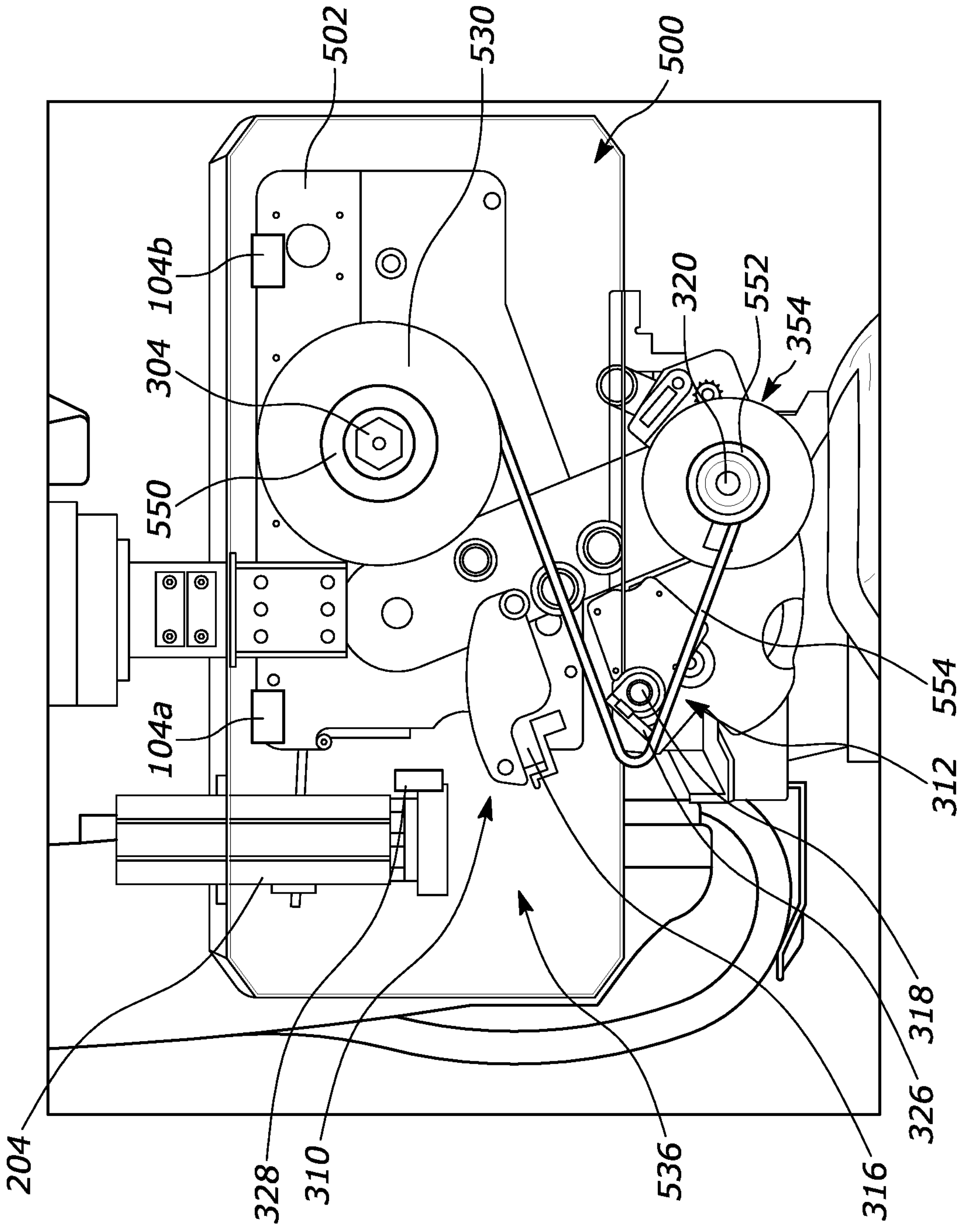
Figure 5C:
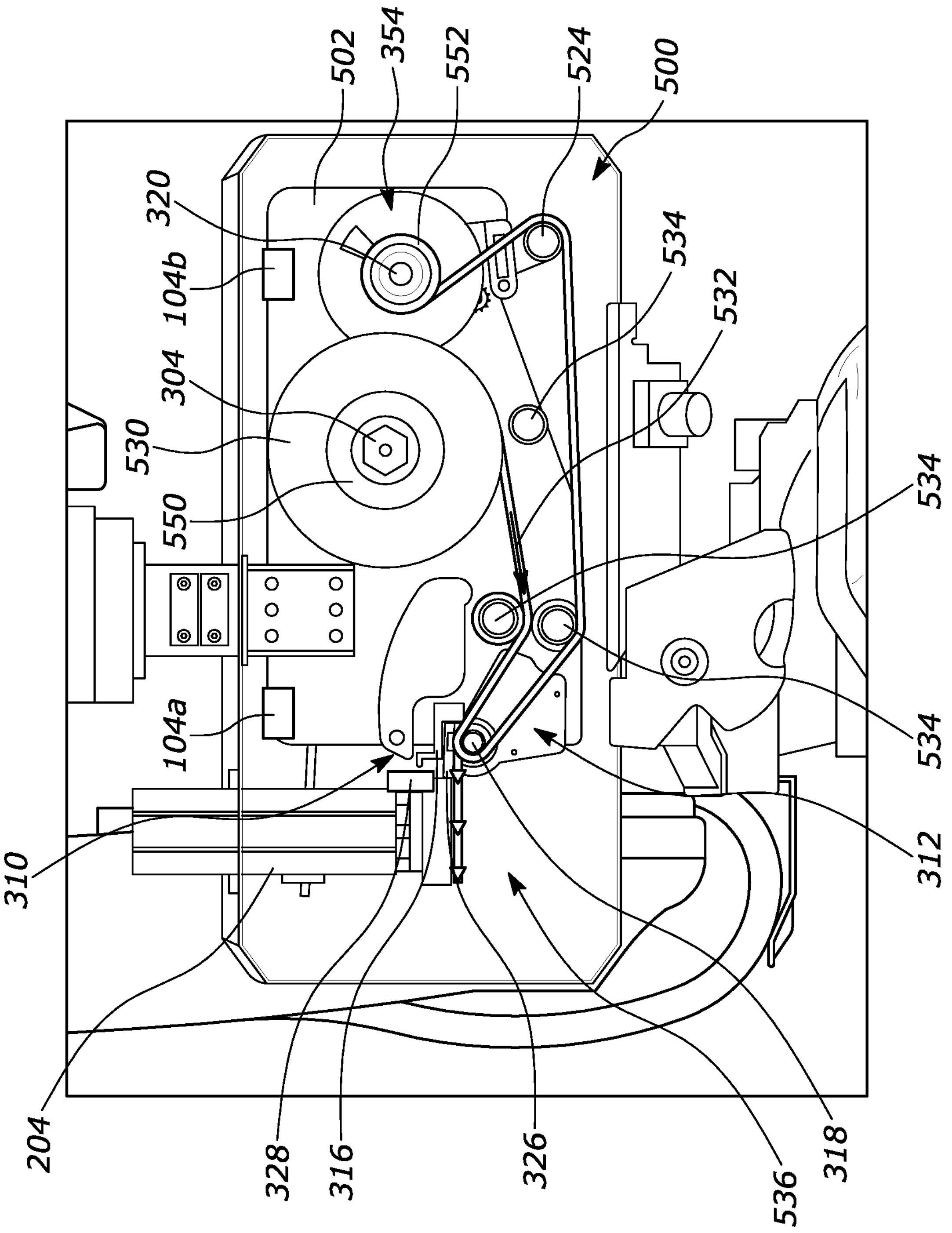

FIGS. 5A-C illustrate another illustrate an example arrangement 500 of components in an interior of an embodiment of the media applicator 200 of FIGS. 2 and 3 with the housing omitted. As shown in FIGS. 5A-C, a chassis 502 supports at least some of the components for processing a supply of media 530 along a media path 532. For example, the chassis 502 can support the media supply spindle 304 that can hold or support a media spool or media roll (e.g., media 530); the printhead assembly 310 including the printhead 316; the platen assembly 312 including the platen roller 318; the RFID/NFC encoder 314; the moveable take-up spindle assembly 354 including the take-up spindle 320; the peeler 326; the cutting assembly 328; a dancer arm 524; and media guides 534, as well as the electronics and drive components, e.g., the logic circuit 330; the memory 332; motors 340, 342, and/or 344; and drive trains 346, 348, and/or 350, shown in FIG. 3, which are mounted on an opposite side of the chassis 502. The chassis 402 can also support at least one of the cameras 104*a* and/or at least one of the sensors 104*b* to aid in aligning the media applicator 200 with a media replenishment system (e.g., the media replenishment system 112). The dancer arm 524 and the media guides 534 are configured to engage media 530 at one or more positions along a media path 532. While the example arrangement has been illustrated as being configured for direct thermal printing, embodiments of the present disclosure may alternatively be configured for thermal transfer printing, where the arrangement 500 can include ribbon supply and ribbon take-up spindles configured to support a thermal ink ribbon to facilitate thermal transfer printing.

As shown in FIGS. 5A-C, the platen assembly 312 and the take-up spindle assembly 354 can move between the media processing position (e.g., shown in FIGS. 5A and 5C) and the media loading position (e.g., shown in FIG. 5B) to facilitate autonomous replenishment of media, e.g., via an interaction with the media replenishment system 112 shown in FIG. 1. As an example, when the platen assembly 312 and the take-up spindle assembly 354 are in the media processing position, as shown in FIG. 5A, the platen assembly 312 is positioned so that the printhead 316 and platen roller 318 are opposingly spaced from each other to form a nip and the platen assembly 312 and the take-up spindle 320 are spaced away from each other (e.g., with the media supply spindle disposed laterally between the platen assembly 312 and the take-up spindle 354. When a new supply of media is to be installed, the platen assembly 312 can be driven (e.g., via motor 342 and drive train 348) to move generally in a first direction (e.g., downwardly in the orientation shown in FIGS. 5B) and the take-up spindle assembly 354 can be driven (e.g., via motor 344 and drive train 350) to move the take-up spindle generally in a second direction (e.g., downwardly and towards a front side of the media applicator in the orientation shown in FIG. 5B) such that the platen assembly 312 and the take-up spindle 320 move towards each other when moving from the media processing position to the media loading position, as shown in FIG. 5B. When the platen assembly 312 and the take-up spindle 320 are in the media loading position, the platen assembly 312 and the take-up spindle 320 are positioned adjacent to each other and are disposed below (e.g., relative the orientation shown in FIG. 5B) the media supply spindle 304 and the printhead assembly 310. In one example, the printhead assembly 310 can also move from a first position to a second position when the platen assembly 312 and the take-up spindle move from the media processing position to the media loading position. For example, the printhead assembly 310 can tilt downwardly such that an end of the printhead assembly 310 that includes the printhead 316 is lower than an opposite end of the printhead assembly.

In the media loading position, the media 530 from the media replenishment system 112 can be autonomously received in the media applicator as shown in FIG. 5B. For example, the media 530 can include a media roll wrapped about a first core 550 and a second core 552 can have a terminal end of the media and/or the liner of the media 530 attached thereto. The first core 550 can be received on the media supply spindle 304 and the second core 552 can be received on the take-up spindle 320. The cores 550 and 552 of the media can be secured on the spindles 304 and 320, respectively such that the media generally does not freely rotate relative to the spindles 304 and 320. Rather, the cores 550 and 552 can be "locked" to the spindles 304 and 320, respectively such that the spindles 304 and 320 and the cores 550 and 552 rotate in unison. The media 530 can be staged by and/or on the media replenishment system 112 such that a length of media 554 dispensed from the media roll prior to the media being received by the media applicator. The length on media 554 can be bent and the first and second cores 550 and 552 can be disposed at a specified distance apart from each other and can be positioned relative to each other to correspond to a specified distance and position of the spindles 304 and 320. The bend in the media 530 can enable the media 530 to be installed in the media applicator such that the length of media 554 extends around the platen assembly 312 (relative to the orientation shown in FIG. 5B). In one example, the media 430 can also be tensioned such that a specified amount tension is applied to the length of media, where the specified amount tension can correspond to an amount of tension that will be applied by the media applicator. After the media 530 is installed in the media applicator, the platen assembly 312 and the take-up spindle 320 (via the take-up spindle assembly 354) can return to the media processing position (e.g., the platen assembly 312 and the take-up spindle move away from each other and the platen roller 318 forms the nip with the printhead 316) as shown in FIG. 5C.

When the platen assembly 312 and the take-up spindle 320 return to the media processing position, at least a portion of the media 530 is positioned between the nip formed by the printhead 316 and the platen roller 318 and the media 530 is held in tension along the media path 532 and the media applicator can be controlled to dispense the media 530. For example, the platen roller 318 can be driven by the motor 342, e.g., via the platen drive train 348, to rotate about an axis of rotation of the platen roller 318 (platen axis of rotation) at a specified platen or print speed to pull the media 530 along the media path 532. To maintain tension on the media 530 as it is pulled by the platen roller 318 along the media path 532, the motor 340 can drive, e.g., via the media payout drive train 346, the spindle 304 to rotate about an axis of rotation (a payout spindle axis of rotation) at a specified payout speed and/or with a specified torque to dispense the media while maintaining tension on the media 530 along the media path 532 between the media supply on the media supply spindle 304 and the nip formed between the printhead 316 and the platen roller 318. As the media passes the encoder 314, the encoder 314 can write data to and/or read data from an RFID/NFC tag in the media (for embodiments of the media that include RFID/NFC tags) and/or the printhead can render indicia on the media 530. For embodiments and/or applications that utilize the take-up spindle 320, e.g., to maintain tension on the liner of the media 530, as the platen roller 318 outputs the media downstream along the media path 532, the motor 344 can drive the spindle 320, e.g., via the media take-up drive train 350, to rotate about an axis of rotation (a take-up spindle axis of rotation) at a specified take-up speed and/or with a specified torque to maintain tension on the liner of media 530 along the media path 532 between the nip formed between the printhead 316 and the platen roller 318 and the media take-up spindle 320.

Once printed and/or encoded, the processed media can be peeled from the liner by the peeler 326, cut by the cutting assembly 328, output from a media outlet 536, and/or applied on an object via the tamp 204. For example, the tamp 204, may apply media that is output from the media outlet 536 by contacting or pressing the media to an object via an actuation of the tamp 204. In some examples, individual media elements can be held on a continuous web of media via the liner such that the cutter assembly 328 is not required or can be disabled. Likewise, for embodiments in which linerless media is utilized, the arrangement 500 may be devoid of the peeler 326 or the peeler 326 can be disabled.

As indicated above, FIGS. 5A-C are provided as example interior arrangements of a media applicator. Other examples may differ from what is described with regard to FIGS. 5A-C. The number and arrangement of devices/components shown in FIGS. 5A-C are provided as an example. In practice, there may be additional devices/components, fewer devices/components, different devices/components, or differently arranged devices/components than those shown in FIGS. 5A-C. Furthermore, two or more devices/components shown in FIGS. 5A-C may be implemented within a single device/component, or a single device/component shown in FIG. 5A-C may be implemented as multiple, distributed devices/components. Additionally, or alternatively, a set of devices/components (e.g., one or more devices/components) shown in FIGS. 5A-C may perform one or more functions described as being performed by another set of devices/components shown in FIGS. 5A-C.

FIGS. 6A-E illustrate an example of a media replenishment system 600 in accordance with embodiments of the present disclosure, which may form an embodiment of the media replenishment system 112 shown, e.g., in FIG. 1. As shown in FIGS. 6A-E, the media replenishment system 600 can include a supply repository 602 and a base plate 604.

The supply repository 602 can include a support surface 610, a track or rail system including one or more rails 606, and a feed tray 608. The rail system can include one or more rails 606 disposed on or in the support surface 610. The feed tray 608 can be operatively coupled to the rail system supported by the support surface 610 and can be configured to translate along the one or more rails 606. The feed tray 608 can include slots 612 for receiving supplies of media, which in the present example are in the form of media rolls 614. As an example, the slots 612 can align a quantity of media rolls 614 in rows such that each one of the rows can include one or more of the media rolls 614. The media rolls 614 in the rows 616 can be biased towards a side of the feed tray 608 that is adjacent to the base plate 604 such that when one of the media rolls 614 is removed from one of the slots 612 in the feed tray 608 by the base plate 604, the remaining media rolls 614 in the row are urged towards the side of the feed tray 608 adjacent to the base plate 604 so that the next media roll in the slot is positioned for subsequent removal from the feed tray 608 by the base plate 604.

The base plate 604 can include a gripper head 620, an extension bar 622, and a tension bar 624, a guide track 626, and a guide track 628. The base plate 604 can be aligned with one of the slots 612 to facilitate autonomous loading of one of the media rolls 614 in the slot onto the base plate 604 such that a media core 650 of the selected one of the media rolls 614 is loaded on the gripper head 620 and a take-up core 652 of the selected one of the media rolls is loaded on the extension bar 622. Once the media roll is loaded on the base plate 604, the base plate 604, the gripper head 620, the extension bar 622, and the tension bar 624 can be configured and positioned interact with a media applicator (e.g., an embodiment of the media applicator 200 with interior arrangements 400 or 500) to facilitate autonomous installation and tensioning of the media roll in the media applicator. The base plate 604 can also support at least one of the cameras 104*a* and/or at least one of the sensors 104*b* to aid in aligning the media applicator 200 with the media replenishment system 600.

Figure 6A:
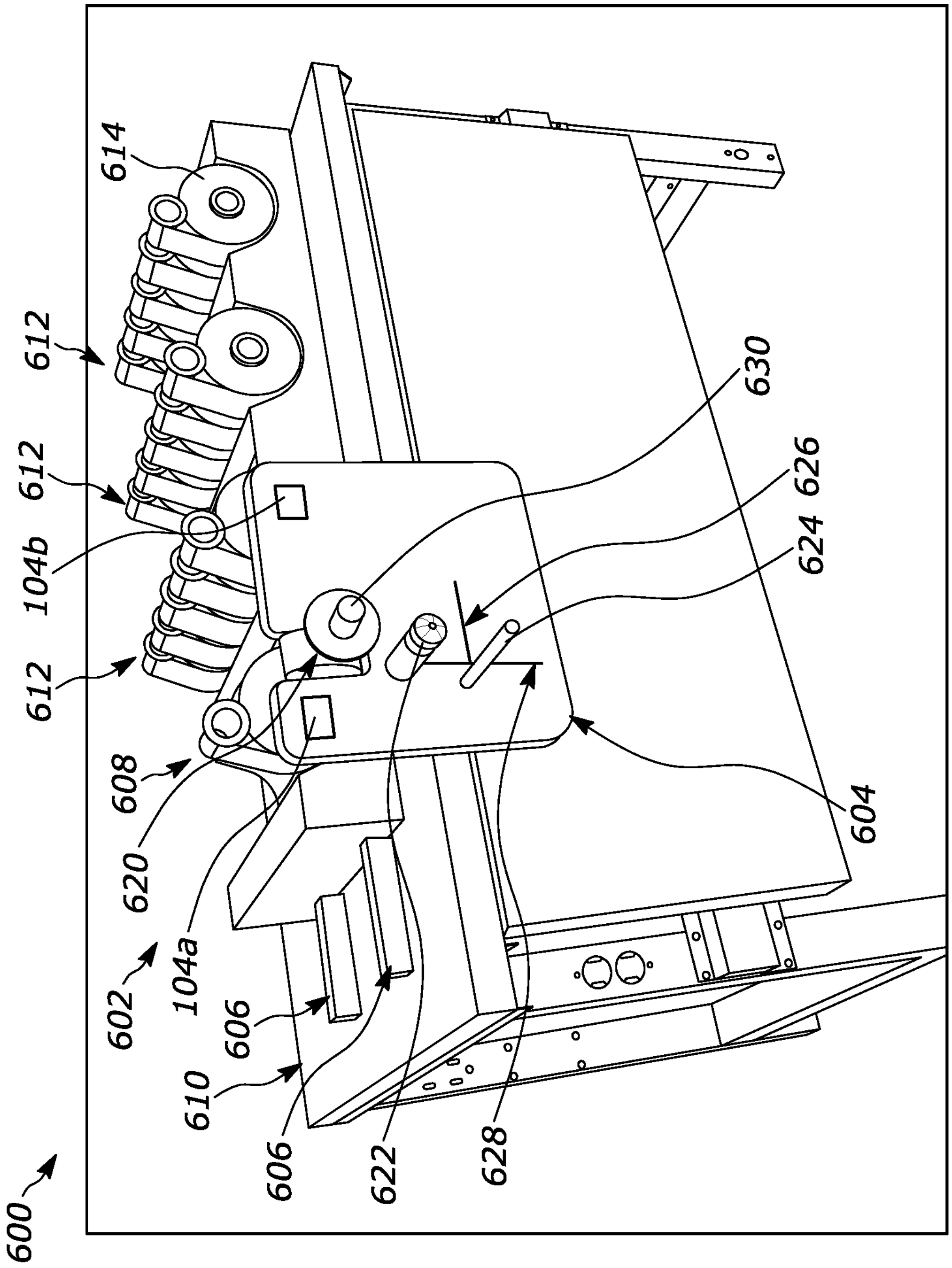
FIGS. 6A-E illustrate an example media replenishment system in accordance with embodiments of the present disclosure.
Figure 6B:
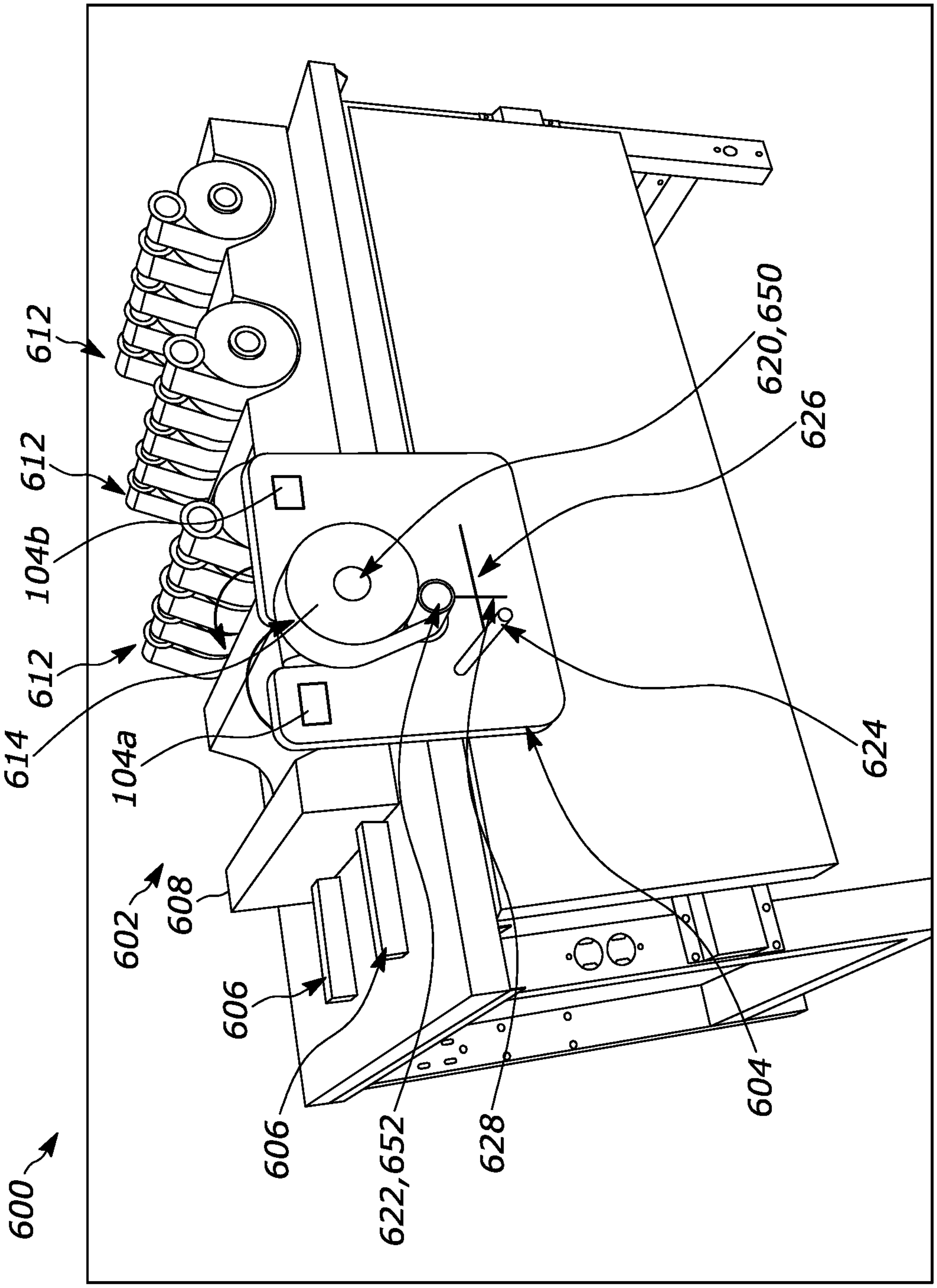
Figure 6C:
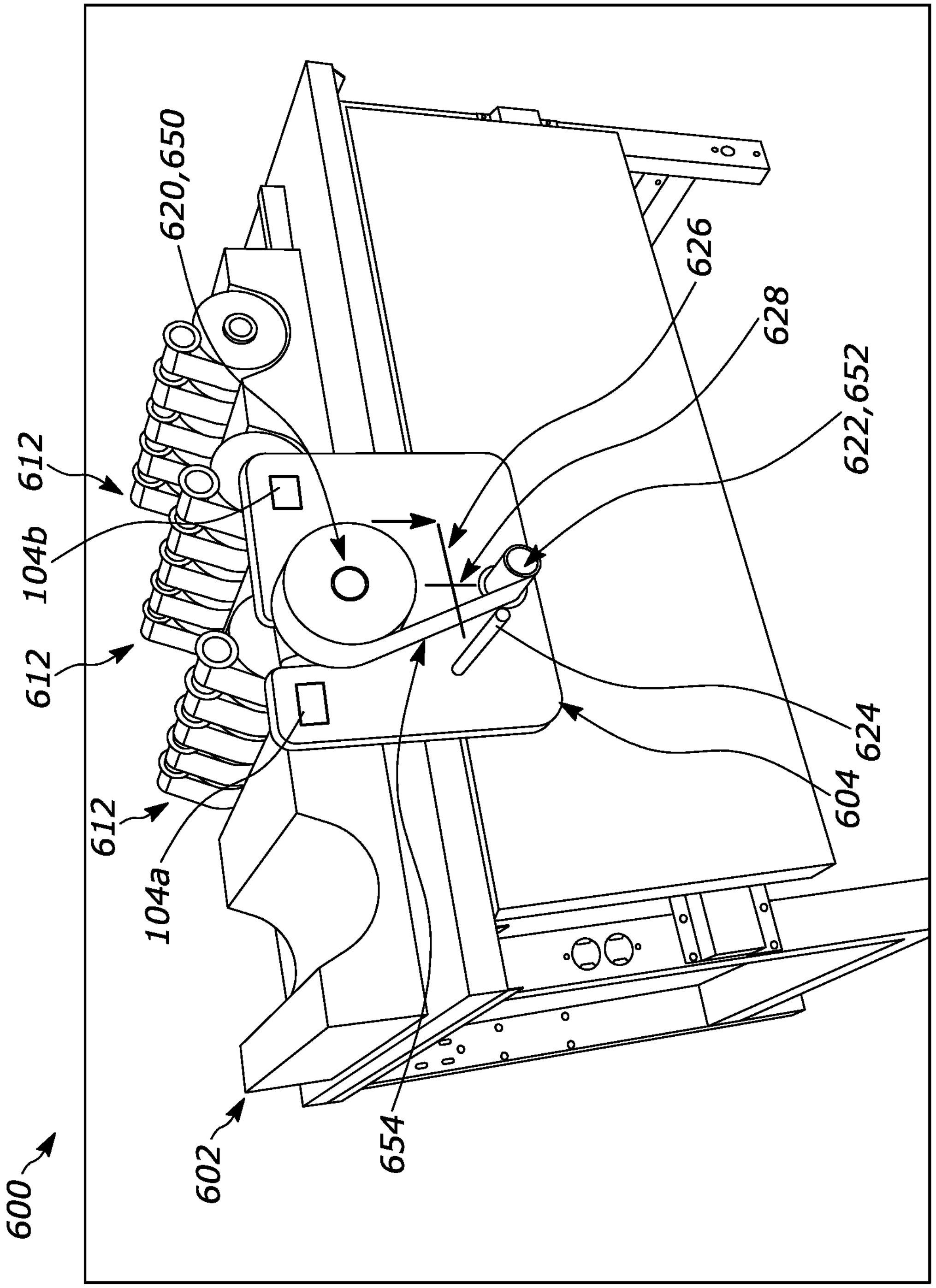
Figure 6D:
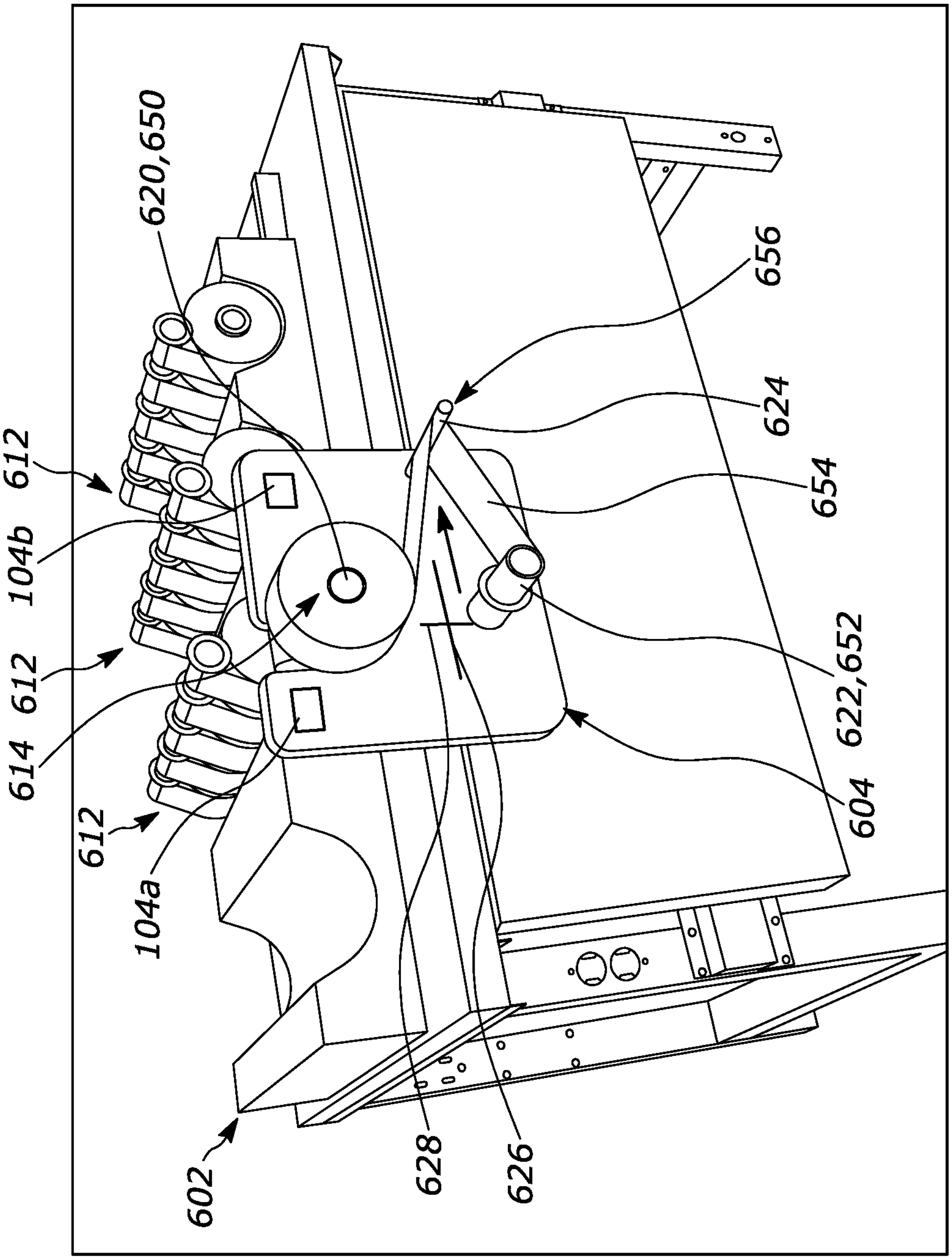
Figure 6E:
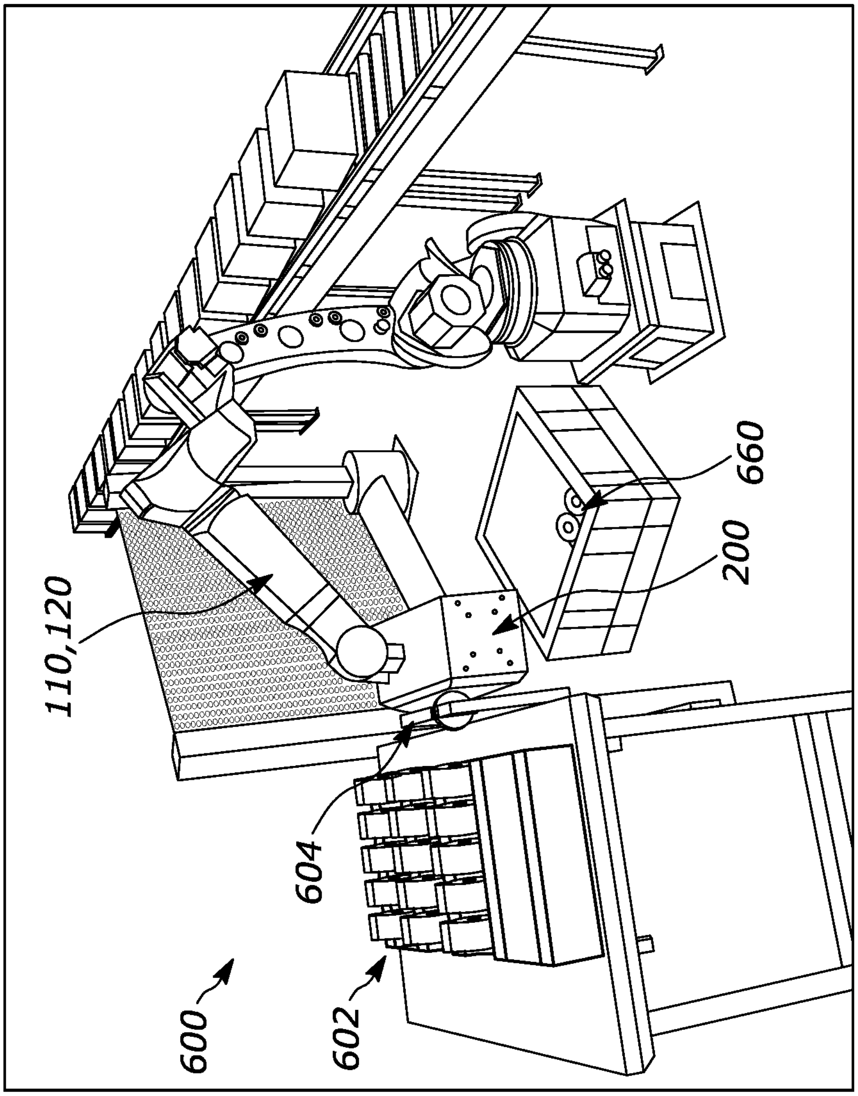

As an example, referring to FIGS. 5A-C and 6A-E, the gripper head can be in a home position such the gripper head 620 extends away from the feed tray 602 and the base plate 604 is disposed between a terminal free end 630 of the gripper head 620 and the feed tray 602 as shown in FIG. 6A. When one of the media rolls 614 is to be autonomously installed in the media applicator 200, the gripper head 620 can be controlled, e.g., via the controller 102, to rotate 180 degrees into a loading position such that gripper head 620 extends into the feed tray 602 and the terminal free end 630 of the gripper head 620 is aligned with and extends into the core 650 of the selected one of the media rolls 614 to select the media roll from the feed tray 604, after which, the gripper head 620 can rotate back 180 degrees into the home position with the selected one of the media rolls 614 and locates the take-up core 652 of the selected one of the media rolls on the extension bar 622 as shown in FIG. 6B. With the media roll loaded on the base plate 604, the extension bar 622 can be controlled, e.g., via the controller 102, to move along the guide track 626 to space the cores 650 and 652 apart from each other by a specified distance and to dispense a length of media 554 from the selected one of the media rolls 614 such that the length of media 554 extends across the specified distance as shown in FIG. 6C. Subsequently, the tension bar 624 can be controlled, e.g., via the controller 102, to move along the guide track 628 to engage the media at a point along the length of media 554 dispensed from the selected one of the media rolls 614 and place a bend 656 in the media as shown in FIG. 6D and waits for the media applicator 200 to retrieve the selected one of media rolls 614 to replenish the media applicator 200.

Before the media applicator 200 retrieves the selected one of the media rolls 614 from the media replenishment system 600, the media applicator 200 can discard the remnants of the depleted supply of media, e.g., media core, take-up core media, and/or a liner of the media, if any, already within the media applicator (e.g., in a receptacle 660). In some embodiments pressurized air can be forced through the spindles 304 and/or 320 (e.g., via valves 360 and conduit 362) to aid in ejecting the remnants of the depleted supply of media from the media applicator 200. To retrieve the selected one of the media rolls 614, the media applicator 200 can expose the interior of the media applicator 200, e.g., by opening an access door 210, and can interface with the selected media 614 on the base plate 604 by aligning the media payout spindle 304 and the take-up spindle 620 with the gripper head 620 and the extension bar 622, respectively, or by aligning the media payout spindle 304 and the take-up spindle 320 with the extension bar 622 and the gripper head 620, respectively. The camera(s) 104*a* and/or the sensor(s) 104*b* of the media replenishment system 600 and/or the media applicator 200 can aid in aligning the media applicator 200 with media 614 to be installed in the media applicator 200. In one example, to align the media payout spindle 304 and the take-up spindle 320 with the cores 650 and 652 of the selected media roll 614, the media payout spindle 304 and the take-up spindle 320 can be controlled move relative to each other and/or relative to the chassis 502. As one example, as shown in FIGS. 5A-B, the take-up spindle 320 (e.g., via the take-up spindle assembly 354) can move or rotate downwardly and/or towards the media outlet 536 of the media applicator (e.g., to the media loading position shown in FIG. 5B) to position the spindles 304 and 320 in a manner that aligns the spindles 304 and 320 with the gripper head 620 and the extension bar 622 when the gripper head 620, the extension bar 622, and the tension bar 624 are in the staged position shown in FIG. 6D. In one example, the selected one of the media rolls 614 can also be tensioned such that a specified amount tension is applied to the length of media, e.g., by the tension bar 624, where the specified amount of tension can correspond to an amount of tension that will be applied by the media applicator. Additionally, or in the alternative, the printhead assembly 310 and/or the platen assembly 312 can also be controlled to move (e.g., to the media loading position shown in FIG. 5B) to increase a distance between the printhead 316 and the platen roller 318 to aid in routing the length of media 554 from the media roll along the media path. Once the components of the media applicator 200 are in the media loading position, the media applicator 200 is moved, e.g., by the robotic device (e.g., robotic device 110 or 120), into position to engage the core 650 of the selected one of the media rolls 614 and the take-up core 652 as shown, e.g., in FIG. 6E. For example, the media applicator 200 can be moved so that the spindles 304 and/or 320 are received within at least a portion of the cores 650 and 652 and the length of media 554 dispensed from the selected one of the media rolls 614 can pass between the printhead 316 and the platen roller 318, after which the media payout spindle 304 and/or take-up spindle 320 can return to the media processing position with the media under tension as shown, e.g., in FIG. 5C. Once the media applicator 200 returns to the media processing position and the access door 210 is closed, the media applicator 210 is now replenished and ready to process and apply media to objects via the robotic device 110 as described herein.

Figure 7A:
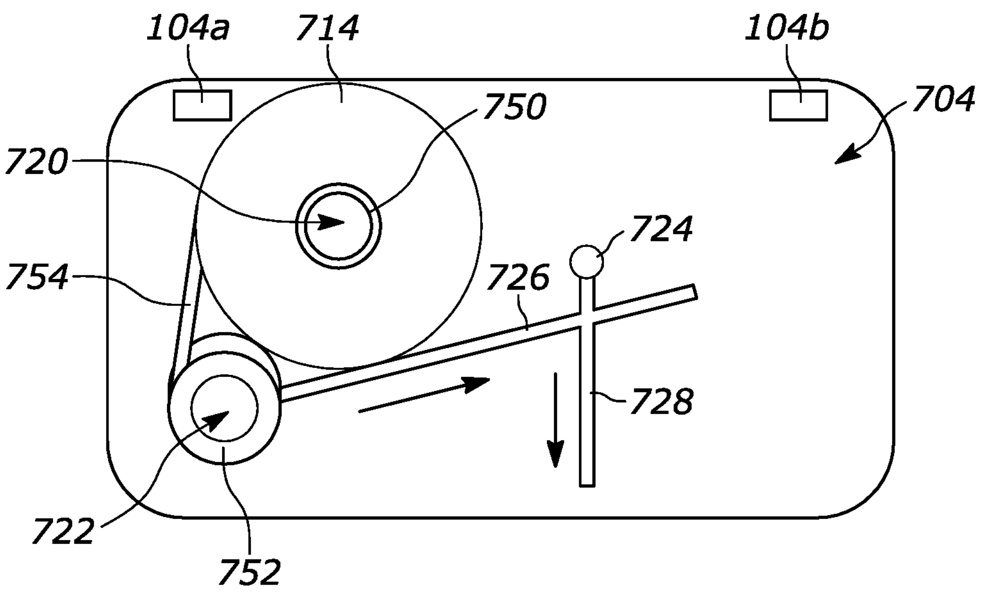
FIGS. 7A-B illustrate an alternative embodiment of a base plate for the media replenishment system of FIGS. 6A-E in accordance with embodiments of the present disclosure.
Figure 7B:
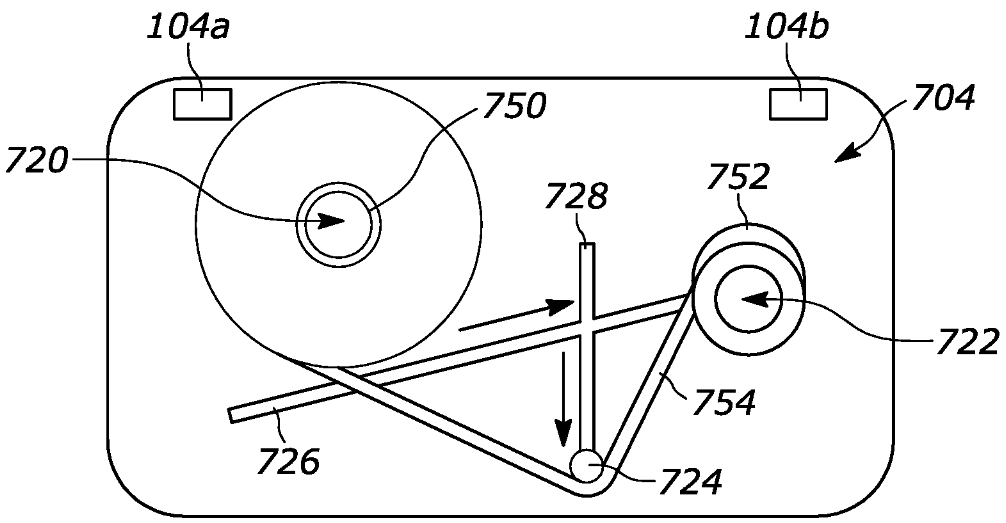

FIGS. 7A-B illustrates an alternative embodiment of a base plate 704 that can be used in place of the base plate 604 and in combination with the supply repository 602 of FIGS. 6A-E. The base plate 704 operates in the same manner as described with reference the base plate 604 described with reference to FIGS. 6A-E, except that an extension bar 722 travels laterally along a track 726 and the tension bar 724 travels vertically along track 728. A gripper head 720 operates in the same manner as the gripper head 620. With reference to FIGS. 4A-D and 7A-B, when a media roll 714 is to be autonomously installed in an embodiment of the media applicator 200 having the interior arrangement 400, the gripper head 720 can be controlled, e.g., via the controller 102, to rotate 180 degrees into a loading position such that gripper head 720 extends into the feed tray (e.g., the feed tray 602 shown in FIGS. 6A-E) and the terminal free end 730 of the gripper head 720 is aligned with and extends into a core 750 of the media roll 714 to select the media roll 714 from the feed tray 602, after which, the gripper head 720 can rotate back 180 degrees back into the home position with the selected media roll and locates a take-up core 752 of the selected media roll 714 on the extension bar 722. With the media roll 714 loaded on the base plate 704, the extension bar 722 can be controlled, e.g., via the controller 102, to move laterally along the guide track 726 to space the media cores 750 and 752 apart from each other by a specified distance and to dispense a length of media 754 from the media roll 714 such that the length of media 754 extends across the specified distance. Subsequently, the tension bar 724 can be controlled, e.g., via the controller 102, to move downwardly along the guide track 728 to engage the media at a point along the length of media 754 dispensed from the media roll 714 and place a bend 756 in the media and waits for the media applicator 200 to retrieve the selected media roll 714 to replenish the media applicator 200.

Before the media applicator retrieves the selected media roll from the media applicator, the media applicator can discard the remnants of the depleted supply of media, e.g., media core, take-up core media, and/or a liner of the media, if any, already within the media applicator (e.g., in a receptacle 660). In some embodiments pressurized air can be forced through the spindles 304 and/or 320 (e.g., via valves 360 and conduit 362) to aid in ejecting the remnants of the depleted supply of media from the media applicator 200. To retrieve the selected media roll, the media applicator 200 can expose the cavity of the media applicator, e.g., by opening the access door 210, and can interface with the selected media 714 on the base plate 704 by aligning the media payout spindle 304 and the take-up spindle 320 with the gripper head 720 and the extension bar 722, respectively, or by aligning the media payout spindle 304 and the take-up spindle 320 with the extension bar 722 and the gripper head 720, respectively. The camera(s) 104*a* and/or the sensor(s) 104*b* on the base plate 704 and/or the media applicator 200 can aid in aligning the media applicator 200 with media 714 to be installed in the media applicator 200. In one example, when the extension bar 722 is moved the specified distance away from the gripper head 720, the media payout spindle 304 and the take-up spindle 320 can align with the cores 750 and 752 of the media roll 714 without having to move either the media payout spindle 304 or the media take-up spindle 320 relative to each other or to the chassis 402. As shown in FIGS. 4A-B, the platen assembly 312 and/or dancer arm 324 can be controlled to move from their respective media processing positions to their respective media loading positions to aid in routing the length of media 754 removed from the media roll 714 along the media path. Once the components of the media applicator 200 are in the media loading position, the media applicator 200 is moved by a robotic device (e.g., robotic device 110 or 120) into position to engage the cores 750 and 752, the media applicator 200 can be moved so that the spindles 304 and/or 320 are received within at least a portion of the cores 750 and 752 and the length of media 754 dispensed from the selected media roll 714 can pass between the printhead 316 and the platen roller 318, after which the platen assembly 312 and the dancer arm 324 can return to the media processing position with the media under tension as shown, e.g., in FIG. 3D. Once the media applicator returns to the media processing position and the access door 210 is closed and the media applicator 200 is now replenished and ready to process and apply media to objects via the robotic device 110 as described herein.

As indicated above, FIGS. 6A-E and 7A-B are provided as examples of a media replenishment system and media. Other examples may differ from what is described with regard to FIGS. 6A-E and 7A-B. The number and arrangement of devices/components shown in FIGS. 6A-E and 7A-B are provided as an example. In practice, there may be additional devices/components, fewer devices/components, different devices/components, or differently arranged devices/components than those shown in FIGS. 6A-E and 7A-B. Furthermore, two or more devices/components shown in FIGS. 6A-E and 7A-B may be implemented within a single device/component, or a single device/component shown in FIGS. 6A-E and 7A-B may be implemented as multiple, distributed devices/components. Additionally, or alternatively, a set of devices/components (e.g., one or more devices/components) shown in FIGS. 6A-E and 7A-B may perform one or more functions described as being performed by another set of devices/components shown in FIGS. 6A-E and 7A-B.

Figure 8A:
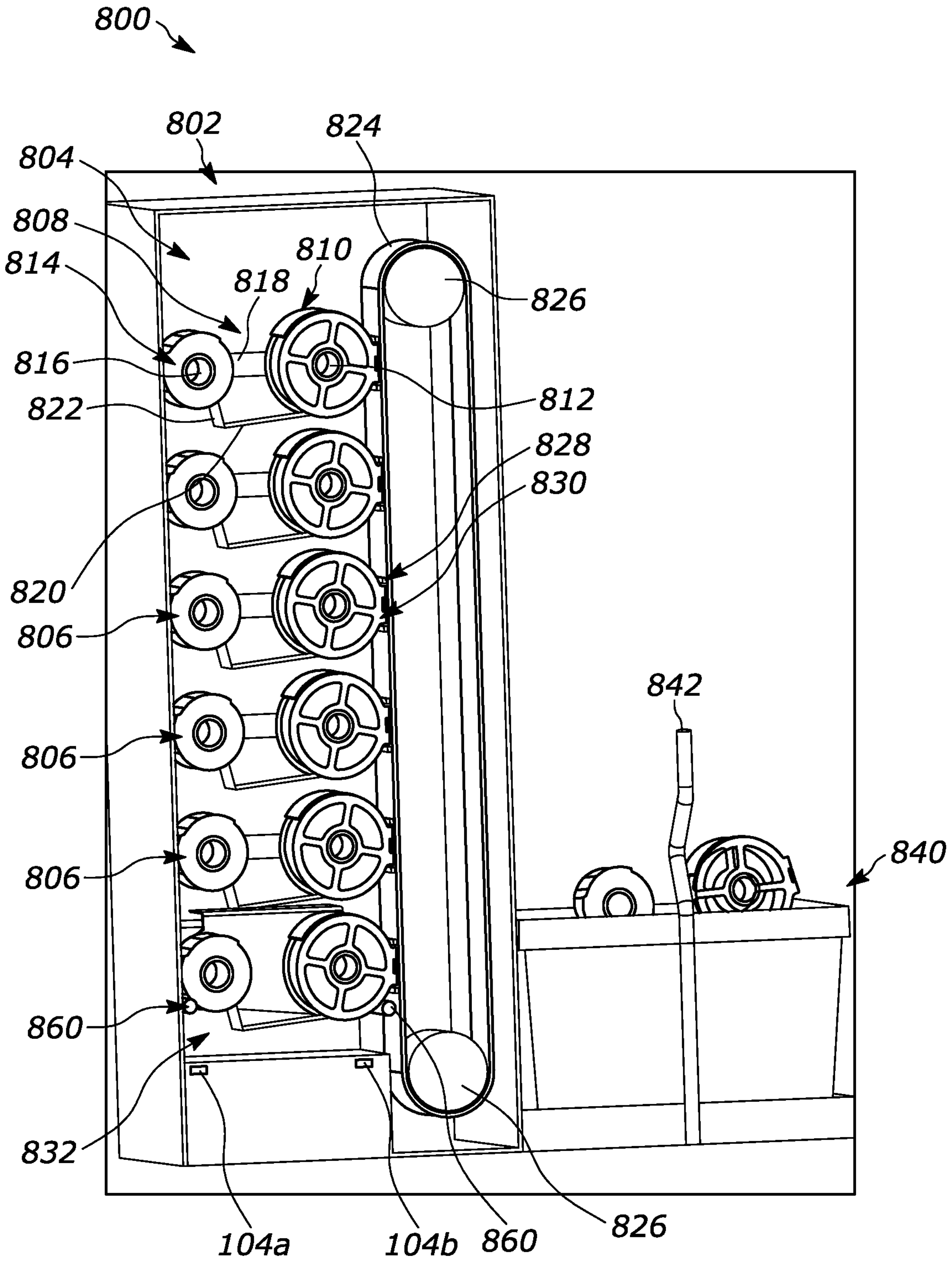
FIGS. 8A-E illustrate another example media replenishment system in accordance with embodiments of the present disclosure.

FIGS. 8A-E illustrate another example media replenishment system 800 and in interaction between the replenishment system 800 and a media applicator, e.g., media applicator 200, in accordance with embodiments of the present disclosure, which may form an embodiment of the media replenishment system 112 shown, e.g., in FIG. 1. Referring to FIG. 8A, the replenishment system 800 can include a supply repository 802 including a hopper 804 configured to store supplies of media in the form of media rolls 806 that are arranged in a stacked configuration. In one example, the media rolls 806 can be held by frames or cartridges 808. The cartridges 808 can hold the media rolls 806 in a configuration that facilitates autonomous installation of the media rolls 806 on the media applicator (e.g., media applicator 200). The cartridges 808 include media roll portions 810 that support the media rolls 806 wound about media cores 812, take-up portions 814 that supports take-up cores 816 for the media rolls 806, and extension members 818 extending between the media roll portions 810 and take-up portions 814. The extension members 818 can be configured and dimensioned so that the media roll portions 810 and the take-up portions 814 space the media cores 812 and the take-up cores 816 a specified distance away from each other so that lengths of media 820 extend between each of the media rolls 806 and each of the take-up core 816. Diverters 822 in the form of projections extend downwardly from the cartridges 808 in the orientation illustrated in FIG. 8A. The diverters 822 can engage the lengths of media 820 so that the media bend around the diverters 822. In one example, the diverters 822 can extend from the take-up portions 814, the extension members 818, or the media roll portions 810.

The media rolls 806 can be guided in the hopper 804 by belt 824 that revolves about rollers 824. In one example, one of the rollers 826 can be driven (e.g., by a motor) to control the movement of the media rolls 806 in hopper 804. The belt 824 can include surface features 828 that interface with corresponding surface features 830 of the cartridges 808 that allows the cartridges 808 to move within the hooper 804 in a controlled manner. An hopper outlet 832 presents a selected one of the media rolls 806 for installation in the media applicator. When one of the media rolls 806 is removed from the hopper 804, the media rolls 806 remaining in the hopper 804 can shift, e.g., via the belt 824, so that a next one of the media rolls 806 in the hopper 804 can be presented at the hopper outlet 832. At least one of the cameras 104*a* and/or at least one of the sensors 104*b* can be positioned proximate to the hopper outlet 832 to aid in aligning the media applicator 200 with the hopper outlet 832 to facilitate installation of the media roll 806 in the media applicator 200. In one example, the hooper outlet 832 can include extension rods 860 that can extend when transferring the media roll 806 from the hopper outlet to the media applicator 200. The extension rods can have a retracted position (as shown in FIG. 8A) in which the extension rods 860 are contained within the hopper 804 and an extended position (as show in FIG. 8C) in which the extension rods extend from the hopper 804. The extension rods 860 can support the frame 808 during the transfer from the hopper 804 to the media applicator to aid in removing the media roll 806 and stabilizing the media roll 806.

A receptacle 840 can be configured to collect any remnants of the depleted media from the media applicator, e.g., including the cartridges 808. For example, before the media applicator 200 retrieves a selected one of the media rolls 806 from the media replenishment system 800, the media applicator 200 can discard media core(s), media, a liner of the media, and/or the cartridge 808, if any, already within the media applicator in the receptacle 840. The receptacle 840 can include a rod 842 extending proximate to the receptacle 840 to remove the cartridges 808 from the media applicator in preparation for receiving one of the media rolls 806 from the hopper 804. In some embodiments pressurized air can be forced through the spindles 304 and/or 320 (e.g., via valves 360 and conduit 362) to aid in ejecting the remnants of the depleted supply of media from the media applicator 200 (e.g., media core, take-up core, media, liner of the media, cartridge).

To retrieve the selected one of the media rolls 806 (e.g., a next media roll positioned at the hooper outlet 832, the media applicator 200 can expose the interior (e.g., having the interior arrangement 400) of the media applicator 200, e.g., by opening the access door 210 (e.g., as shown in FIGS. 2 and 3), and can interface with the selected one of the media rolls 806 on the positioned at the hopper outlet 832 by aligning the media payout spindle 304 and the take-up spindle 320 with the media core 812 and the take-up core 816 of the selected one of the media rolls 806, respectively. The camera(s) 104*a* and/or the sensor(s) 104*b* of the media replenishment system 800 and/or the media applicator 200 can aid in aligning the media applicator 200 with media roll 806 to be installed in the media applicator 200.

Figure 8B:
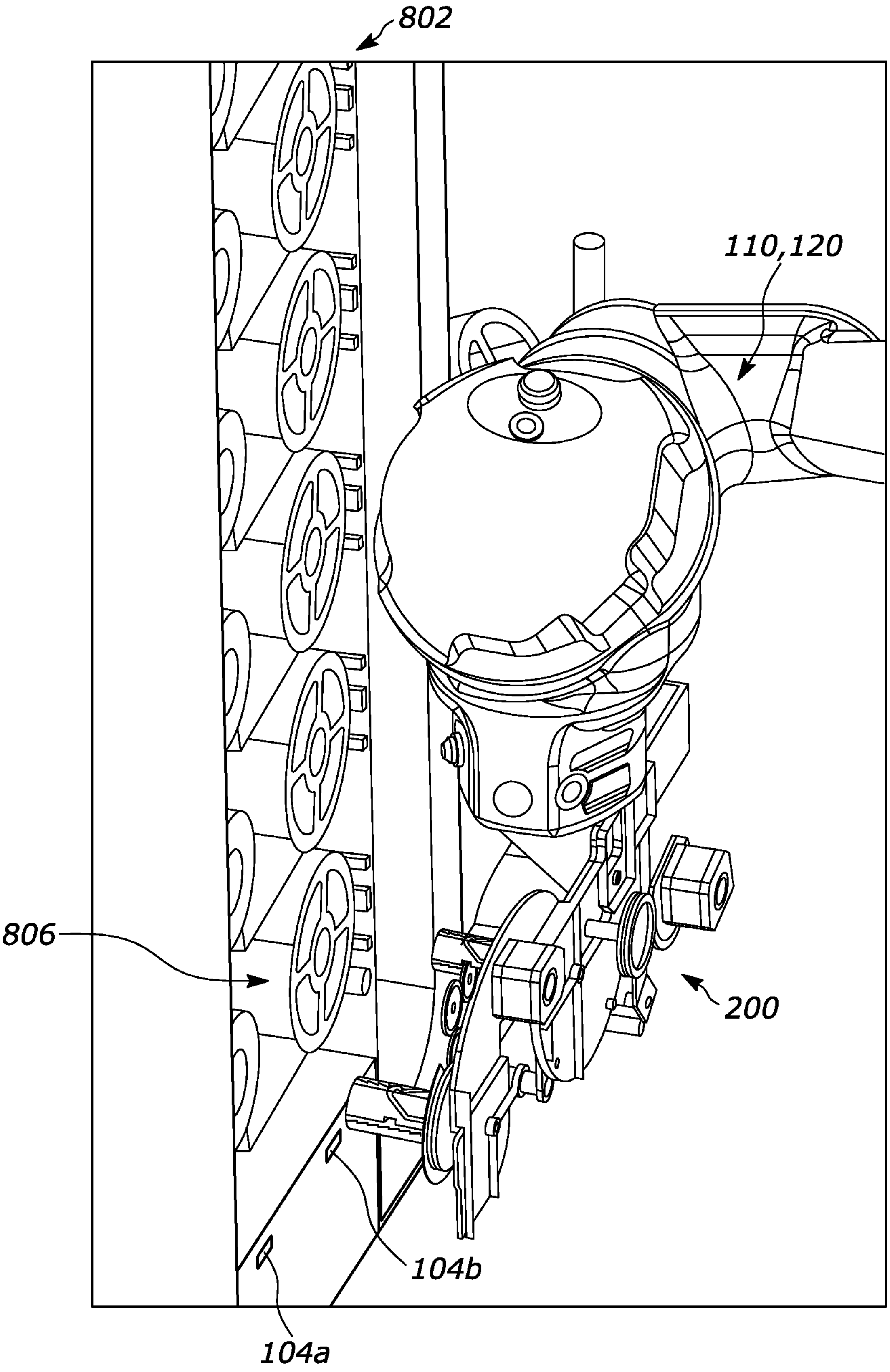
Figure 8C:
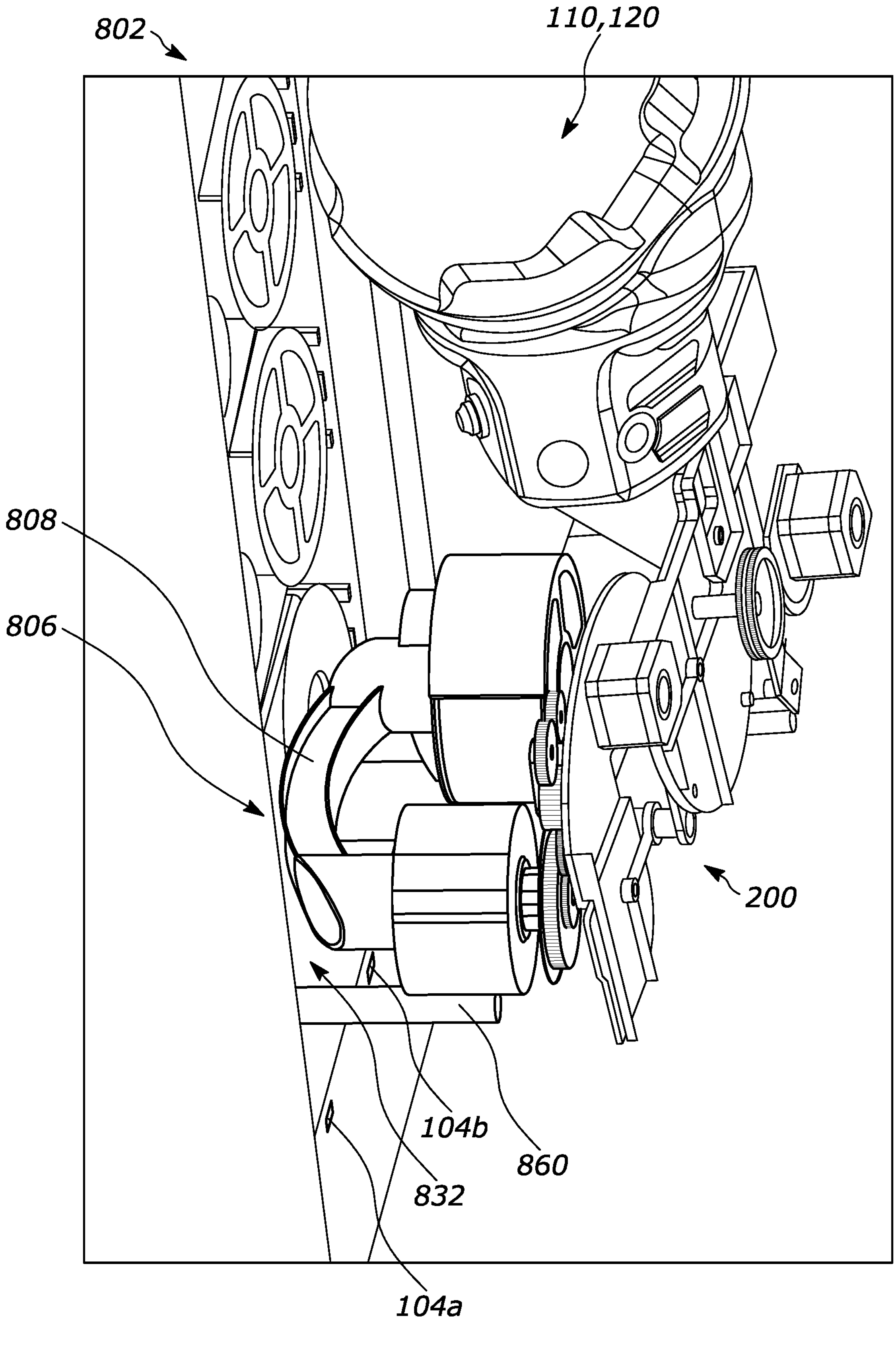
Figure 8D:
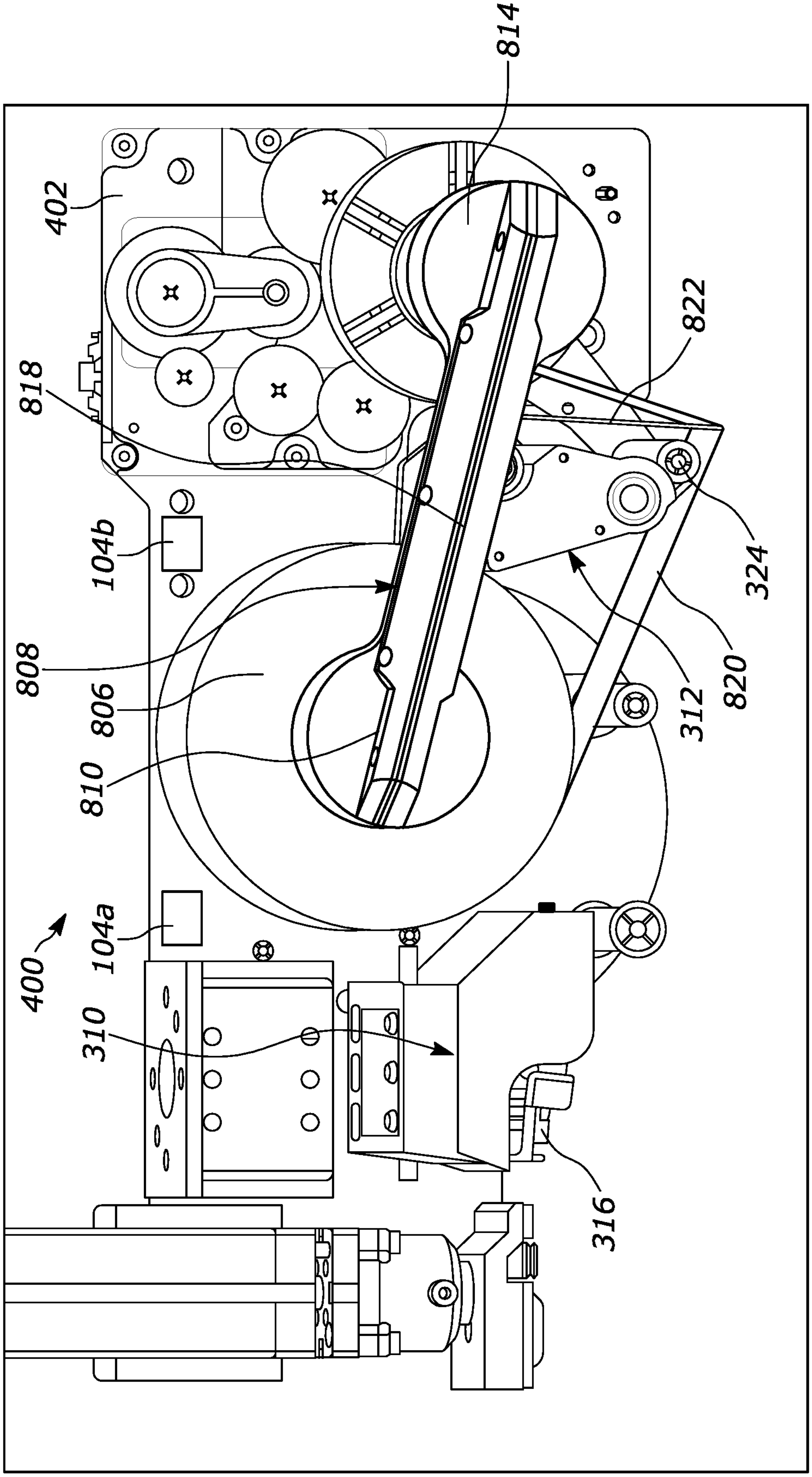
Figure 8E:
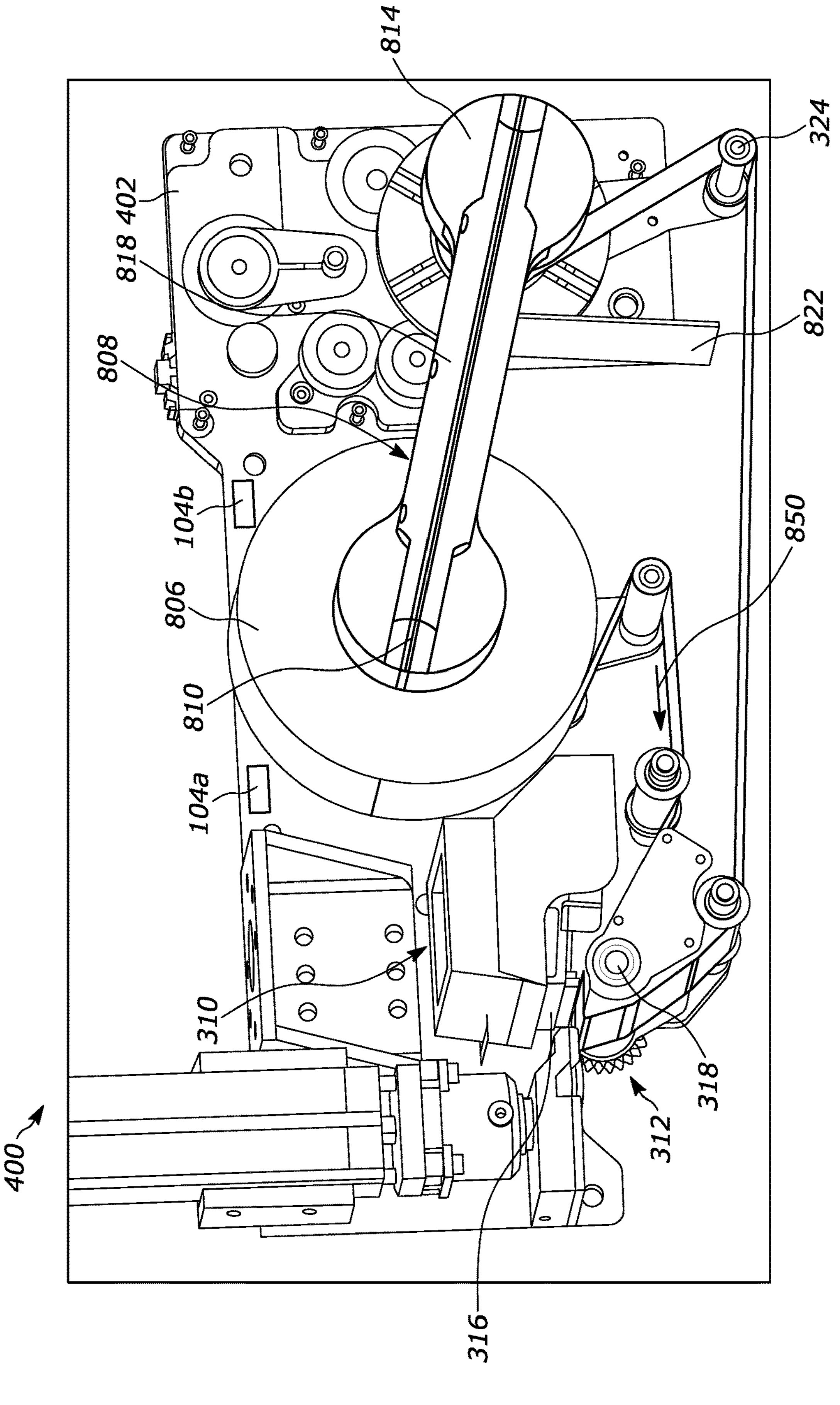

In one example, the platen assembly 312 and the dancer arm 324 can be driven to move from the media processing position, as shown in FIG. 4A, to the media loading position, as shown in FIG. 4B. In the media loading position, the selected one of the media rolls 806 from the media replenishment system 800 can be autonomously received in the media applicator 200 as shown in FIGS. 8C-D. For example, the media core 812 can be received on the media supply spindle 304 and the take-up core 816 can be received on the take-up spindle 320. The cores 812 and 816 of the media roll 806 can be secured on the spindles 304 and 320, respectively, such that the media roll 806 generally does not freely rotate relative to the spindles 304 and 320. Rather, the cores 812 and 816 can be "locked" to the spindles 304 and 320, respectively such that the spindles 304 and 320 and the cores 812 and 816, respectively rotate in unison. The bend in the length of media 820 formed by the diverter 822 can enable the media roll 806 to be installed in the media applicator 200 such that the length of media 820 extends around or under/below the dancer arm 324 and the platen assembly 312 (relative to the orientation shown in FIG. 8D). After the media 430 is installed in the media applicator, the platen assembly 312 and the dancer 324 can return to the media processing position (e.g., the platen assembly 312 and dancer arm 324 move away from each other and the platen roller 318 forms the nip with the printhead) as shown in FIG. 8E. As shown in FIG. 8E, when the platen assembly 312 and the dancer arm 324 return to the media processing position, at least a portion of the media roll 806 is positioned between the nip formed by the printhead 316 and the platen roller 318 and the media roll 806 is held in tension along the media path 850 and the media applicator 200 can be controlled to dispense the media from the media roll 806, as described herein.

In another example, the platen assembly 312 and the spindle assembly 354 can be driven to move from the media processing position, as shown in FIG. 5A, to the media loading position, as shown in FIG. 5B. In the media loading position, the selected one of the media rolls 806 from the media replenishment system 800 can be autonomously received in the media applicator 200 as shown in FIGS. 8A-C. For example, the media core 812 can be received on the media supply spindle 304 and the take-up core 816 can be received on the take-up spindle 320. The cores 812 and 816 of the media roll 806 can be secured on the spindles 304 and 320, respectively, such that the media roll 806 generally does not freely rotate relative to the spindles 304 and 320. Rather, the cores 812 and 816 can be "locked" to the spindles 304 and 320, respectively such that the spindles 304 and 320 and the cores 812 and 816, respectively rotate in unison. The bend in the length of media 820 formed by the diverter 822 can enable the media roll 806 to be installed in the media applicator 200 such that the length of media 820 extends around or under/below the paten assembly 312 and the spindle assembly 354 (relative to the orientation shown in FIG. 8D). After the media 430 is installed in the media applicator, the platen assembly 312 and the spindle assembly 354 can return to the media processing position (e.g., the platen assembly 312 and spindle assembly 354 move away from each other and the platen roller 318 forms the nip, e.g., as shown in FIG. 5C. When the platen assembly 312 and the spindle assembly 354 return to the media processing position, at least a portion of the media roll 806 is positioned between the nip formed by the printhead 316 and the platen roller 318 and the media roll 806 is held in tension along the media path 850 and the media applicator 200 can be controlled to dispense the media from the media roll 806, as described herein.

As indicated above, FIGS. 8A-C are provided as examples of a media replenishment system and media, and FIGS. 8D-E are illustrative of an interior of a media applicator receiving media from the media replenishment system of FIGS. 8A-C. Other examples may differ from what is described with regard to FIGS. 8A-E. The number and arrangement of devices/components shown in FIGS. 8A-E are provided as an example. In practice, there may be additional devices/components, fewer devices/components, different devices/components, or differently arranged devices/components than those shown in FIGS. 8A-E. Furthermore, two or more devices/components shown in FIGS. 8A-E may be implemented within a single device/component, or a single device/component shown in FIG. 8A-E may be implemented as multiple, distributed devices/components. Additionally, or alternatively, a set of devices/components (e.g., one or more devices/components) shown in FIGS. 8A-E may perform one or more functions described as being performed by another set of devices/components shown in FIGS. 8A-E.

Figure 9A:
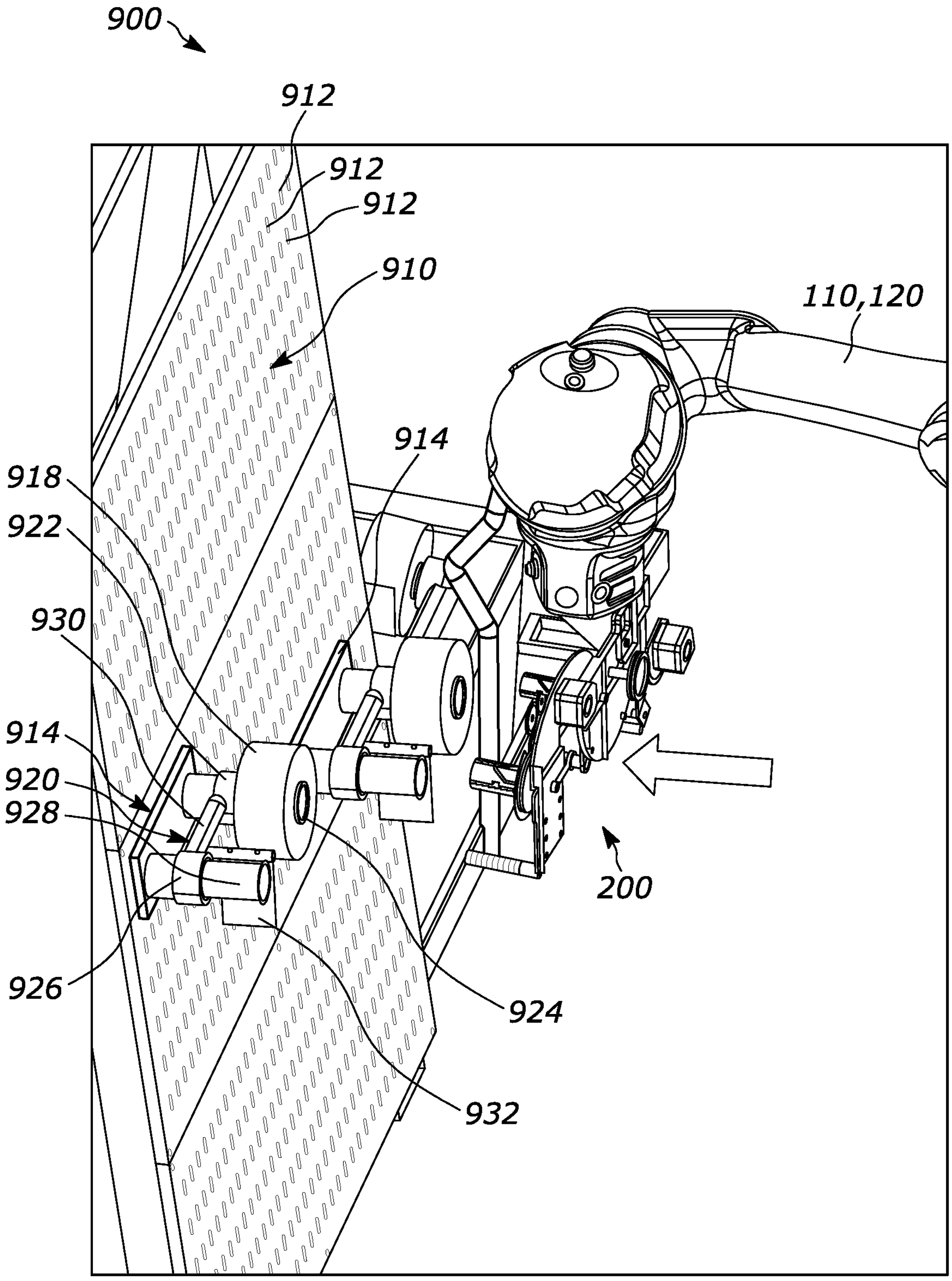
FIGS. 9A-B illustrate another example media replenishment system in accordance with embodiments of the present disclosure.
Figure 9B:
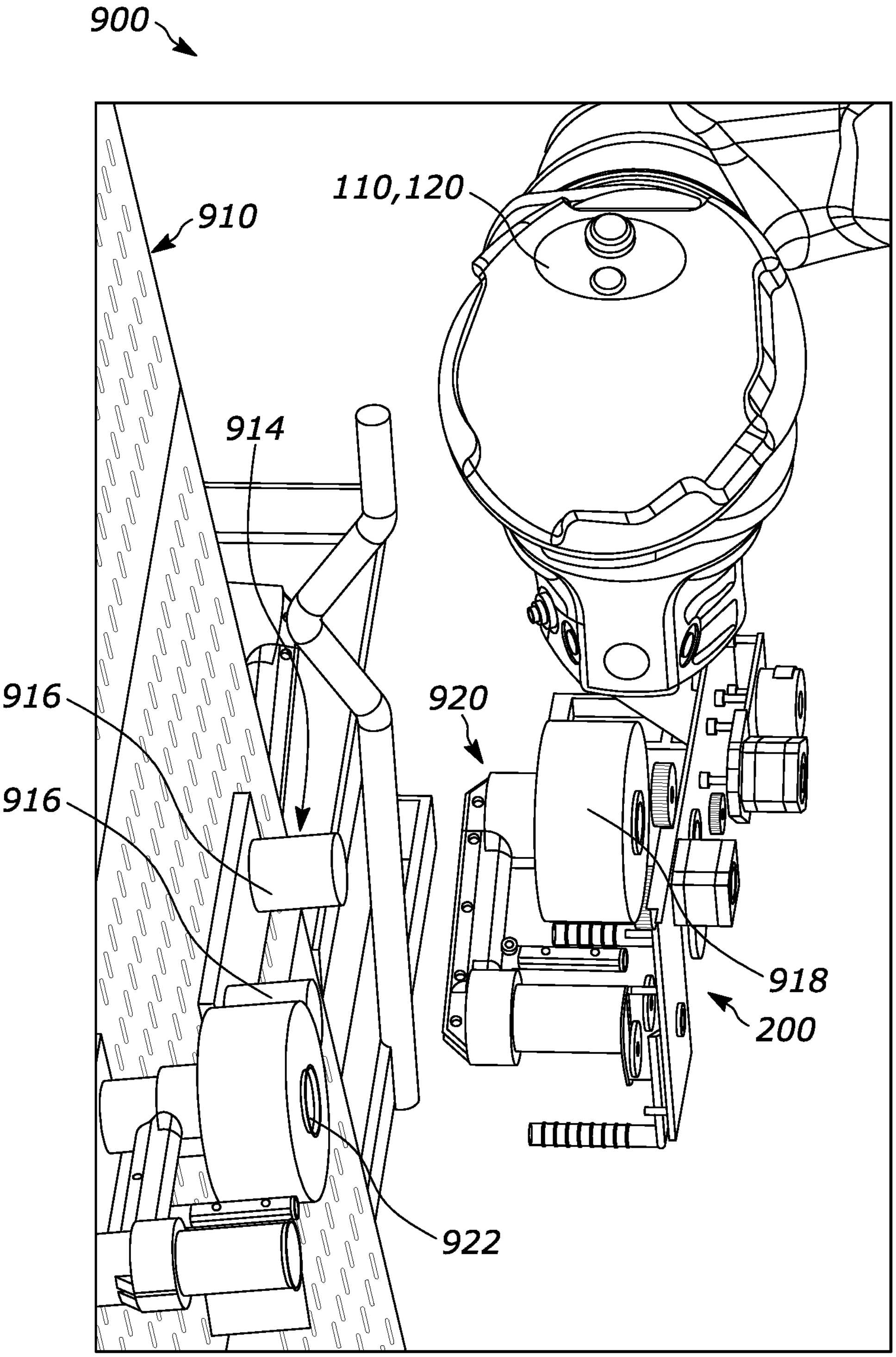

FIGS. 9A-B illustrate another example media replenishment system 900 in accordance with embodiments of the present disclosure, which may form an embodiment of the media replenishment system 112 shown, e.g., in FIG. 1. The replenishment system 900 can include a vertically oriented panel 910 that includes an array of openings 912. Brackets 914 can be mounted on the panel 910, e.g., by engaging the openings 912. The brackets 914 can include a pair of shafts 916 extending from the brackets 914 and away from the panel 910 when the brackets 914 are mounted on the panel 910. The shafts 916 can be configured to support supplies of media. The brackets 914 and their corresponding shafts 916 can be arranged on the panel 910 to align a media core and a take-up core of the supplies of media with the media payout spindle 304 and the media take-up spindle 320 of a media applicator (e.g., media applicator 200). In one example, the supplies of media can be media rolls 918 that can be mounted on frames or cartridges 920, where the cartridges 920 can be mounted on the shafts 916 of the brackets 914. In one example, the cartridges 920 can hold the media rolls 918 in a configuration that facilitates autonomous installation of the media rolls 918 on the media applicator (e.g., media applicator 200). The cartridges 920 include media roll portions 922 that support the media rolls 918 wound about media cores 924, take-up portions 926 that supports take-up cores 928 for the media rolls 918, and extension members 930 extending between the media roll portions 922 and take-up portions 926. The extension members 930 can be configured and dimensioned so that the media roll portions 922 and the take-up portions 926 space the media cores 924 and the take-up cores 928 a specified distance away from each other by a specified length so that lengths of media 940 extend between each of the media rolls 918 and each of their respective take-up core 928 and the cores 924 and 928 are spaced to align with the spindles 304 and 320 of the media applicator 200. Diverters 932 in the form of projections extend downwardly from the cartridges 920 in the orientation illustrated in FIG. 9A. The diverters 932 can engage the lengths of media 940 so that the media bend around the diverters 932. In one example, the diverters 932 can extend from the take-up portions 916, the extension members 930, or the media roll portions 922. In one example, the media rolls 918 can be tensioned by the cartridges 920 such that a specified amount of tension is applied to the length of media, where the specified amount of tension can correspond to an amount of tension that will be applied by the media applicator.

To retrieve a selected one of the media rolls 918 from the panel 910, the media applicator 200 can expose the interior (e.g., having the interior arrangement 400 or 500) of the media applicator 200, e.g., by opening the access door 210 (e.g., as shown in FIGS. 2 and 3), and can interface with the selected one of the media rolls 918, positioned on the panel 910 via one of the bracket 914, by aligning the media payout spindle 304 and the take-up spindle 320 with the media core 812 and the take-up core 816 of the selected one of the media rolls 918, respectively. The camera(s) 104*a* and/or the sensor(s) 104*b* of the media replenishment system 900 and/or the media applicator 200 can aid in aligning the media applicator 200 with media roll 918 to be installed in the media applicator 200.

In one example, the platen assembly 312 and the dancer arm 324 can be driven to move from the media processing position, as shown in FIG. 4A, to the media loading position, as shown in FIG. 4B. In the media loading position, the selected one of the media rolls 918 from the media replenishment system 900 can be autonomously received in the media applicator 200 as shown in FIGS. 9A-B. For example, the media core 924 can be received on the media supply spindle 304 and the take-up core 928 can be received on the take-up spindle 320. The cores 924 and 928 of the media roll 918 can be secured on the spindles 304 and 320, respectively, such that the media roll 918 generally does not freely rotate relative to the spindles 304 and 320. Rather, the cores 924 and 928 can be "locked" to the spindles 304 and 320, respectively such that the spindles 304 and 320 and the cores 924 and 928, respectively rotate in unison. The bend in the length of media formed by the diverter 932 can enable the media roll 918 to be installed in the media applicator 200 such that the length of media extends around or under/below the dancer arm 324 and the platen assembly 312 (relative to the orientation shown in FIG. 9A). After the media 918 is installed in the media applicator, the platen assembly 312 and the dancer 324 can return to the media processing position (e.g., the platen assembly 312 and dancer arm 324 move away from each other and the platen roller 318 forms the nip with the printhead) as shown in FIG. 4D. As shown in FIG. 4D, when the platen assembly 312 and the dancer arm 324 return to the media processing position, at least a portion of the media roll is positioned between the nip formed by the printhead 316 and the platen roller 318 and the media roll is held in tension along the media path and the media applicator 200 can be controlled to dispense the media from the media roll, as described herein.

In another example, the platen assembly 312 and the spindle assembly 354 can be driven to move from the media processing position, as shown in FIG. 5A, to the media loading position, as shown in FIG. 5B. In the media loading position, the selected one of the media rolls 918 from the media replenishment system 900 can be autonomously received in the media applicator 200 as shown in FIGS. 9A-B. For example, the media core 924 can be received on the media supply spindle 304 and the take-up core 928 can be received on the take-up spindle 320. The cores 924 and 928 of the media roll 918 can be secured on the spindles 304 and 320, respectively, such that the media roll 918 generally does not freely rotate relative to the spindles 304 and 320. Rather, the cores 924 and 928 can be "locked" to the spindles 304 and 320, respectively such that the spindles 304 and 320 and the cores 924 and 928, respectively rotate in unison. The bend in the length of media formed by the diverter 932 can enable the media roll 918 to be installed in the media applicator 200 such that the length of media extends around or under/below the dancer arm 324 and the platen assembly 312 (relative to the orientation shown in FIG. 9A). After the media 918 is installed in the media applicator, the platen assembly 312 and the spindle assembly 354 can return to the media processing position (e.g., the platen assembly 312 and spindle assembly move away from each other and the platen roller 318 forms the nip with the printhead) as shown in FIG. 5C. As shown in FIG. 5C, when the platen assembly 312 and the spindle assembly 354 return to the media processing position, at least a portion of the media roll is positioned between the nip formed by the printhead 316 and the platen roller 318 and the media roll is held in tension along the media path and the media applicator 200 can be controlled to dispense the media from the media roll, as described herein.

As indicated above, FIGS. 9A-B are provided as examples of a media replenishment system and media as well as a media applicator receiving media from the media replenishment system. Other examples may differ from what is described with regard to FIGS. 9A-B. The number and arrangement of devices/components shown in FIGS. 9A-B are provided as an example. In practice, there may be additional devices/components, fewer devices/components, different devices/components, or differently arranged devices/components than those shown in FIGS. 9A-B. Furthermore, two or more devices/components shown in FIGS. 9A-B may be implemented within a single device/component, or a single device/component shown in FIG. 9A-B may be implemented as multiple, distributed devices/components. Additionally, or alternatively, a set of devices/components (e.g., one or more devices/components) shown in FIGS. 9A-B may perform one or more functions described as being performed by another set of devices/components shown in FIGS. 9A-B.

Figure 10A:
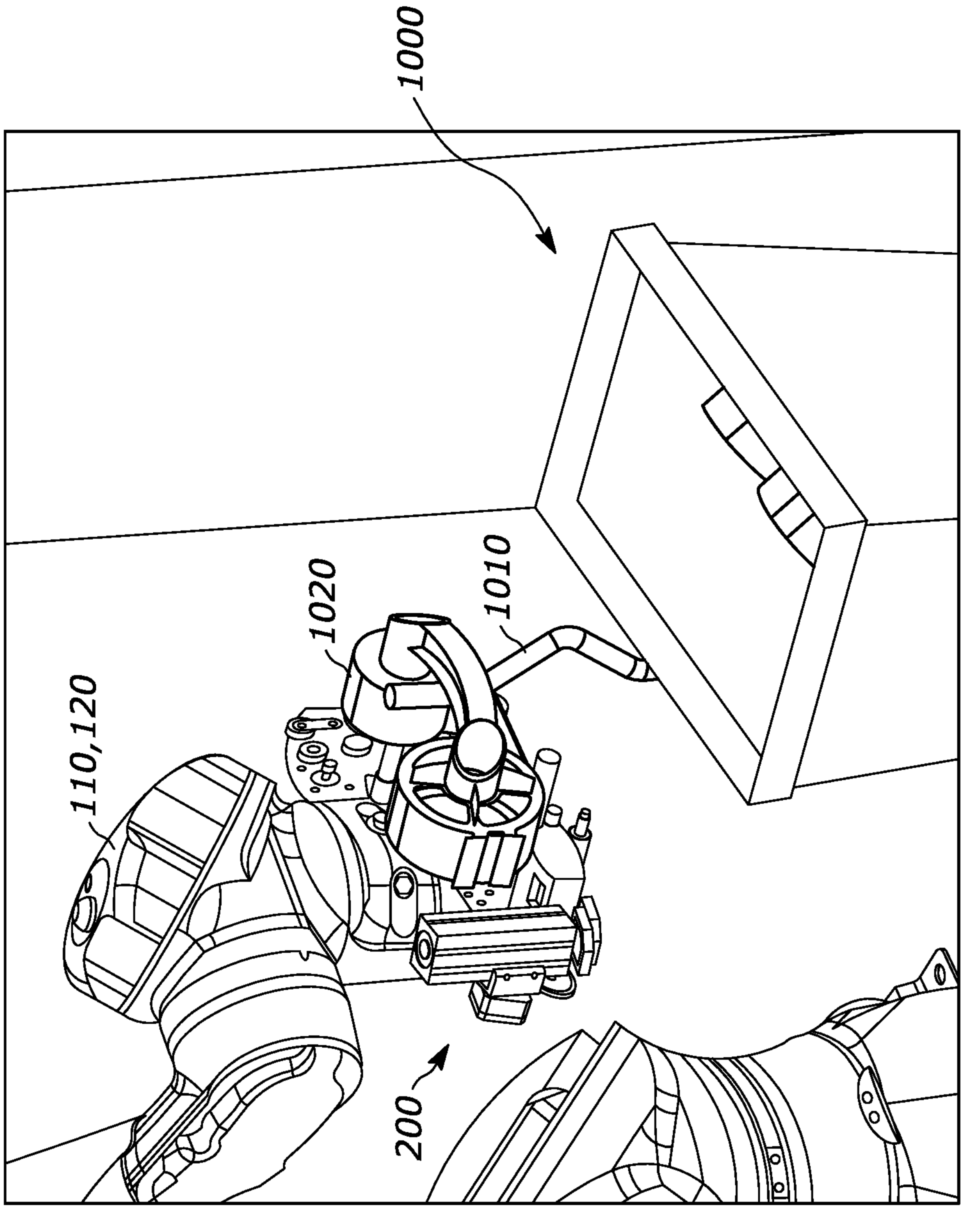
FIGS. 10A-C illustrate an example of an embodiment of a media applicator discarding remnants of media components when the supply of media in the media applicator has been depleted in accordance with embodiments of the present disclosure.
Figure 10B:
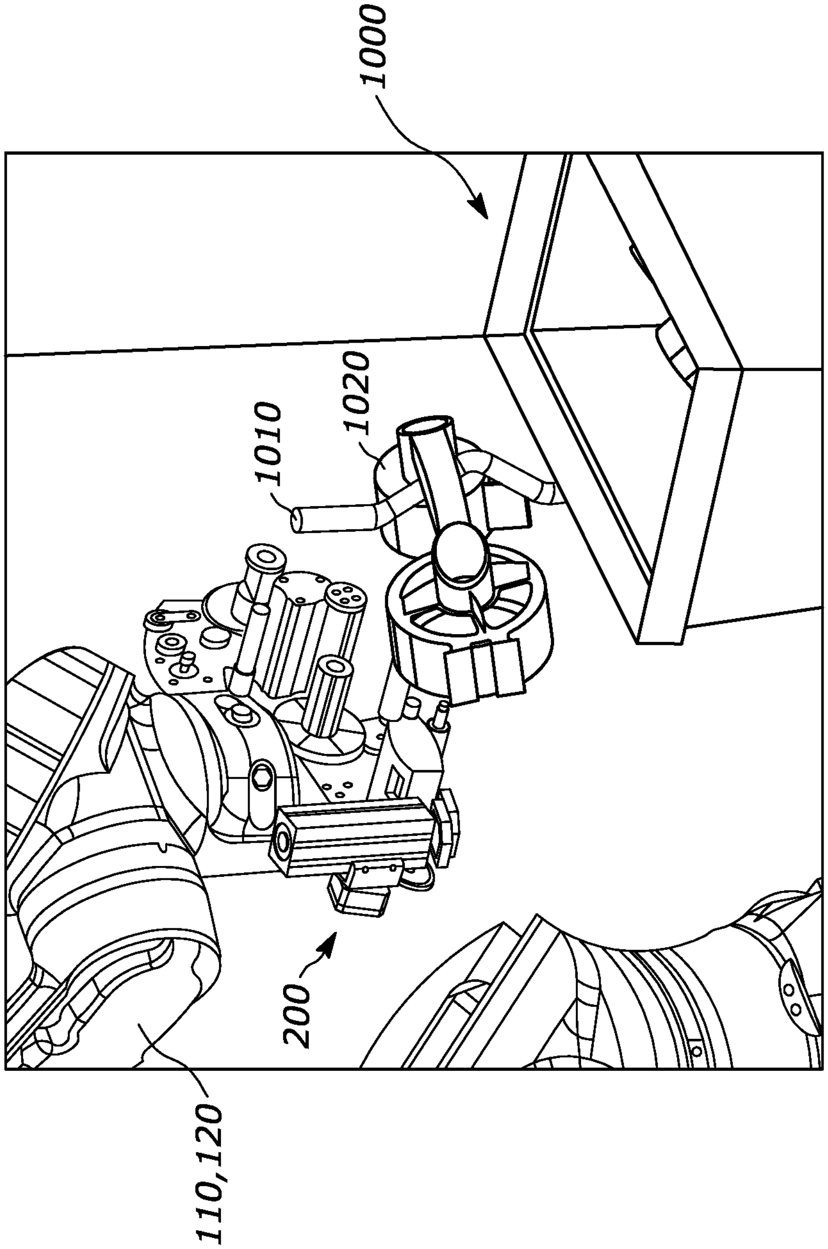
Figure 10C:
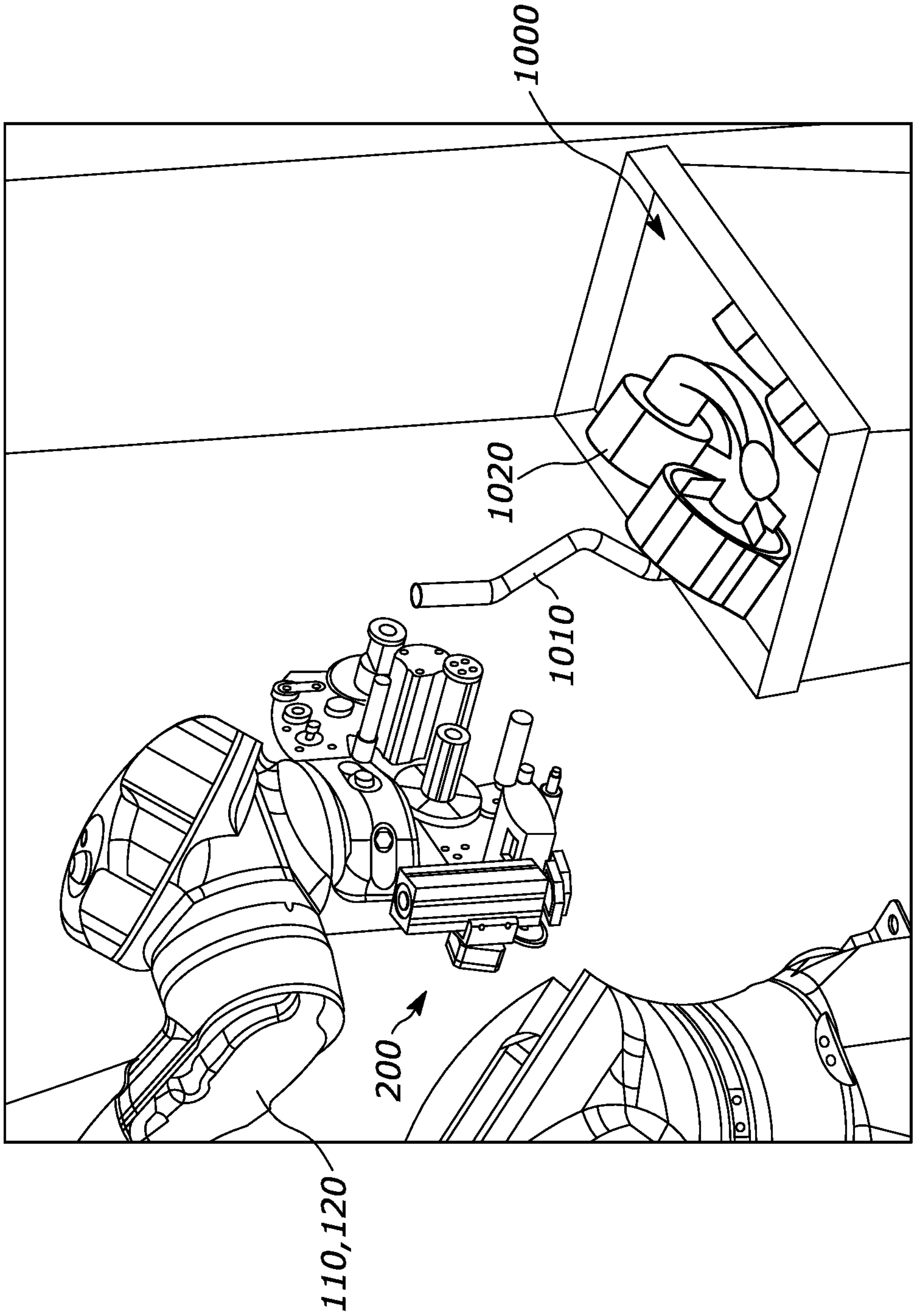

FIGS. 10A-C illustrate an example of an embodiment of the media applicator 200 operatively coupled to an embodiment of the robotic device 110 or 120, where the media applicator 200 autonomously discards remnants of media components in preparation for receipt of a new supply of media by the media applicator 200 in accordance with embodiments of the present disclosure. As shown in FIGS. 10A-C, a receptacle 1000 is provided for receiving remnants of media components. The robotic device 110 or 120 can control the movement of the media applicator 200 to position the media applicator 200 proximate to the receptacle 1000. When the media applicator 200 is positioned proximate to the receptacle 1000, the robotic device 110 or 120 and/or media applicator 1000 can perform one or more operations to facilitate discarding the remnants. As an example, the media applicator 200 can open the access door 210 and in some examples, can position at least some of the interior components in the media loading position. The robotic device 110 or 120 can also tilt the media applicator 200 to allow gravity to aid in removing the remnants.

In some embodiments, a rod 1010 can be positioned adjacent to the receptacle 1000. The rod can be used, e.g., for embodiments that include cartridges holding the media. For example, as shown in FIGS. 10A-C, a cartridge 1020 can form at a portion of the remnants of the media components to be deposited in the receptacle 1000. The media applicator 200 can be positioned such that the rod extends between the cartridge 1020 and the chassis (e.g., chassis 402 or 502) of the media applicator 200. In one example, when the rod 1010 is positioned between the cartridge 1020 and the chassis of the media applicator 200, the robotic device 110 or 120 can move the media applicator laterally away from the receptacle such that the cartridge 1020 abuts against the rod 1010 and slides off of the media applicator 200 (e.g., off the spindles 304 and/or 320) and falls into the receptacle 1000. In another example, the rod 1010 can be contoured to include one or more bends and the robotic device 110 or 120 can move the media applicator 200 vertically down such that the cartridge 1020 slides along the bend in the rod 1010, which causes the cartridge 1010 to pulled off of the media applicator 200 (e.g., off the spindles 304 and/or 320) and fall into the receptacle 1000. In some embodiments pressurized air can be forced through the spindles 304 and/or 320 (e.g., via valves 360 and conduit 362) to aid in ejecting the remnants of the depleted supply of media from the media applicator 200 (e.g., media core, take-up core, media, liner of the media, cartridge).

As indicated above, FIGS. 10A-C are provided as examples of a media receptacle as well as removing remnants of media from a media applicator. Other examples may differ from what is described with regard to FIGS. 10A-C. The number and arrangement of devices/components shown in FIGS. 10A-C are provided as an example. In practice, there may be additional devices/components, fewer devices/components, different devices/components, or differently arranged devices/components than those shown in FIGS. 10A-C. Furthermore, two or more devices/components shown in FIGS. 10A-C may be implemented within a single device/component, or a single device/component shown in FIG. 10A-C may be implemented as multiple, distributed devices/components. Additionally, or alternatively, a set of devices/components (e.g., one or more devices/components) shown in FIGS. 10A-C may perform one or more functions described as being performed by another set of devices/components shown in FIGS. 10A-C.

Figure 11A:
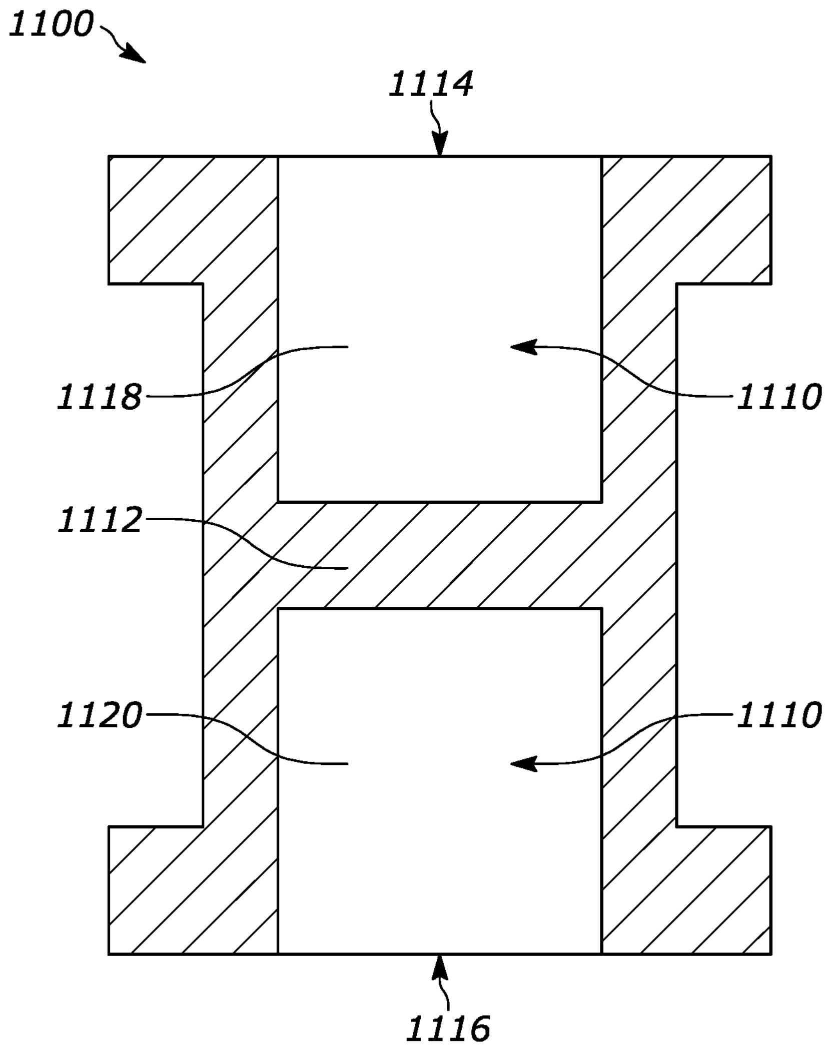
FIG. 11A illustrates an example core in accordance with embodiments of the present disclosure.

FIG. 11A illustrates a cross-section of an example core 1100 that can be implemented for embodiments of the media described herein. The core can be a cylindrical core. An interior 1110 of the core 1100 can include a wall 1112 that defines a closed portion. As shown in FIG. 11, the wall 1112 can be positioned between a proximal end 1114 and a distal end 1116 of the core 1100 such that the interior 1110 of the core is segmented into two separate volumes 1118 and 1120 by the wall 1112. While FIG. 11A illustrates an example placement of the wall 1112 within the core 1100, the wall 1112 can be positioned at different locations within the core 1100. As one example, the wall 1112 can be positioned the proximal end 1114, the distal end 1116, or anywhere between the proximal end 1114 and the distal end 1116. The wall 1112 can aid in ejecting the core from the media applicator (e.g., media applicator 200). For example, pressurize air can be forced through the spindle (e.g., spindle 304 or 320) upon which the core 1100 is mounted (e.g., via the valve(s) 360 and conduit 362). The air can impinge upon the wall 1112 and the force generated by the air impinging upon the wall 1112 can aid in ejecting the core 1100 from the media applicator.

As one example, the core 1100 can be used as a take-up core for the media 614 and/or 714, where a first segment within the core 1100 defined by the volume 1118 and a second segment within the core 1100 can be defined by the volume 1120. The first segment can be engaged by the extension bar (e.g., extension bar 622 or 722), when the media associated with the core 1100 is retrieved from the feed tray (e.g., feed tray 608) by the gripper head (e.g., gripper head 620 or 720) and the media is mounted on the base plate (e.g., base plate 604 or 704). The second segment can be engagement by the take-up spindle (e.g., spindle 320) of the media applicator when the media is installed in the media applicator.

Figure 11B:
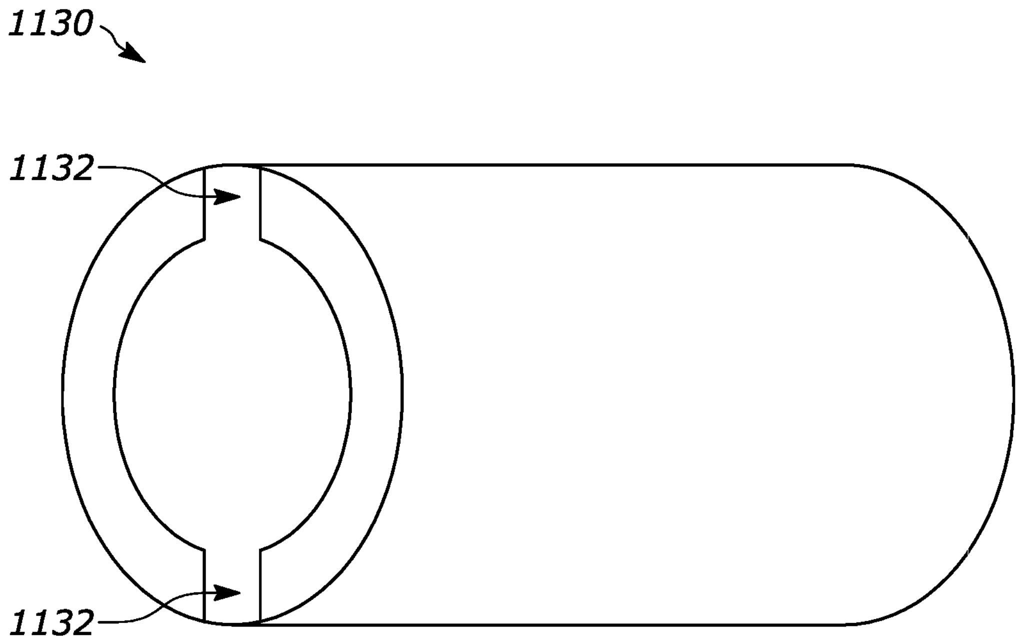
FIG. 11B illustrates an example keyed core in accordance with embodiments of the present disclosure.
Figure 11C:
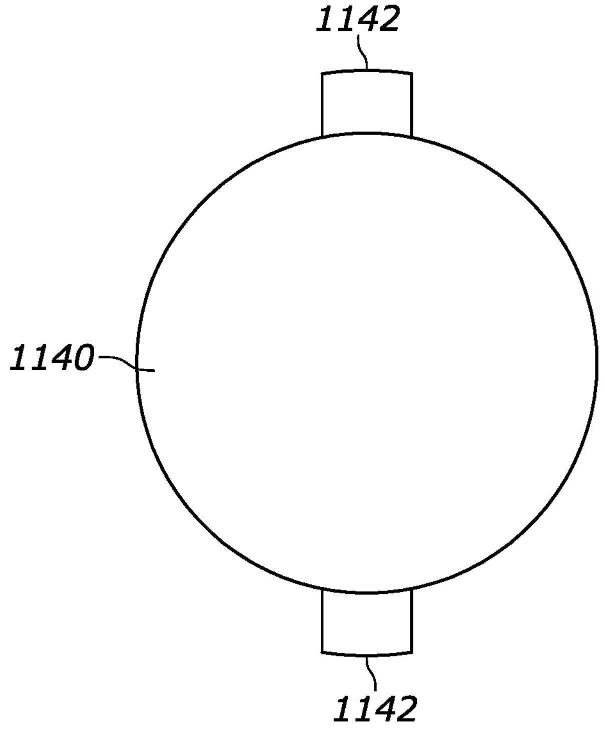
FIG. 11C illustrates an example keyed spindle in accordance with embodiments of the present disclosure.

FIG. 11B illustrates an example keyed core 1130 in accordance with embodiments of the present disclosure. FIG. 11C illustrates an example keyed spindle 1140 configured to receive the keyed core of FIG. 11B in accordance with embodiments of the present disclosure. For example, as shown in FIG. 11B, the core 1130 can include keys 1132 and the spindle 1140 can include correspond keys 1142 configured to mate with the keys 1132 when the core is mounted on the spindle 1140. The keys 1132 and 1142 can be used to align the core 1130 on the spindle 1140 and/or can lock the rotation of the core 1130 to the rotation of the spindle 1140 such that the core 1130 and the spindle rotate in unison. In one example, the spindle 1140 can be embodied as the spindle 304 and/or spindle 320 and the core 1140 can be embodied as one of the cores described herein with reference to the supplies of media.

As indicated above, FIGS. 11A-C is provided as example cores and spindles. Other examples may differ from what is described with regard to FIGS. 11A-C. The number and arrangement of devices/components shown in FIGS. 11A-C are provided as an example. In practice, there may be additional devices/components, fewer devices/components, different devices/components, or differently arranged devices/components than those shown in FIGS. 11A-C. Furthermore, two or more devices/components shown in FIGS. 11A-C may be implemented within a single device/component, or a single device/component shown in FIGS. 11A-C may be implemented as multiple, distributed devices/components. Additionally, or alternatively, a set of devices/components (e.g., one or more devices/components) shown in FIGS. 11A-C may perform one or more functions described as being performed by another set of devices/components shown in FIGS. 11A-C.

Figure 12A:
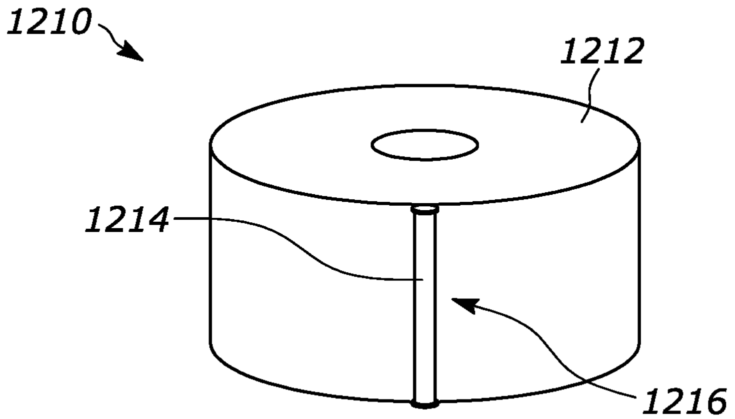
FIGS. 12A-C illustrate alternative examples of media in accordance with embodiments of the present disclosure.
Figure 12B:
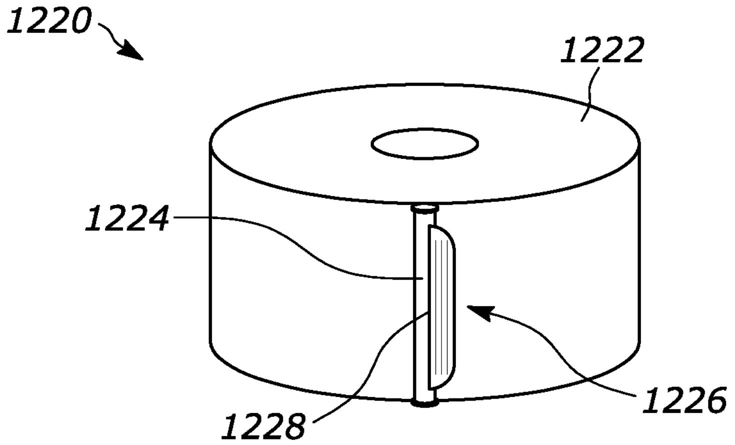
Figure 12C:
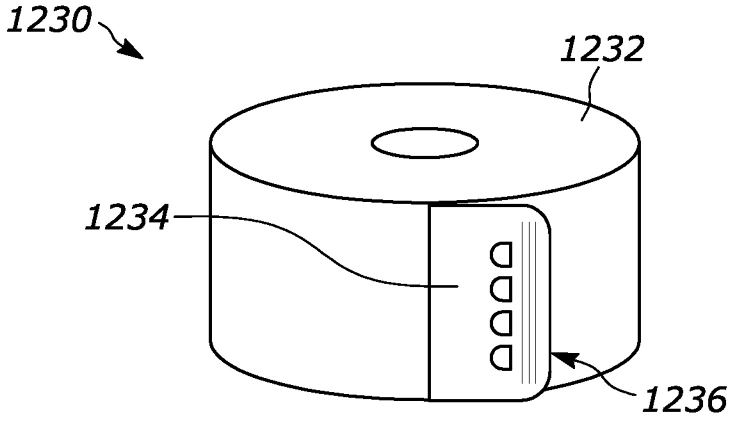

FIGS. 12A-C illustrate alternative supplies of media in accordance with embodiments of the present disclosure. While example embodiments of supplies of media the present disclosure have been as including a first core (e.g., a media core) and a second core (e.g., a take-up core), the supplies of media can be implemented with a single core (e.g., a media core) about which the media is wound to form a media roll, where the media includes a terminal free end or tail. As an example, referring to media 1210 shown in FIG. 12A, a media roll 1212 is formed that includes a spindle 1214 formed on or attached to the terminal free end 1216 of the media 1210 such that the media 1210 is devoid of a second core. The spindle 1214 can provide a feature that can be manipulated and/or held to aid in installing the media 1210 in an embodiment of the media applicator 200 or more generally a media processing device. For example, the media replenishment system 112 can operatively couple to the spindle 1214 to dispense a length of the media 1210 from the media roll 1212 in preparation for installing the media applicator (e.g., media applicator 200). In one example, the replenishment system 112 or the cutting assembly (e.g., cutting assembly 328) of the media applicator can cut the terminal free end 1216 to separate the spindle 1214 from the remainder of the media 1210 after the media 1210 has been fed through the media applicator or generally a media processing device and a portion of the media 1210 is disposed between the nip formed by the printhead (e.g., printhead 316) and the platen roller (e.g., platen roller 318).

As another example, referring to media 1120 shown in FIG. 12B, a media roll 1222 is formed that includes a spindle 1224 formed on or attached to the terminal free end 1226 of the media such that the media 1220 is devoid of a second core. A flap 1228 can extend from the spindle 1224 to provide an area that can be gripped so that the media 1220 can be manipulated and/or held to aid in installing the media 1220 in an embodiment of the media applicator 200 or more generally a media processing device. For example, the media replenishment system 112 and/or a media cartridge can operatively couple to the spindle 1224 and/or the flap 1228 to dispense a length of the media 1220 from the media roll in preparation for installing the media applicator (e.g., media applicator 200) or generally a media processing device. In one example, the replenishment system 112 or the cutting assembly (e.g., cutting assembly 328) of the media applicator can cut the terminal free end 1226 to separate the spindle 1224 and flap 1228 from the remainder of the media 1220 after the media 1220 has been fed through the media applicator or generally a media processing device and a portion of the media 1220 is disposed between the nip formed by the printhead (e.g., printhead 316) and the platen roller (e.g., platen roller 318).

As another example, referring to media 1220 shown in FIG. 12B, a media roll 1222 is formed that includes a spindle 1224 formed on or attached to the terminal free end 1226 of the media such that the media 1220 is devoid of a second core. A flap 1228 can extend from the spindle 1224 to provide an area that can be gripped so that the media 1220 can be manipulated and/or held to aid in installing the media 1220 in an embodiment of the media applicator 200 or more generally a media processing device. For example, the media replenishment system 112 and/or a media cartridge can operatively couple to the spindle 1224 and/or the flap 1228 to dispense a length of the media 1220 from the media roll in preparation for installing the media applicator (e.g., media applicator 200) or generally a media processing device. In one example, the replenishment system 112 or the cutting assembly (e.g., cutting assembly 328) of the media applicator can cut the terminal free end to separate the spindle 1224 and flap 1228 from the remainder of the media 1220 after the media 1220 has been fed through the media applicator and a portion of the media 1220 is disposed between the nip formed by the printhead (e.g., printhead 316) and the platen roller (e.g., platen roller 318).

As another example, referring to media 1230 shown in FIG. 12C, a media roll 1232 is formed that includes a pull tab 1234 formed on or attached to the terminal free end 1236 of the media such that the media 1230 is devoid of a second core. The pull tab 1234 can be formed of mylar or other material and can include holes 1238. In one example, the holes 1238 can be mating features for locking or retaining the terminal end 1236 of the media 1230 to a fixture or structure of the media replenishment system 112. As an example, the pull tab 1234 and/or holes 1238 can provide an area that can be gripped so that the media 1230 can be manipulated and/or held to aid in installing the media 1230 in an embodiment of the media applicator 200 or more generally a media processing device. For example, the media replenishment system 112 and/or a media cartridge can operatively couple to the pull tab 1234 and/or holes 1238 to dispense a length of the media 1230 from the media roll 1232 in preparation for installing the media applicator (e.g., media applicator 200) or more generally a media processing device. In one example, the replenishment system 112 or the cutting assembly (e.g., cutting assembly 328) of the media applicator can cut the terminal free end to separate the pull tab 1234 from the remainder of the media 1230 after the media 1230 has been fed through the media applicator or generally a media processing device and a portion of the media 1230 is disposed between the nip formed by the printhead (e.g., printhead 316) and the platen roller (e.g., platen roller 318).

As indicated above, FIGS. 12A-C are provided as examples of supplies of media. Other examples may differ from what is described with regard to FIGS. 12A-C. The number and arrangement of devices/components shown in FIGS. 12A-C are provided as an example. In practice, there may be additional devices/components, fewer devices/components, different devices/components, or differently arranged devices/components than those shown in FIGS. 12A-C. Furthermore, two or more devices/components shown in FIGS. 12A-C may be implemented within a single device/component, or a single device/component shown in FIG. 12A-C may be implemented as multiple, distributed devices/components. Additionally, or alternatively, a set of devices/components (e.g., one or more devices/components) shown in FIGS. 12A-C may perform one or more functions described as being performed by another set of devices/components shown in FIGS. 12A-C.

The above description refers to diagrams of the accompanying drawings. Alternative implementations of the example represented by the diagrams include one or more additional or alternative elements, processes and/or devices. Additionally or alternatively, one or more of the example elements of the diagram may be combined, divided, re-arranged or omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system comprising:

a media applicator configured to apply media to objects, the media applicator comprises:

a platen assembly, and a dancer arm, the platen assembly and the dancer arm are moveable between a media processing position and a media loading position, the platen assembly and the dancer arm moving towards each other when transitioning to the media loading position and moving away from each other when transitioning to the media processing position;

a robotic device operatively coupled to the media applicator, the robotic device configured to move the media applicator; and a media replenishment system configured to stage a supply of media for installation in the media applicator.

2. The system of claim 1, wherein the media replenishment system comprises:

a panel;

a bracket operatively coupled to the panel and at least one shaft extending from the bracket, the at least one shaft being configured to support at least a portion of the supply of media.

3. The system of claim 1, wherein the replenishment system comprises:

a hopper configured to store a plurality of media rolls in a stacked configuration;

a hopper outlet for presenting a selected one of the plurality of media rolls as the supply of media for installation in the media applicator.

4. The system of claim 1, further comprising:

a receptacle;

the robotic device configured to move the media applicator to the receptacle, the media applicator configured to autonomously discard media components remaining in the media applicator into the receptacle after media is depleted.

5. The system of claim 1, wherein the media applicator comprises:

a media outlet;

a printhead;

a media payout spindle;

a take-up spindle.

6. The system of claim 5, wherein the platen assembly is configured to move between a media processing position in which the platen roller and the printhead are configured to form a nip and a media loading position in which the platen assembly is positioned to facilitate installation of the supply of media in the media applicator.

7. The system of claim 6, wherein the platen assembly is positioned between the media payout spindle and the take-up spindle when the platen assembly is in the media loading position.

8. The system of claim 7, wherein the dancer arm is rotatable about an axis of rotation to move between the media processing position and the media loading position, wherein the dancer arm is disposed adjacent to the platen assembly in the media loading position.

9. The system of claim 6, wherein the supply of media is received on the media payout spindle and the take-up spindle and a length of media extends about the platen assembly and the dancer arm when the platen assembly and the dancer arm are in the media loading position.

10. The system of claim 6, wherein in response to the supply of media being installed in the media applicator, the platen assembly and the dancer arm move to the media processing position to position a portion of the length of media between the nip and to maintain tension on the length of media along a media path.

11. The system of claim 5, wherein the take-up spindle and the platen assembly are moveable between a media processing position and a media loading position.

12. The system of claim 11, wherein the take-up spindle and the platen assembly move towards each other when transitioning to the media loading position and move away from each other when transitioning to the media processing position.

13. A system comprising:

a media applicator configured to apply media to objects;

a robotic device operatively coupled to the media applicator, the robotic device configured to move the media applicator; and a media replenishment system configured to stage a supply of media for installation in the media applicator, wherein the media replenishment system comprises:

a media tray configured to hold a plurality of media rolls; and a base plate that includes a gripper head, an extension bar, and a tensioning bar, the gripper head configured to retrieve a selected one of the plurality of media rolls from the feed tray, the extension bar configured to pull a length of media from the selected one of the plurality of media rolls, the tensioning bar configured to tension the selected one of the media rolls to stage the supply of media.

14. The system of claim 13, wherein the gripper head is configured to move between a media presentation position in which a terminal free end of the gripper head extends away from the feed tray and a media acquisition position in which the terminal free end of the gripper head extends towards the feed tray.

15. The system of claim 13, wherein the extension bar and the tensioning bar are configured to move between a first position and a second position to pull and apply tension to the supply of media.

16. A system comprising:

a media applicator configured to apply media to objects;

a robotic device operatively coupled to the media applicator, the robotic device configured to move the media applicator; and a media replenishment system configured to stage a supply of media for installation in the media applicator, the media replenishment system comprises:

a panel;

a bracket operatively coupled to the panel and at least one shaft extending from the bracket, the at least one shaft being configured to support at least a portion of the supply of media, wherein the supply of media is a media roll having a media core about which the media is wound and a take-up core to which a terminal end of a liner of the media is attached, and a cartridge separates the media core from the take-up core by a specified distance and applies tension along a length of media extending between the media core and the take-up core.

17. A system comprising:

a media applicator configured to apply media to objects;

a robotic device operatively coupled to the media applicator, the robotic device configured to move the media applicator; and a media replenishment system configured to stage a supply of media for installation in the media applicator, the replenishment system comprises:

a hopper configured to store a plurality of media rolls in a stacked configuration;

a hopper outlet for presenting a selected one of the plurality of media rolls as the supply of media for installation in the media applicator, and wherein the supply of media is a media roll having a media core about which the media is wound and a take-up core to which a terminal end of a liner of the media is attached, and a cartridge separates the media core from the take-up core by a specified distance and applies tension along a length of media extending between the media core and the take-up core.

18. A method comprising:

determining that a supply of media in a media applicator has been depleted, the media applicator being operatively coupled to a robotic device;

moving the media applicator via the robotic device to interface with a media replenishment system, the media replenishment system configured to present a staged supply of media for installation in the media applicator; and receiving the staged supply of media in the media applicator.

19. A non-transitory medium storing instructions, wherein execution of the instructions by a processor causes the processor to:

determine that a supply of media in a media applicator has been depleted, the media applicator being operatively coupled to a robotic device;

move the media applicator via the robotic device to interface with a media replenishment system, the media replenishment system configured to present a staged supply of media for installation in the media applicator; and cause the media applicator to receive the staged supply of media.

* * * * *